US012447559B2

(12) United States Patent
Sano et al.

(10) Patent No.: US 12,447,559 B2
(45) Date of Patent: Oct. 21, 2025

(54) LASER PROCESSING DEVICE AND LASER PROCESSING METHOD

(71) Applicant: HAMAMATSU PHOTONICS K.K., Hamamatsu (JP)

(72) Inventors: Iku Sano, Hamamatsu (JP); Takeshi Sakamoto, Hamamatsu (JP); Katsuhiro Korematsu, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 410 days.

(21) Appl. No.: 17/916,844

(22) PCT Filed: Mar. 31, 2021

(86) PCT No.: PCT/JP2021/013978
§ 371 (c)(1),
(2) Date: Oct. 4, 2022

(87) PCT Pub. No.: WO2021/205964
PCT Pub. Date: Oct. 14, 2021

(65) Prior Publication Data
US 2023/0158609 A1    May 25, 2023

(30) Foreign Application Priority Data
Apr. 6, 2020    (JP) .................................. 2020-068440

(51) Int. Cl.
*H01L 21/268*    (2006.01)
*B23K 26/03*    (2006.01)
(Continued)

(52) U.S. Cl.
CPC ............ *B23K 26/53* (2015.10); *B23K 26/032* (2013.01); *H01L 21/268* (2013.01); *B23K 2103/56* (2018.08)

(58) Field of Classification Search
CPC ...... B23K 26/032; B23K 26/53; H01L 21/268
See application file for complete search history.

(56) References Cited

U.S. PATENT DOCUMENTS

2006/0113287 A1*  6/2006  Inada ................. B23K 26/0853
                                                        219/121.72

FOREIGN PATENT DOCUMENTS

| CN | 101034665 A | 9/2007 |
| CN | 108778605 B | 7/2021 |

(Continued)

OTHER PUBLICATIONS

International Preliminary Report on Patentability mailed Oct. 20, 2022 for PCT/JP2021/013978.

*Primary Examiner* — Mohammad M Choudhry
(74) *Attorney, Agent, or Firm* — Faegre Drinker Biddle & Reath LLP

(57) ABSTRACT

A laser processing device includes a control unit, and the control unit executes a first process of controlling a laser irradiation unit according to a first processing condition set such that a modified region and a modified region are formed inside a wafer; a second process of identifying a state related to each of the modified regions, and of determining whether or not the first processing condition is proper; a third process of controlling the laser irradiation unit according to a second processing condition set such that the modified regions are formed and a modified region is formed between the modified regions in a thickness direction of the wafer inside the wafer; and a fourth process of identifying a state related to each of the modified regions, and of determining whether or not the second processing condition is proper.

14 Claims, 34 Drawing Sheets

(51) Int. Cl.
*B23K 26/53* (2014.01)
*B23K 103/00* (2006.01)

(56) References Cited

FOREIGN PATENT DOCUMENTS

| | | | |
|---|---|---|---|
| JP | 2005275199 | A | 10/2005 |
| JP | 2006-173520 | A | 6/2006 |
| JP | 2009210476 | A | 9/2009 |
| JP | 2014-033116 | A | 2/2014 |
| JP | 2015152880 | A | 8/2015 |
| JP | 2017-050404 | A | 3/2017 |
| JP | 2017-064746 | A | 4/2017 |
| JP | 2019-140167 | A | 8/2019 |
| JP | 2019-158811 | A | 9/2019 |
| TW | 200539979 | A | 12/2005 |
| TW | I882104 | B | 2/2022 |
| WO | WO-2020/071455 | A1 | 4/2020 |

\* cited by examiner

Fig.11
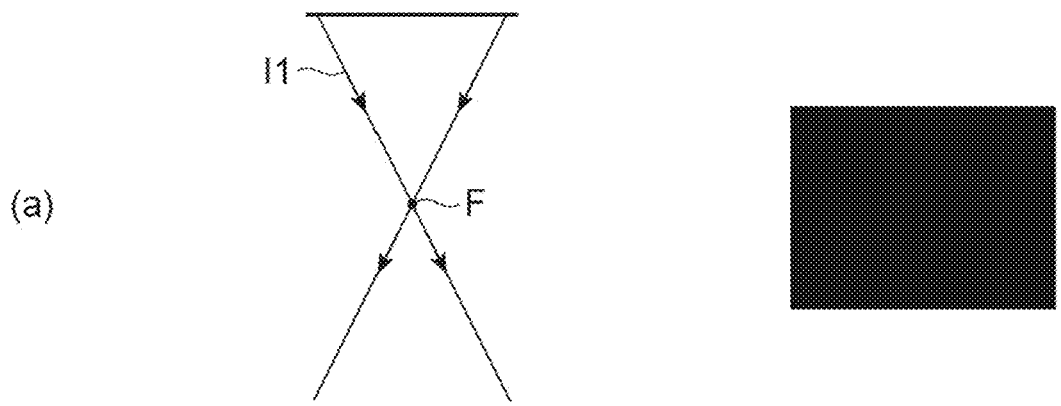
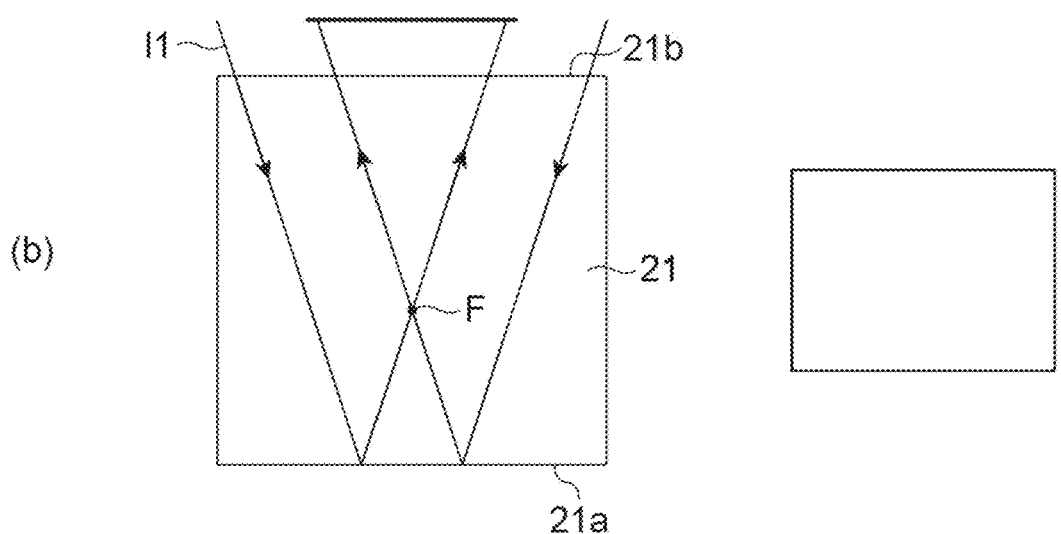
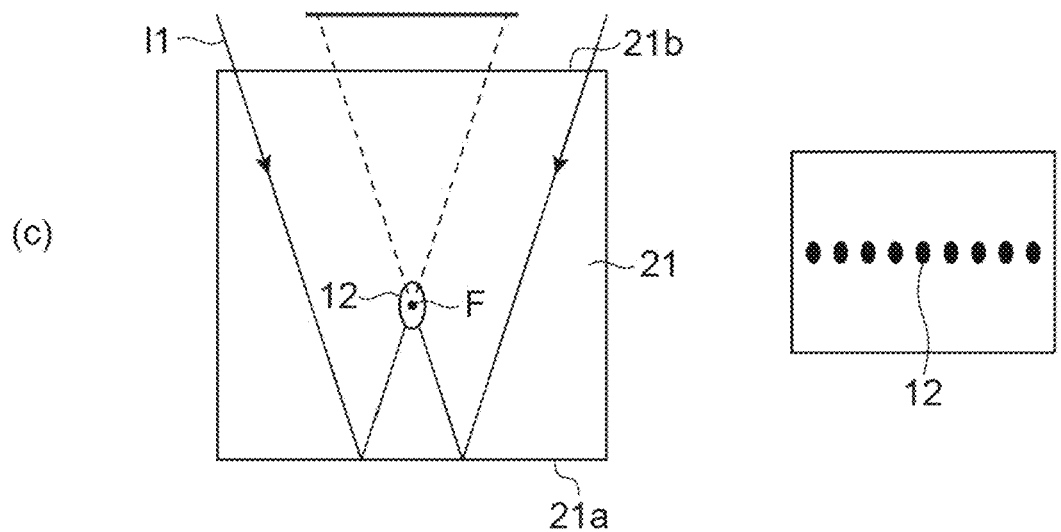

Fig.25

○ DETERMINATION CONTENTS

| FC SET CONDITION | EXECUTION | WAFER THICKNESS | t400μm |
|---|---|---|---|

○ PROCESSING QUALITY

| CRACK STATE | FC | ▽ | HC STRAIGHTNESS | LESS THAN 5μm | ▽ | END SURFACE UNEVENNESS WIDTH(μm) | LESS THAN 5μm | ▽ |
|---|---|---|---|---|---|---|---|---|

○ DETERMINATION METHOD/CRITERIA

◆ OUTER SD LAYER

| BACK SURFACE CRACK STATE | ST | ▽ |
|---|---|---|
| SD1 CRACK AMOUNT | 60±5μm | ▽ |
| SD2 CRACK AMOUNT | 60±5μm | ▽ |
| SD1 LOWER END POSITION | 345±4μm | ▽ |
| SD2 LOWER END POSITION | 110±4μm | ▽ |
| END SURFACE UNEVENNESS WIDTH | LESS THAN 5μm | ▽ |
| BLACK STREAK | PRESENCE | ▽ |
| SURFACE CRACK STATE | ST | ▽ |

◆ OUTER SD + INNER SD

| BACK SURFACE CRACK STATE | HC | ▽ |
|---|---|---|
| HC MEANDERING AMOUNT | LESS THAN 5μm | ▽ |
| MODIFIED LAYER IMAGING STATE | UNCLEAR | ▽ |
| SURFACE CRACK STATE | BHC | ▽ |
| CRACK STATE | FC | ▽ |

○DETERMINATION CONTENTS

| FC SET CONDITION | EXECUTION | WAFER THICKNESS | t400μm | PROCESSING POSITION | OUTER SD LAYER |

○PROCESSING QUALITY

| | HC STRAIGHTNESS | LESS THAN 5μm | END SURFACE UNEVENNESS WIDTH (μm) | LESS THAN 5μm |
|---|---|---|---|---|
| CRACK STATE | ST | | | |

○DETERMINATION RESULT

| DETERMINATION ITEM | STANDARD | RESULT | PASS/FAIL | LONGITUDINAL CROSS-SECTION IMAGE VIEW | |
|---|---|---|---|---|---|
| BACK SURFACE CRACK STATE | ST | ST | OK | ST CRACK AMOUNT 60±5μm SD2 LOWER END 110±4μm | ST CRACK AMOUNT 43μm SD2 LOWER END 109μm |
| SD1 CRACK AMOUNT | 60±5μm | 40μm | NG | | |
| SD2 CRACK AMOUNT | 60±5μm | 43μm | NG | END SURFACE UNEVENNESS LESS THAN 6μm BLACK STREAK IS PRESENT | END SURFACE UNEVENNESS 2μm BLACK STREAK IS PRESENT |
| SD1 LOWER END POSITION | 345±4μm | 346μm | OK | | |
| SD2 LOWER END POSITION | 110±4μm | 109μm | OK | ST CRACK AMOUNT 60±5μm SD1 LOWER END 345±4μm | ST CRACK AMOUNT 40μm SD1 LOWER END 346μm |
| END SURFACE UNEVENNESS WIDTH | LESS THAN 5μm | 2μm | OK | | |
| BLACK STREAK | PRESENCE | PRESENCE | OK | | |
| SURFACE CRACK STATE | ST | ST | OK | | |

| REPROCESSING IS ENCOURAGED. WILL REPROCESSING BE EXECUTED?*1 | YES | NO |

UPPER CRACK TIP OBSERVATION ST

LOWER CRACK TIP OBSERVATION ST

○ DETERMINATION CONTENTS

| FC SET CONDITION | EXECUTION | WAFER THICKNESS | t400μm | PROCESSING POSITION | OUTER SD LAYER |

○ PROCESSING QUALITY

| DETERMINATION ITEM | STANDARD | RESULT | PASS/FAIL | DETERMINATION ITEM | STANDARD | RESULT | PASS/FAIL | DETERMINATION ITEM | STANDARD | RESULT | PASS/FAIL |
|---|---|---|---|---|---|---|---|---|---|---|---|
| CRACK STATE | FC | FC | OK | HC STRAIGHTNESS | LESS THAN 5μm | 5.2μm | NG | END SURFACE UNEVENNESS WIDTH *2 | LESS THAN 25μm | 5.6μm | NG |

LONGITUDINAL CROSS-SECTION IMAGE VIEW

HC — IMAGE IS UNCLEAR ⇒FC — BHC

HC MEANDERING LESS THAN 5μm
END SURFACE UNEVENNESS LESS THAN 6μm
IMAGE IS UNCLEAR ⇒FC

HC — 5.2μm — BHC

HC MEANDERING LESS THAN 5.2μm
END SURFACE UNEVENNESS LESS THAN 5.6μm
END SURFACE UNEVENNESS LESS THAN 6.2μm
IMAGE IS UNCLEAR ⇒FC

HC STRAIGHTNESS 5.2μm

END SURFACE UNEVENNESS WIDTH *2  5.6μm

○ DETERMINATION RESULT

| DETERMINATION ITEM | STANDARD | RESULT | PASS/FAIL |
|---|---|---|---|
| BACK SURFACE CRACK STATE | HC | HC | OK |
| MODIFIED LAYER IMAGING STATE | UNCLEAR | UNCLEAR | OK |
| HC MEANDERING | LESS THAN 5μm | 5.2μm | NG |
| SURFACE CRACK STATE | BHC | BHC | OK |
| CRACK STATE | FC | FC | OK |

REPROCESSING OF OUTER SD LAYER IS ENCOURAGED.
WILL REPROCESSING BE EXECUTED? *1

| REPROCESSING OF OUTER SD LAYER | REPROCESSING OF INNER SD LAYER | NO REPROCESSING |

LASER PROCESSING DEVICE AND LASER PROCESSING METHOD

TECHNICAL FIELD

One aspect of the present invention relates to a laser processing device and a laser processing method.

BACKGROUND ART

There has been known a laser processing device that, in order to cut a wafer including a semiconductor substrate and a functional element layer along each of a plurality of lines, irradiates the wafer with a laser beam from the other surface side of the semiconductor substrate to form a plurality of rows of modified regions inside the semiconductor substrate along each of the plurality of lines, the functional element layer being formed on one surface of the semiconductor substrate. A laser processing device disclosed in Patent Literature 1 includes an infrared camera, and can observe modified regions formed inside a semiconductor substrate, processing damage formed in a functional element layer, and the like from a back surface side of the semiconductor substrate.

CITATION LIST

Patent Literature

Patent Literature 1: Japanese Unexamined Patent Publication No. 2017-64746

SUMMARY OF INVENTION

Technical Problem

In the laser processing device as described above, a formation speed of the modified regions may be improved by forming the modified regions while forming a plurality of condensing points of the laser beam. On the other hand, according to the findings of the inventors, when a plurality of condensing points are simultaneously formed in a thickness direction of an object, and the object is irradiated with the laser beam, a crack extending from a modified region formed at one condensing point affects the formation of a modified region at another condensing point and the progress of a crack thereof, so that the crack amount (length of the crack) becomes unstable, which is a problem. Such a problem can occur even when a plurality of condensing points are not simultaneously formed (in the case of a single focus). Namely, for example, when with a single focus, initially, a modified region far from an incident surface is formed, and then a modified region close to the incident surface is formed, the modified region close to the incident surface is processed in a state where a crack far from the incident surface has not extended sufficiently, so that the total crack amount becomes unstable, which is a problem. In a case where the crack amount becomes unstable, when the object is cut with the crack as a boundary, the quality of a cut surface (namely, processing quality) decreases.

In order to prevent the crack amount from becoming unstable, it is considered that a plurality of modified regions are formed in advance such that cracks extending from the modified regions simultaneously formed (or a plurality of modified regions are continuously formed with a single focus) are connected to each other, for example, the modified regions are sufficiently separated from each other to the extent that the cracks are not connected to each other, and then a modified region is formed between the plurality of modified regions (therebetween in a thickness direction of the wafer), and finally, a crack is formed to traverse all the modified regions. As described above, in a processing method for forming an outer modified region and then forming an inner modified region, the processing method is complicated, and it is difficult to set an appropriate processing condition. When the processing condition is not appropriately set, the quality of the processed wafer cannot be sufficiently ensured, which is a problem.

One aspect of the present invention is conceived in view of the above circumstances, and an object of the present invention is to provide a laser processing device and a laser processing method capable of ensuring the quality of a wafer when outer modified regions and an inner modified region are formed in a thickness direction of the wafer.

Solution to Problem

A laser processing device according to one aspect of the present invention includes: an irradiation unit that irradiates a wafer having a first surface and a second surface with a laser beam from a first surface side of the wafer; an imaging unit that outputs light having a property of transmitting through the wafer, and that detects the light that has propagated through the wafer; and a control unit. The control unit is configured to execute a first process of controlling the irradiation unit according to a first processing condition set such that a first modified region and a second modified region are formed inside the wafer by irradiating the wafer with the laser beam, the second modified region being located closer to an incident surface side of the laser beam than the first modified region; a second process of identifying a state related to each of the first modified region and the second modified region based on a signal output from the imaging unit that has detected the light, and of determining whether or not the first processing condition is proper, based on identified information, after the first process; a third process of controlling the irradiation unit according to a second processing condition set such that the first modified region and the second modified region are formed and a third modified region is formed between the first modified region and the second modified region in a thickness direction of the wafer inside the wafer by irradiating the wafer with the laser beam; and a fourth process of identifying a state related to each of the first modified region, the second modified region, and the third modified region based on a signal output from the imaging unit that has detected the light, and of determining whether or not the second processing condition is proper, based on identified information, after the third process.

In the laser processing device according to one aspect of the present invention, in the third process, outer modified regions layers (the first modified region and the second modified region) and an inner modified region (third modified region) therebetween are formed in the thickness direction of the wafer based on the second processing condition, and in the fourth process, a state related to each of the outer modified regions and the inner modified region is identified based on a signal output from the imaging unit, and it is determined whether or not the second processing condition is proper, based on an identified result. As described above, processing is performed such that the outer modified regions and the inner modified region are actually formed, and it is determined whether or not the processing condition is proper, based on a state of each of the modified regions after the processing, so that it is determined whether or not the processing condition is proper, based on a final processed state of the wafer. As a result, it is accurately determined whether or not the processing condition is proper, and the quality of the wafer after the processing can be ensured. Furthermore, in the laser processing device according to one aspect of the present invention, in the first process, only the outer modified regions (the first modified region and the second modified region) are formed in the thickness direction of the wafer based on the first processing condition, and in the second process, a state related to each of the outer modified regions is identified based on a signal output from the imaging unit, and it is determined whether or not the first processing condition is proper, based on an identified result. For example, in the final processed state of the wafer, when the wafer is processed into a full-cut state (state where cracks extending from the modified regions extend to both end surfaces of the wafer), there is little information regarding the modified regions that can be obtained from the final processed state of the wafer, and whether or not the processing condition is proper cannot be determined with high accuracy, which is a problem. In this respect, in a state where only some modified regions (outer modified regions) are formed, it is determined whether or not the processing condition related to the formation of the some modified regions (first processing condition) is proper, based on information regarding the some modified regions, so that whether or not the processing condition is proper can be determined with higher accuracy, based on a processed state of the wafer from which more information (information regarding the modified regions) can be obtained than from the final processed state of the wafer. Incidentally, according to the findings of the inventors, when the outer modified regions and the inner modified region are formed in the thickness direction of the wafer, it is considered that the state of each of the outer modified regions affects the quality of the wafer after the processing or dicability. In this respect, in the second process, it is determined whether or not the processing condition related to the formation of the outer modified regions (first processing condition) is proper, so that the quality of the wafer after the processing can be more suitably ensured.

The control unit may identify at least one of a state of the modified region and a state of a crack extending from the modified region, as the state related to the modified region. Accordingly, a state of the wafer after the processing can be appropriately identified, and whether or not the processing condition is proper can be determined with higher accuracy. As a result, the quality of the wafer can be more suitably ensured.

The control unit may identify a position of the modified region, and determine whether or not the processing condition is proper, based on the position. When the processing condition is not appropriate, the position of the modified region may not be a desired position. The processing condition can be appropriately determined by determining whether or not the processing condition is proper according to whether or not the modified region is formed at the desired position. Accordingly, the quality of the wafer after the processing can be more suitably ensured.

The control unit may identify whether or not the crack extends to at least one of the first surface and the second surface, and determine whether or not the processing condition is proper, based on whether or not the crack extends to at least one of the first surface and the second surface. Accordingly, for example, in the final processed state of the wafer, when the wafer is desired to be processed into the full-cut state, the processing condition can be appropriately determined by determining that the crack does not extend to the first surface and to the second surface in the stage of the second process, and by determining that the cracks extend to the first surface and to the second surface in the stage of the fourth process. Accordingly, the quality of the wafer after the processing can be more suitably ensured.

In the second process, when the crack extends to at least one of the first surface and the second surface, the control unit may determine that the first processing condition is not proper. Accordingly, an ST state where the crack has not reached the surface or the back surface (state where internal observation is easy to make) can be reliably attained in a processed state prior to the final processed state. As a result, information regarding the processed state can be appropriately and abundantly obtained. In addition, even if the final processed state is the full-cut state, when the crack has reached the surface or the back surface in a state prior to the final processed state (state where processing is still to be performed thereafter), it is considered that the chip quality and the dicability in the final processed state decrease. For this reason, a state where the processed state prior to the final processed state is the ST state is set as one condition for determining that the processing condition is appropriate, so that the chip quality and the dicability can be ensured.

The control unit may identify an extension amount of the crack, and determine whether or not the processing condition is proper, based on the extension amount. When the processing condition is not appropriate, the extension amount of the crack may not reach a desired length. The processing condition can be appropriately determined by determining whether or not the processing condition is proper, based on the extension amount of the crack. Accordingly, the quality of the wafer after the processing can be more suitably ensured.

The control unit may identify a meandering width of the crack in a direction intersecting the thickness direction of the wafer, and determine whether or not the processing condition is proper, based on the meandering width. When the processing condition is not appropriate, the meandering width of the crack may increase. The processing condition can be appropriately determined by determining whether or not the processing condition is proper, based on the meandering width of the crack. Accordingly, the quality of the wafer after the processing can be more suitably ensured.

The control unit may identify whether or not cracks extending from the respective modified regions different from each other are connected to each other, and determine whether or not the processing condition is proper, based on whether or not the cracks are connected to each other. In a case where the processing condition is not appropriate, when the cracks are not desired to be connected to each other, the cracks may be connected to each other, or when the cracks are desired to be connected to each other, the cracks may not be connected to each other.

The processing condition can be appropriately determined by determining whether or not the processing condition is proper according to whether or not the cracks are connected to each other. Accordingly, the quality of the wafer after the processing can be more suitably ensured.

The control unit may be configured to further execute a fifth process of controlling the irradiation unit according to a third processing condition set such that the third modified region is formed inside the wafer by irradiating the wafer with the laser beam; and a sixth process of identifying a state related to the third modified region based on a signal output from the imaging unit that has detected the light, and of determining whether or not the third processing condition is proper, based on identified information, after the fifth process. According to such a configuration, in a state where only the inner modified region is formed, it is determined whether or not the processing condition related to the formation of the inner modified region (third processing condition) is proper, based on information regarding the inner modified region. In the case of forming the outer modified regions and the inner modified region, in addition to when only the outer modified regions are formed, even when only the inner modified region is formed, whether or not the processing condition is proper can be determined with higher accuracy by determining whether or not the processing condition is proper, based on the information regarding the modified region.

In the sixth process, when the crack extends to at least one of the first surface and the second surface, the control unit may determine that the third processing condition is not proper. Accordingly, an ST state where the crack has not reached the surface or the back surface (state where internal observation is easy to make) can be reliably attained in a processed state prior to the final processed state. As a result, information regarding the processed state can be appropriately and abundantly obtained. In addition, even if the final processed state is the full-cut state, when the crack has reached the surface or the back surface in a state prior to the final processed state (state where processing is still to be performed thereafter), it is considered that the chip quality and the dicability in the final processed state decrease. For this reason, a state where the processed state prior to the final processed state is the ST state is set as one condition for determining that the processing condition is appropriate, so that the chip quality and the dicability can be ensured.

The control unit may determine that the first processing condition is not proper, when the crack extends to at least one of the first surface and the second surface in the second process, and determine that the third processing condition is not proper, when the crack extends to at least one of the first surface and the second surface in the sixth process. Accordingly, an ST state where the crack has not reached the surface or the back surface (state where internal observation is easy to make) can be reliably attained in a processed state prior to the final processed state. As a result, information regarding the processed state can be appropriately and abundantly obtained. In addition, even if the final processed state is the full-cut state, when the crack has reached the surface or the back surface in a state prior to the final processed state (state where processing is still to be performed thereafter), it is considered that the chip quality and the dicability in the final processed state decrease. For this reason, a state where the processed state prior to the final processed state is the ST state is set as one condition for determining that the processing condition is appropriate, so that the chip quality and the dicability can be ensured.

The control unit may be configured to further execute a seventh process of correcting the processing condition according to a determination result of the processing condition, when it is determined that the processing condition is not proper. According to such a configuration, the processing condition can be corrected based on the determination result, and the quality of the wafer after the processing can be more suitably ensured.

The control unit may be configured to further execute a brightness calibration process of the controlling the imaging unit such that the imaging unit captures an image with a predetermined brightness in each region in the thickness direction of the wafer of which an image is captured by the imaging unit, and such that the imaging unit outputs the light of a light amount corresponding to a position of each region in the thickness direction of the wafer. According to such a configuration, the light amount of the imaging unit can be decided such that a constant or optimum brightness is obtained for each imaging region in the thickness direction (depth direction) of the wafer. Accordingly, the state related to each modified region can be appropriately identified.

The control unit may be configured to further execute a shading correction process of controlling the imaging unit to capture an image for shading in each region in the thickness direction of the wafer of which an image is captured by the imaging unit, before the modified region is processed, and of identifying difference data between an image of each region and the image for shading of a corresponding region captured by the imaging unit, after the modified region is processed. In the second process and in the fourth process, a state related to the modified region may be identified based on the difference data. The difference data acquired by the shading correction process is image data from which noise such as a device pattern, point defects, or uneven screen brightness is removed, and is image data of only modified regions, a crack state, and the like that are desired to be observed. The state related to each modified region is identified based on such difference data, so that a state of the wafer after the processing is appropriately identified. Accordingly, the quality of the wafer after the processing can be more suitably ensured.

The control unit may be configured to further execute an aberration correction process of controlling at least one of the irradiation unit and the imaging unit such that aberration correction according to a position in the thickness direction of the wafer is performed in each region in the thickness direction of the wafer of which an image is captured by the imaging unit. For example, when full-cut processing is performed, the interval between the modified regions becomes narrow, and the extension amount of the crack is also reduced, so that clear observation cannot be performed unless aberration correction is performed for each position in the thickness direction of the wafer. In this respect, as described above, since aberration correction according to the thickness of the wafer is performed in each region in the thickness direction of the wafer, clear observation can be performed, and a state related to each modified region can be more appropriately identified.

A laser processing method according to one aspect of the present invention includes: processing a wafer based on a first processing condition set such that a first modified region and a second modified region are formed inside the wafer by irradiating the wafer with a laser beam, the second modified region being located closer to an incident surface side of the laser beam than the first modified region; identifying a state related to each of the first modified region and the second modified region based on an imaging result of the wafer processed based on the first processing condition, and determining whether or not the first processing condition is proper, based on identified information; processing the wafer based on a second processing condition set such that the first modified region and the second modified region are formed and a third modified region is formed between the first modified region and the second modified region in a thickness direction of the wafer inside the wafer by irradiating the wafer with the laser beam; and identifying a state related to each of the first modified region, the second modified region, and the third modified region based on an imaging result of the wafer processed based on the second processing condition, and determining whether or not the second processing condition is proper, based on identified information.

Advantageous Effects of Invention

According to one aspect of the present invention, it is possible to provide the laser processing device and the laser processing method capable of ensuring the quality of the wafer when the outer modified regions and the inner modified region are formed in the thickness direction of the wafer.

BRIEF DESCRIPTION OF DRAWINGS

FIG. 11 shows optical path views for describing the imaging principle of the imaging unit for inspection shown in FIG. 5, and schematic views showing images captured at a focus by the imaging unit for inspection.

FIG. 25 is a screen image related to the processing condition derivation process.

FIG. 26 is a screen image related to the processing condition derivation process.

FIG. 27 is a screen image related to the processing condition derivation process.

DESCRIPTION OF EMBODIMENTS

Figure 1:
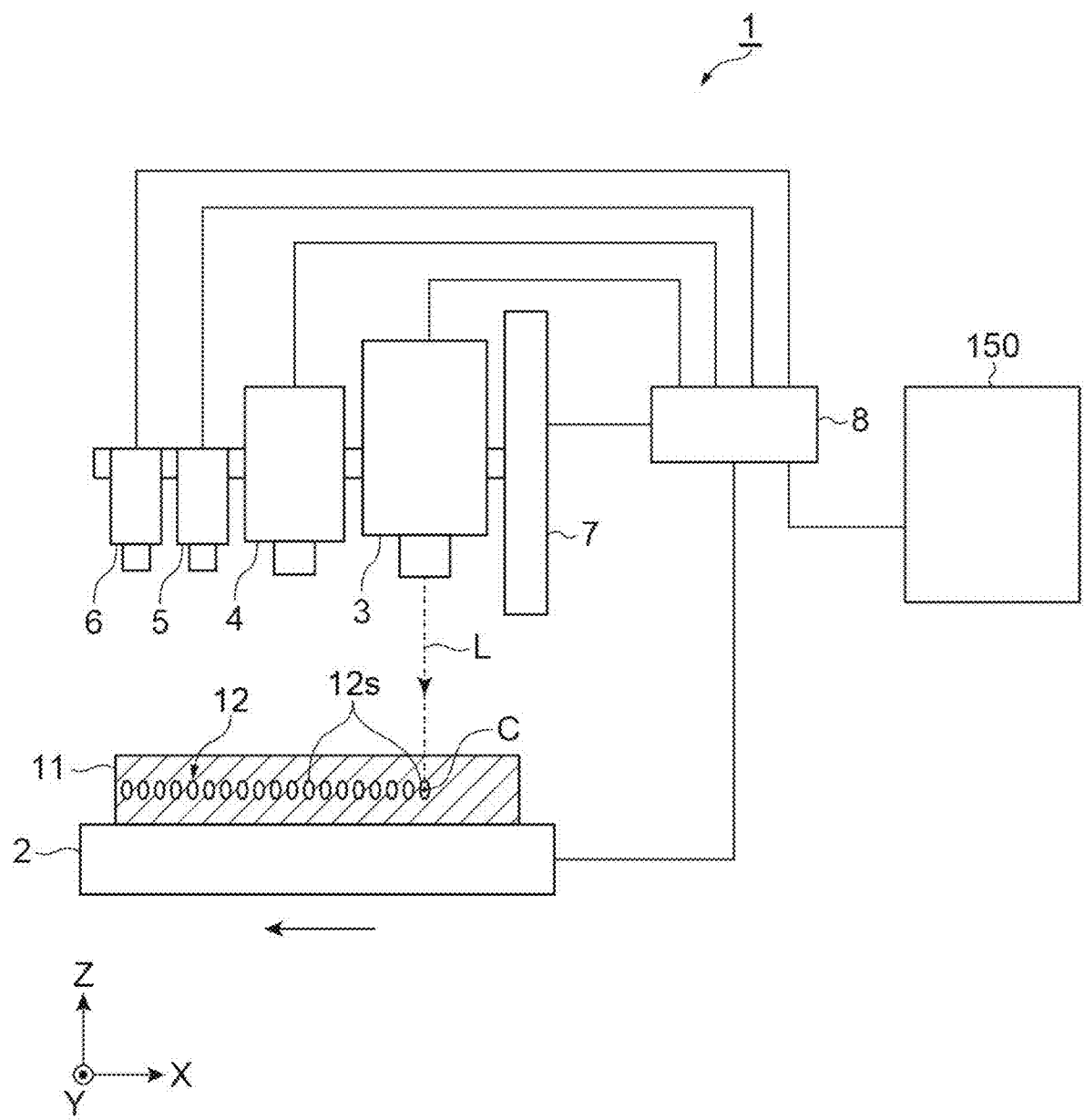
FIG. 1 is a configuration view of a laser processing device according to one embodiment.

Hereinafter, an embodiment of the present invention will be described in detail with reference to the drawings. Incidentally, in the drawings, the same or corresponding portions will be denoted by the same reference signs, and a duplicated description will not be repeated.

[Configuration of Laser Processing Device]

As shown in FIG. 1, a laser processing device 1 includes a stage 2, a laser irradiation unit 3 (irradiation unit), a plurality of imaging units 4, 5, and 6, a drive unit 7, a control unit 8, and a display 150 (an input unit and a display unit). The laser processing device 1 is a device that irradiates an object 11 with a laser beam L to form a modified region 12 in the object 11.

The stage 2 supports the object 11, for example, by suctioning a film attached to the object 11. The stage 2 is movable in each of an X direction and a Y direction, and is rotatable around an axis parallel to a Z direction as a center line. Incidentally, the X direction and the Y direction are a first horizontal direction and a second horizontal direction perpendicular to each other, and the Z direction is a vertical direction.

The laser irradiation unit 3 condenses the laser beam L having a property of transmitting through the object 11, and irradiates the object 11 with the laser beam L. When the laser beam L is condensed inside the object 11 supported by the stage 2, the laser beam L is absorbed particularly at a portion corresponding to a condensing point C of the laser beam L, and the modified region 12 is formed inside the object 11.

The modified region 12 is a region of which the density, the refractive index, the mechanical strength, and other physical characteristics are different from those of a surrounding non-modified region. Examples of the modified region 12 include a melting region, a crack region, a dielectric breakdown region, a refractive index change region, and the like. The modified region 12 has a characteristic that cracks easily extend from the modified region 12 to an incident side of the laser beam L and to a side opposite the incident side. Such a characteristic of the modified region 12 is used for the cutting of the object 11.

As one example, when the stage 2 is moved along the X direction to move the condensing point C relative to the object 11 along the X direction, a plurality of modified spots 12s are formed to be arranged in one row along the X direction. One modified spot 12s is formed by irradiating the object 11 with the laser beam L of one pulse. One row of the modified regions 12 are a set of a plurality of the modified spots 12s arranged in one row. The modified spots 12s adjacent to each other may be connected to each other or separated from each other depending on a relative movement speed of the condensing point C with respect to the object 11 and on a repetition frequency of the laser beam L.

The imaging unit 4 captures an image of the modified regions 12 formed in the object 11, and an image of tips of cracks extending from the modified regions 12.

The imaging units 5 and 6 capture images of the object 11 supported by the stage 2, with light transmitting through the object 11 under control of the control unit 8. As one example, the images obtained by the imaging units 5 and 6 are used for the alignment of an irradiation position of the laser beam L.

The drive unit 7 supports the laser irradiation unit 3 and the plurality of imaging units 4, 5, and 6. The drive unit 7 moves the laser irradiation unit 3 and the plurality of imaging units 4, 5, and 6 along the Z direction.

The control unit 8 controls operations of the stage 2, the laser irradiation unit 3, the plurality of imaging units 4, 5, and 6, and the drive unit 7. The control unit 8 is configured as a computer device including a processor, a memory, a storage, a communication device, and the like. In the control unit 8, the processor executes software (program) read into the memory or the like, and controls the reading and writing of data from and to the memory and the storage and communication by the communication device.

The display 150 has a function as an input unit that receives an input of information from a user, and a function as a display unit that displays information for the user.

[Configuration of Object]

Figure 2:
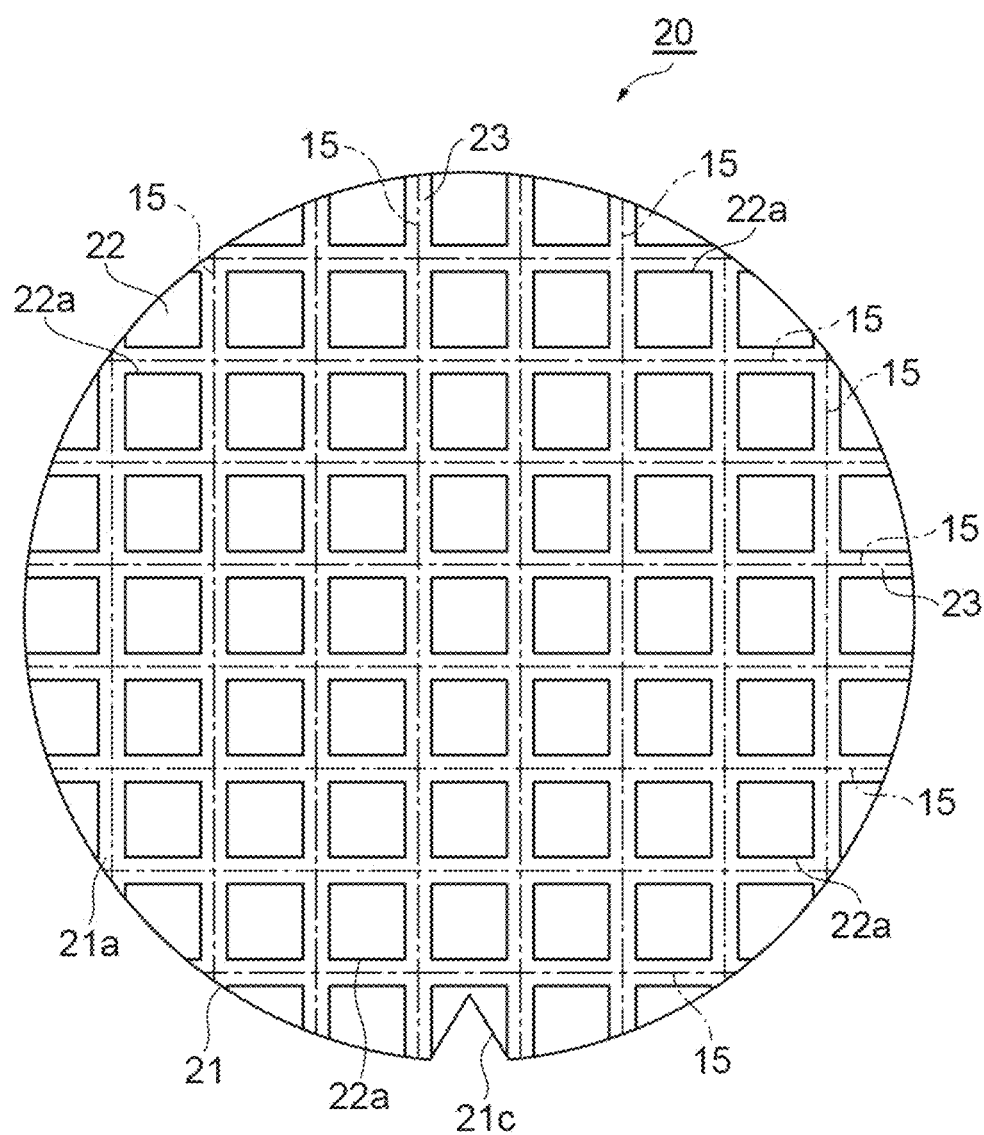
FIG. 2 is a plan view of a wafer of one embodiment.
Figure 3:
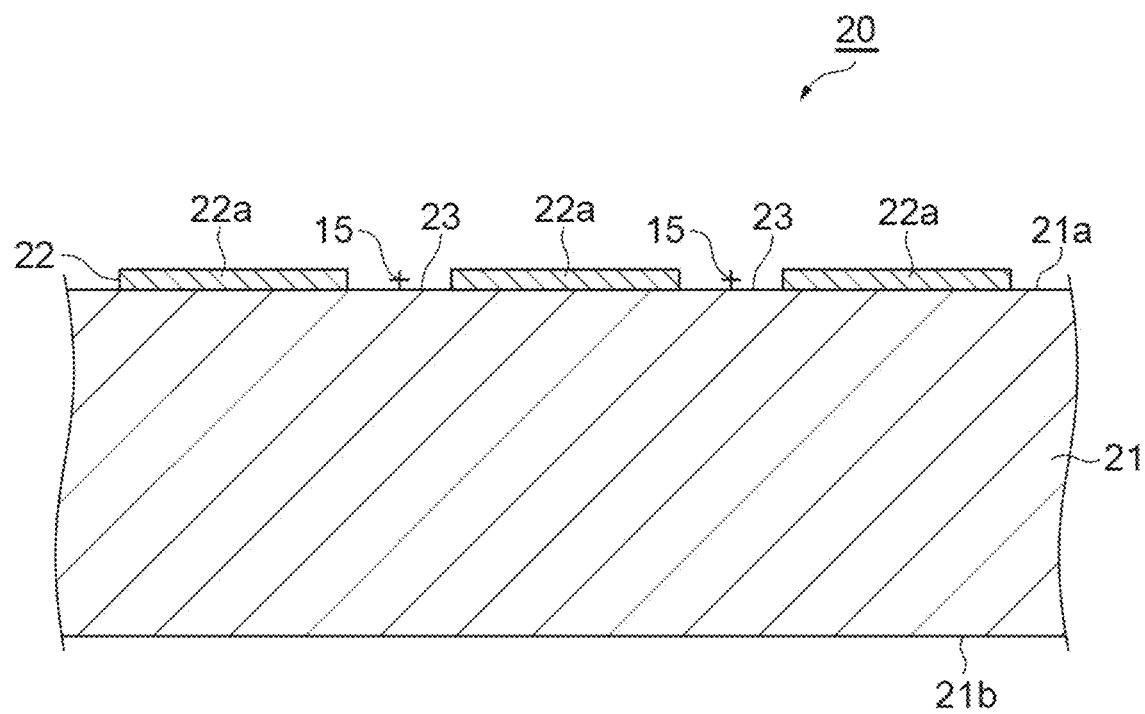
FIG. 3 is a cross-sectional view of a portion of the wafer shown in FIG. 2.

The object 11 of the present embodiment is a wafer 20 as shown in FIGS. 2 and 3. The wafer 20 includes a semiconductor substrate 21 and a functional element layer 22. Incidentally, in the present embodiment, the wafer 20 will be described as including the functional element layer 22, but the wafer 20 may or may not include the functional element layer 22 and may be a bare wafer. The semiconductor substrate 21 includes a surface 21a (second surface) and a back surface 21b (first surface). The semiconductor substrate 21 is, for example, a silicon substrate. The functional element layer 22 is formed on the surface 21a of the semiconductor substrate 21. The functional element layer 22 includes a plurality of functional elements 22a that are two-dimensionally arranged along the surface 21a. The functional element 22a is, for example, a light-receiving element such as a photodiode, a light-emitting element such as a laser diode, a circuit element such as a memory, or the like. The functional element 22a may be three-dimensionally configured such that a plurality of layers are stacked. Incidentally, the semiconductor substrate 21 is provided with a notch 21c indicating a crystal orientation, but an orientation flat may be provided instead of the notch 21c.

The wafer 20 is cut for each functional element 22a along each of a plurality of lines 15. The plurality of lines 15 pass between the plurality of respective functional elements 22a when viewed in a thickness direction of the wafer 20. More specifically, each of the lines 15 passes through a center of a street region 23 (center in a width direction) when viewed in the thickness direction of the wafer 20. The street region 23 extends to pass between the functional elements 22a adjacent to each other in the functional element layer 22. In the present embodiment, the plurality of functional elements 22a are arranged in a matrix pattern along the surface 21a, and the plurality of lines 15 are set in a grid pattern. Incidentally, the lines 15 are imaginary lines but may be lines that are actually drawn.

[Configuration of Laser Irradiation Unit]

Figure 4:
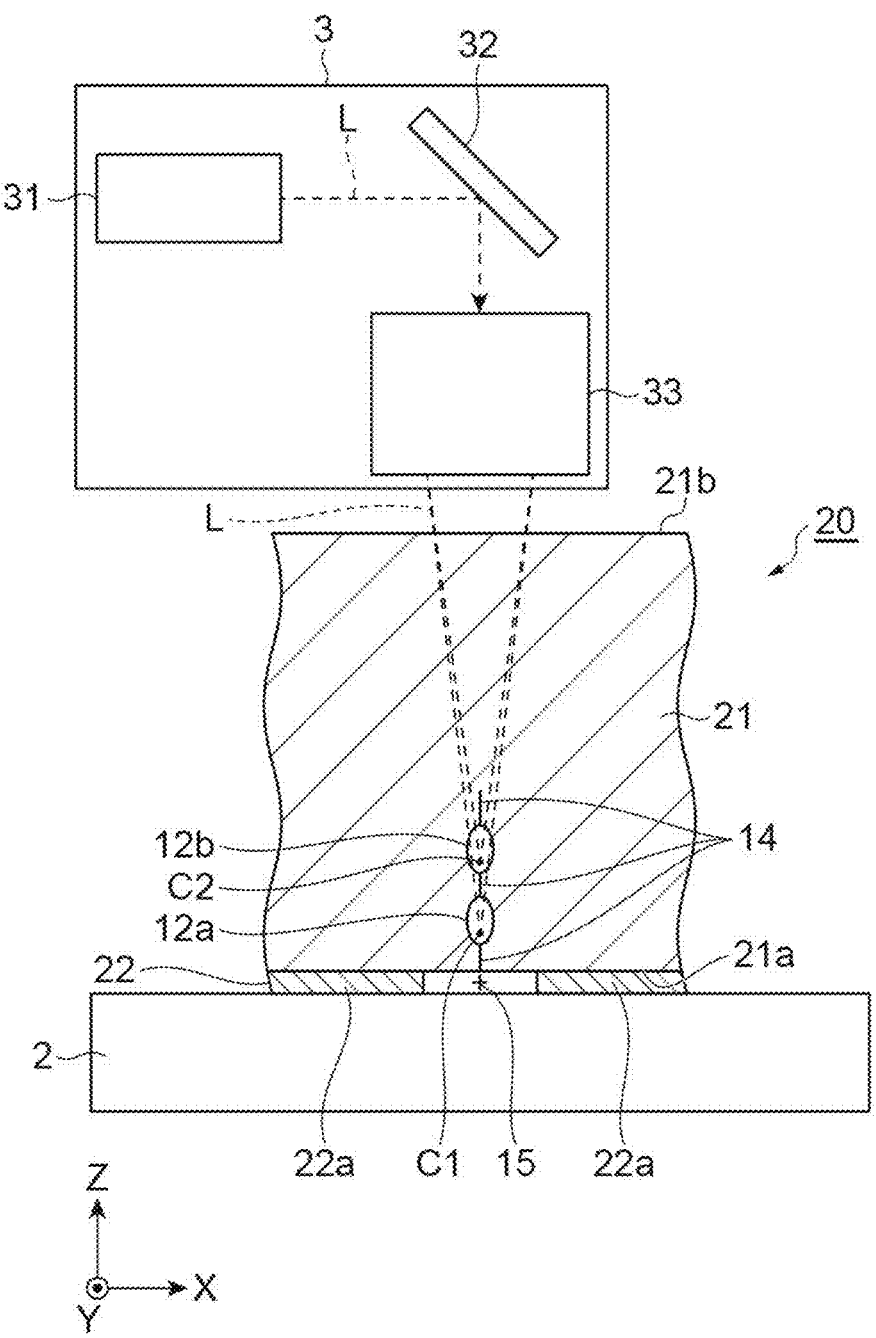
FIG. 4 is a configuration view of a laser irradiation unit shown in FIG. 1.

As shown in FIG. 4, the laser irradiation unit 3 includes a light source 31, a spatial light modulator 32, and a condenser lens 33. The light source 31 outputs the laser beam L according to, for example, a pulse oscillation method. The spatial light modulator 32 modulates the laser beam L output from the light source 31. The spatial light modulator 32 is, for example, a liquid crystal on silicon (LCOS) spatial light modulator (SLM). The condenser lens 33 condenses the laser beam L modulated by the spatial light modulator 32. Incidentally, the condenser lens 33 may be a correction ring lens.

In the present embodiment, the laser irradiation unit 3 irradiates the wafer 20 with the laser beam L from a back surface 21b side of the semiconductor substrate 21 along each of the plurality of lines 15 to form two rows of modified regions 12a and 12b inside the semiconductor substrate 21 along each of the plurality of lines 15. Of the two rows of modified regions 12a and 12b, the modified region 12a is a modified region closest to the surface 21a. Of the two rows of modified regions 12a and 12b, the modified region 12b is a modified region closest to the modified region 12a, and is a modified region closest to the back surface 21b.

The two rows of modified regions 12a and 12b are adjacent to each other in the thickness direction (Z direction) of the wafer 20. The two rows of modified regions 12a and 12b are formed by moving two condensing points C1 and C2 relative to the semiconductor substrate 21 along the line 15. For example, the laser beam L is modulated by the spatial light modulator 32 such that the condensing point C2 is located behind the condensing point C1 in a traveling direction and on the incident side of the laser beam L. Incidentally, regarding the formation of the modified regions, a single focus or a multi-focus may be used, and a single pass or a plurality of passes may be used.

The laser irradiation unit 3 irradiates the wafer 20 with the laser beam L from the back surface 21b side of the semiconductor substrate 21 along each of the plurality of lines 15. As one example, the two condensing points C1 and C2 are aligned with a position of 54 μm and with a position of 128 μm from the surface 21a in the semiconductor substrate 21 that is a single-crystal silicon <100> substrate having a thickness of 400 μm, respectively, and the wafer 20 is irradiated with the laser beam L from the back surface 21b side of the semiconductor substrate 21 along each of the plurality of lines 15. In this case, for example, in order to satisfy a condition where a crack 14 across the two rows of modified regions 12a and 12b reaches the surface 21a of the semiconductor substrate 21, the laser beam L is set to have a wavelength of 1099 nm, a pulse width of 700 nsec, and a repetition frequency of 120 kHz. In addition, an output of the laser beam L at the condensing point C1 is set to 2.7 W, an output of the laser beam L at the condensing point C2 is set to 2.7 W, and a relative movement speed of the two condensing points C1 and C2 with respect to the semiconductor substrate 21 is set to 800 mm/sec. Incidentally, for example, when the number of processing passes is set to 5, for example, ZH80 (a position of 328 μm from the surface 21a), ZH69 (a position of 283 μm from the surface 21a), ZH57 (a position of 234 μm from the surface 21a), ZH26 (a position of 107 μm from the surface 21a), and ZH12 (a position of 49.2 μm from the surface 21a) may be set as processing positions in the wafer 20 described above. In this case, for example, the laser beam L may have a wavelength of 1080 nm, a pulse width of 400 nsec, and a repetition frequency of 100 kHz, and the movement speed of the condensing points C1 and C2 may be 490 mm/sec.

Such formation of the two rows of modified regions 12a and 12b and of the crack 14 is executed in the following case. Namely, such a case is, for example, a case where, in a post-step, the back surface 21b of the semiconductor substrate 21 is ground to thin the semiconductor substrate 21 and to expose the crack 14 on the back surface 21b, and the wafer 20 is cut into a plurality of semiconductor devices along each of the plurality of lines 15.

[Configuration of Imaging Unit for Inspection]

Figure 5:
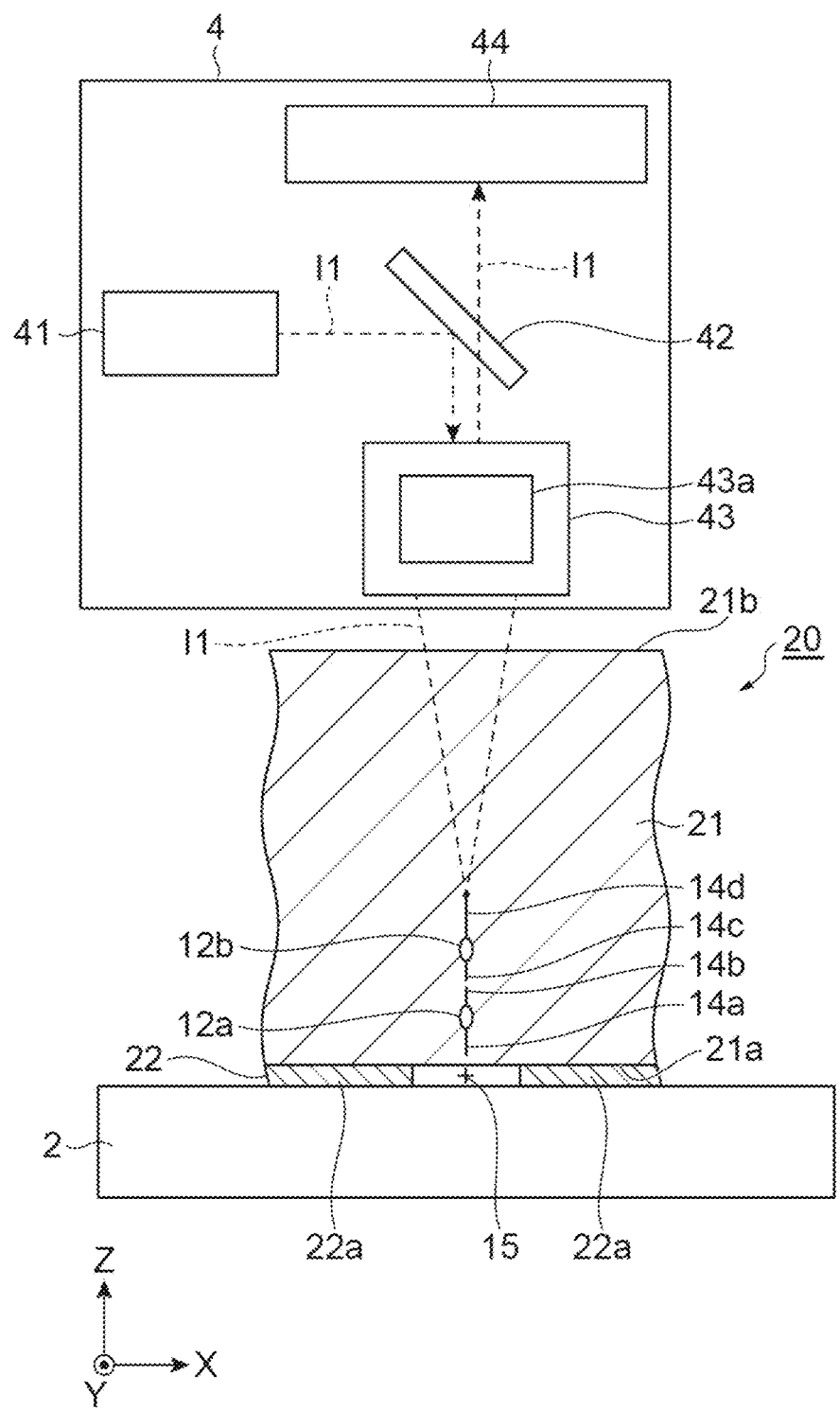
FIG. 5 is a configuration view of an imaging unit for inspection shown in FIG. 1.

As shown in FIG. 5, the imaging unit 4 (imaging unit) includes a light source 41, a mirror 42, an objective lens 43, and a light detection unit 44. The imaging unit 4 captures an image of the wafer 20. The light source 41 outputs light I1 having a property of transmitting through the semiconductor substrate 21. The light source 41 includes, for example, a halogen lamp and a filter, and outputs the light I1 in a near-infrared region. The light I1 output from the light source 41 is reflected by the mirror 42, passes through the objective lens 43, and is applied to the wafer 20 from the back surface 21b side of the semiconductor substrate 21. At this time, the stage 2 supports the wafer 20 in which the two rows of modified regions 12a and 12b are formed as described above.

The objective lens 43 passes the light I1 reflected by the surface 21a of the semiconductor substrate 21. Namely, the objective lens 43 passes the light I1 that has propagated through the semiconductor substrate 21. A numerical aperture (NA) of the objective lens 43 is, for example, 0.45 or more. The objective lens 43 includes a correction ring 43a. For example, the correction ring 43a adjusts a distance between a plurality of lenses forming the objective lens 43, to correct an aberration generated in the light I1 inside the semiconductor substrate 21. Incidentally, means for correcting an aberration is not limited to the correction ring 43a, and may be other correction means such as a spatial light modulator. The light detection unit 44 detects the light I1 that has transmitted through the objective lens 43 and through the mirror 42. The light detection unit 44 is configured as, for example, an InGaAs camera, and detects the light I1 in the near-infrared region. Incidentally, means for detecting (capturing an image) the light I1 in the near-infrared region is not limited to the InGaAs camera, and may be other imaging means such as a transmission confocal microscope as long as the other imaging means can capture a transmissive image.

The imaging unit 4 can capture an image of each of the two rows of modified regions 12a and 12b and of a tip of each of a plurality of cracks 14a, 14b, 14c, and 14d (details will be described later). The crack 14a is a crack extending from the modified region 12a toward a surface 21a side. The crack 14b is a crack extending from the modified region 12a toward the back surface 21b side. The crack 14c is a crack extending from the modified region 12b toward the surface 21a side. The crack 14d is a crack extending from the modified region 12b toward the back surface 21b side.

[Configuration of Imaging Unit for Alignment Correction]

Figure 6:
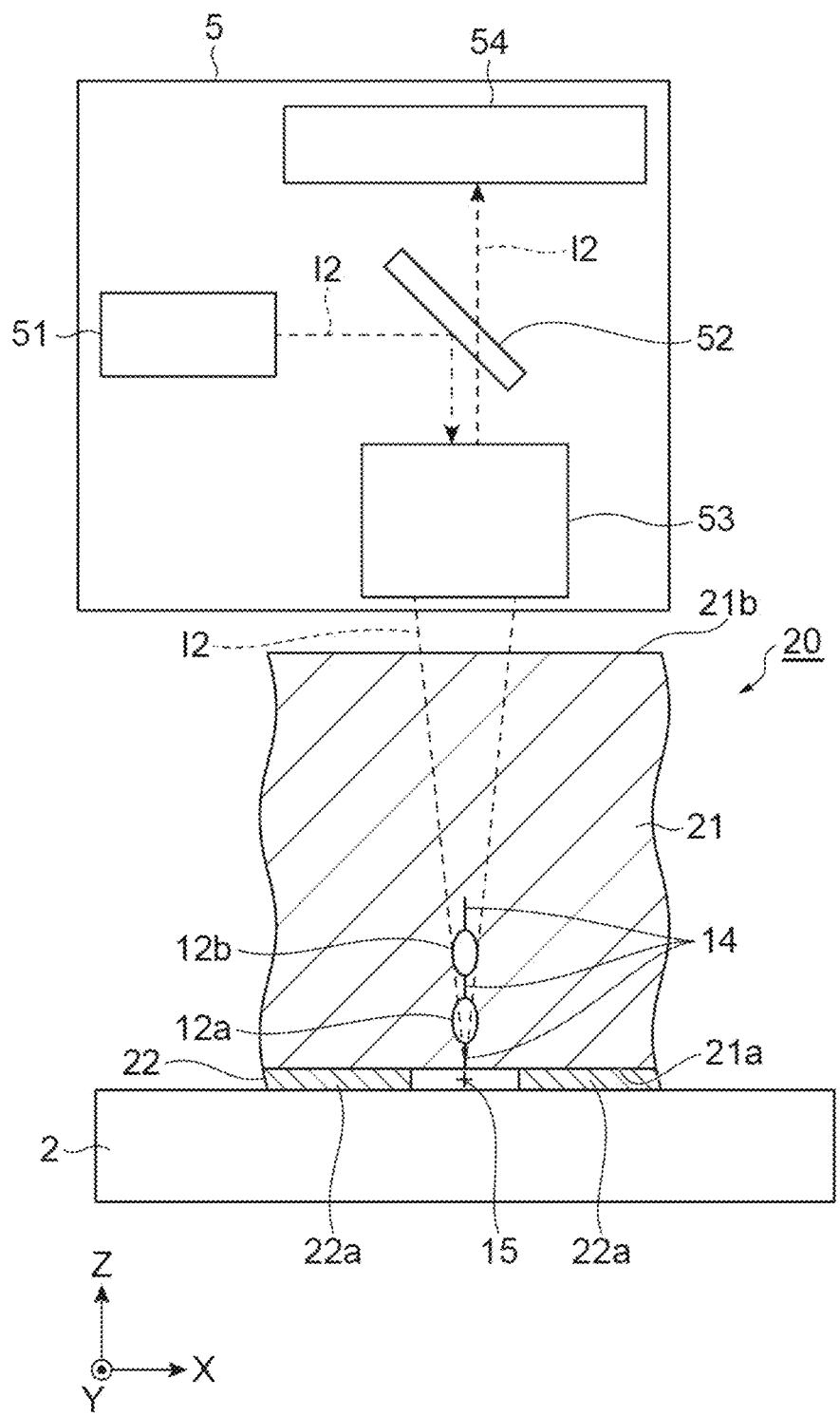
FIG. 6 is a configuration view of an imaging unit for alignment correction shown in FIG. 1.

As shown in FIG. 6, the imaging unit 5 includes a light source 51, a mirror 52, a lens 53, and a light detection unit 54. The light source 51 outputs light 12 having a property of transmitting through the semiconductor substrate 21. The light source 51 includes, for example, a halogen lamp and a filter, and outputs the light 12 in the near-infrared region. The light source 51 and the light source 41 of the imaging unit 4 may be common to each other. The light 12 output from the light source 51 is reflected by the mirror 52, passes through the lens 53, and is applied to the wafer 20 from the back surface 21b side of the semiconductor substrate 21.

The lens 53 passes the light 12 reflected by the surface 21a of the semiconductor substrate 21. Namely, the lens 53 passes the light 12 that has propagated through the semiconductor substrate 21. A numerical aperture of the lens 53 is 0.3 or less. Namely, the numerical aperture of the objective lens 43 of the imaging unit 4 is larger than the numerical aperture of the lens 53. The light detection unit 54 detects the light 12 that has passed through the lens 53 and through the mirror 52. The light detection unit 54 is configured as, for example, an InGaAs camera and detects the light 12 in the near-infrared region.

Under control of the control unit 8, the imaging unit 5 irradiates the wafer 20 with the light 12 from the back surface 21b side and detects the light 12 returning from the surface 21a (functional element layer 22), to capture an image of the functional element layer 22. In addition, similarly, under control of the control unit 8, the imaging unit 5 irradiates the wafer 20 with the light 12 from the back surface 21b side and detects the light 12 returning from formation positions of the modified regions 12a and 12b in the semiconductor substrate 21, to acquire images of regions including the modified regions 12a and 12b. These images are used for the alignment of the irradiation position of the laser beam L. The imaging unit 6 has the same configuration as that of the imaging unit 5 except that the lens 53 has a lower magnification (for example, the lens 53 of the imaging unit 5 has a magnification of 6, and a lens of the imaging unit 6 has a magnification of 1.5), and is used for alignment similarly to the imaging unit 5.

[Imaging Principle of Imaging Unit for Inspection]

Figure 7:
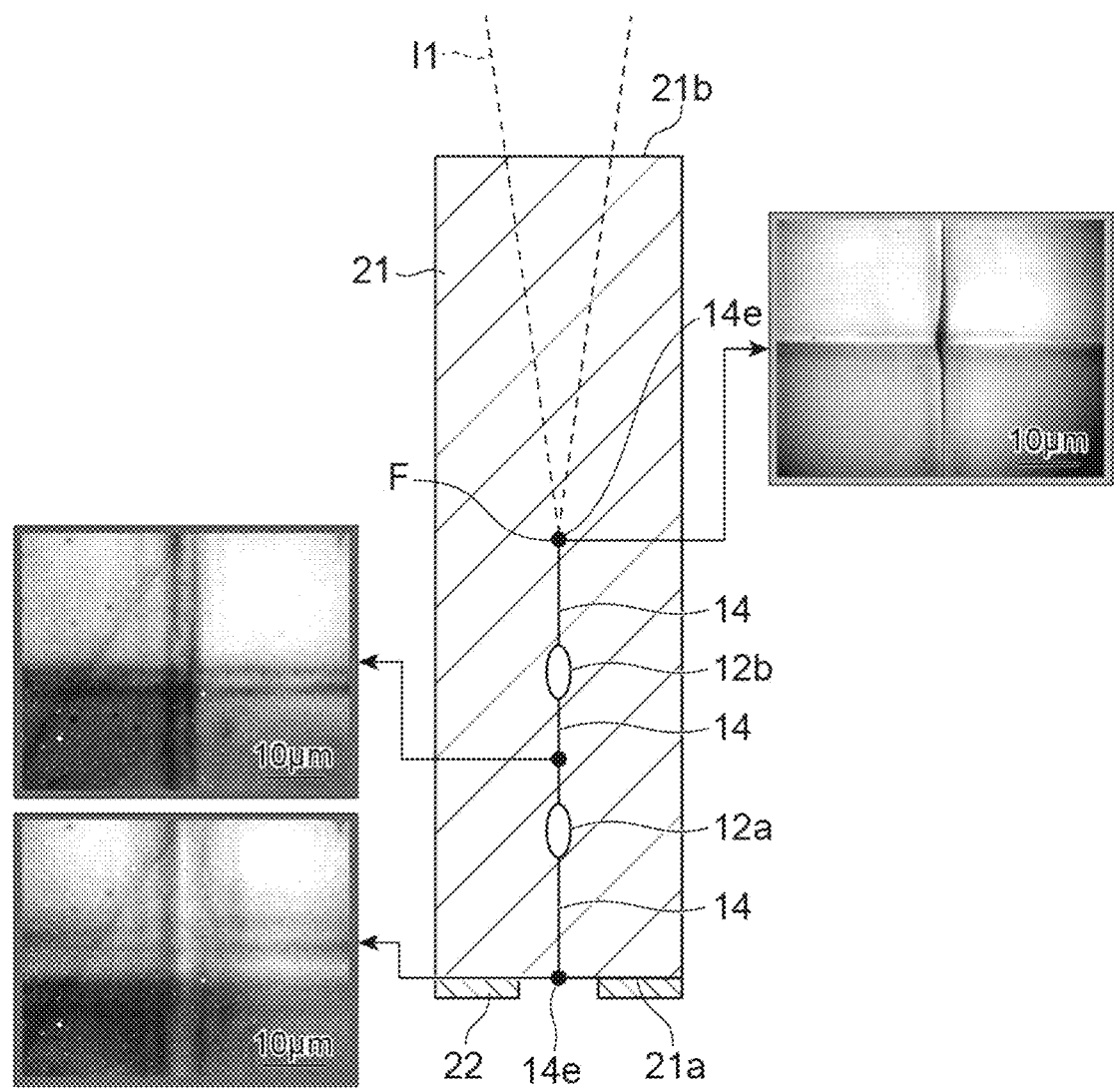
FIG. 7 is a cross-sectional view of a wafer for describing an imaging principle of the imaging unit for inspection shown in FIG. 5, and shows images captured at each spot by the imaging unit for inspection.

As shown in FIG. 7, the imaging unit 4 shown in FIG. 5 is used to move a focus F (a focus of the objective lens 43) from the back surface 21b side toward the surface 21a side in the semiconductor substrate 21 in which the crack 14 across the two rows of modified regions 12a and 12b reaches the surface 21a. In this case, when the focus F is aligned with a tip 14e of the crack 14 from the back surface 21b side, the crack 14 extending from the modified region 12b toward the back surface 21b side, the tip 14e can be checked (a right image in FIG. 7). However, even when the focus F is aligned with the crack 14 itself and with the tip 14e of the crack 14 reaching the surface 21a, from the back surface 21b side, the crack 14 and the tip 14e of the crack 14 cannot be checked (left images in FIG. 7). Incidentally, when the focus F is aligned with the surface 21a of the semiconductor substrate 21 from the back surface 21b side, the functional element layer 22 can be checked.

Figure 8:
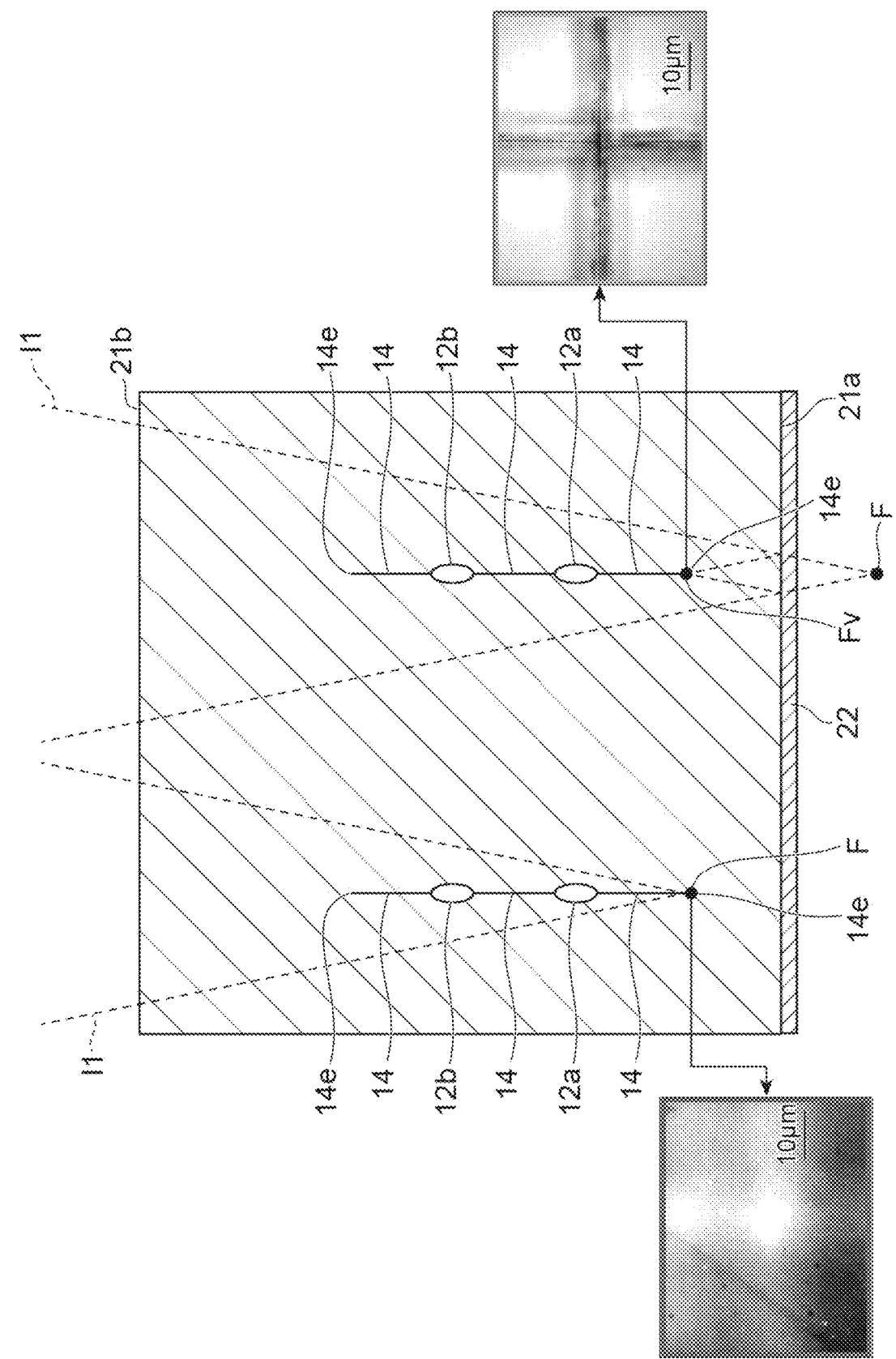
FIG. 8 is a cross-sectional view of a wafer for describing the imaging principle of the imaging unit for inspection shown in FIG. 5, and shows images captured at each spot by the imaging unit for inspection.

In addition, as shown in FIG. 8, the imaging unit 4 shown in FIG. 5 is used to move the focus F from the back surface 21b side toward the surface 21a side in the semiconductor substrate 21 in which the crack 14 across the two rows of modified regions 12a and 12b does not reach the surface 21a. In this case, even when the focus F is aligned with the tip 14e of the crack 14 extending from the modified region 12a toward the surface 21a side, from the back surface 21b side, the tip 14e cannot be checked (a left image in FIG. 8). However, when the focus F is aligned with a region opposite the back surface 21b with respect to the surface 21a (namely, a region on a functional element layer 22 side with respect to the surface 21a), from the back surface 21b side, and an imaginary focus Fv that is symmetric to the focus F with respect to the surface 21a is located at the tip 14e, the tip 14e can be checked (a right image in FIG. 8). Incidentally, the imaginary focus Fv is a point that is symmetric to the focus F with respect to the surface 21a and that is set in consideration of a refractive index of the semiconductor substrate 21.

Figure 9:
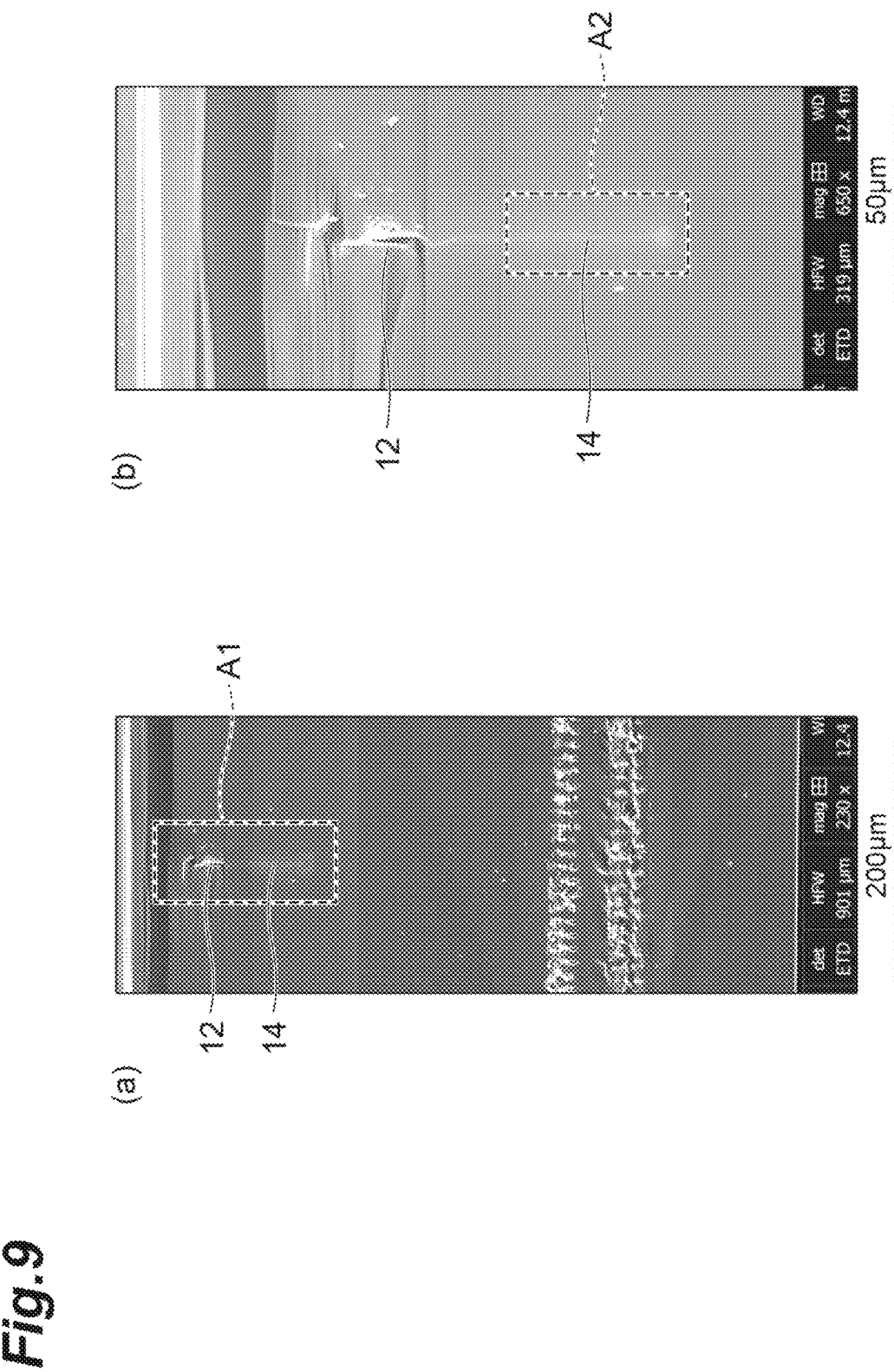
FIG. 9 shows SEM images of a modified region and a crack formed inside a semiconductor substrate.
Figure 10:
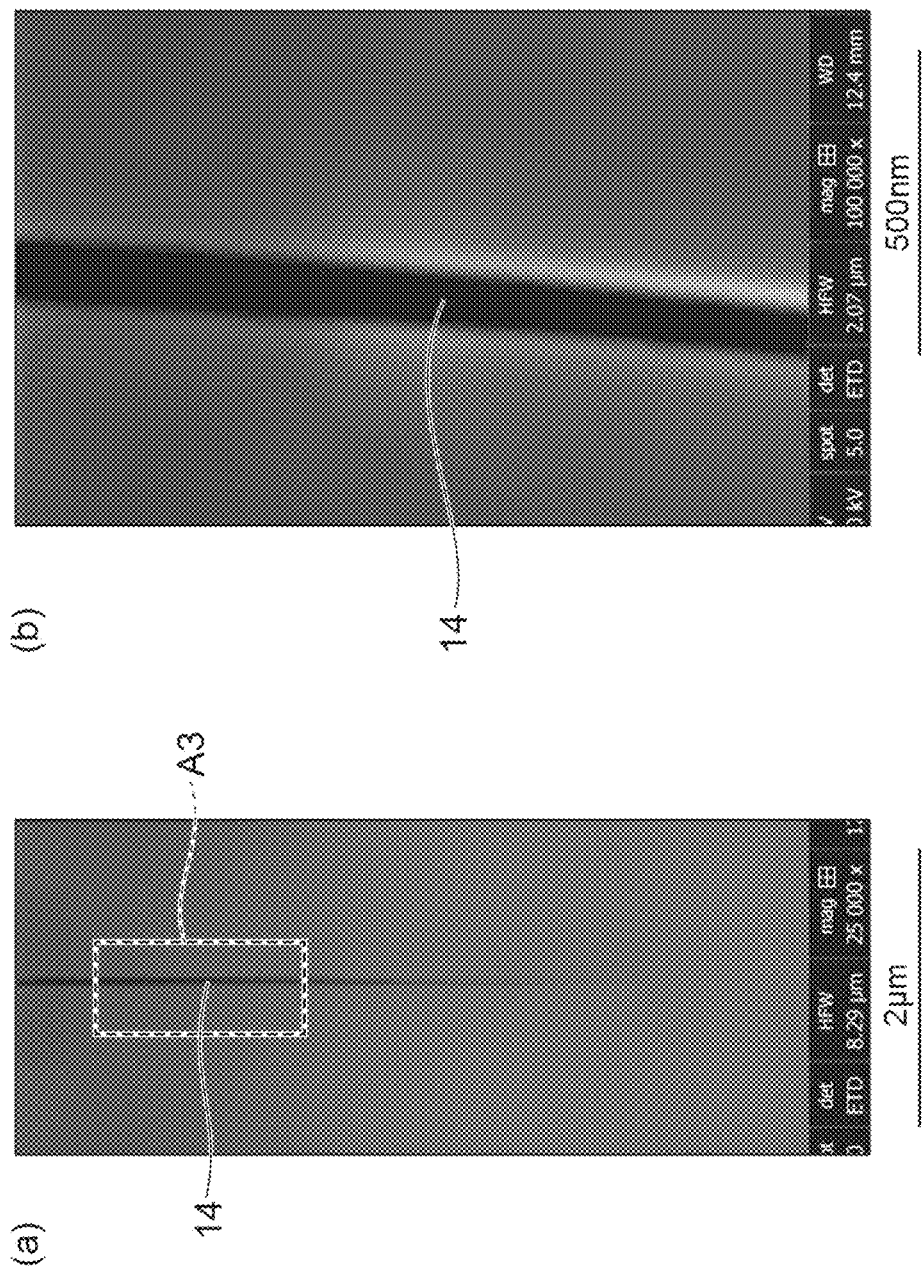
FIG. 10 shows SEM images of the modified region and the crack formed inside a semiconductor substrate.

It is assumed that the reason the crack 14 itself cannot be checked as described above is that a width of the crack 14 is smaller than a wavelength of the light I1 that is illumination light. FIGS. 9 and 10 show scanning electron microscope (SEM) images of the modified region 12 and of the crack 14 formed inside the semiconductor substrate 21 that is a silicon substrate. FIG. 9(b) is an enlarged image of a region A1 shown in FIG. 9(a), FIG. 10(a) is an enlarged image of a region A2 shown in FIG. 9(b), and FIG. 10(b) is an enlarged image of a region A3 shown in FIG. 10(a). As described above, the width of the crack 14 is approximately 120 nm, and is smaller than the wavelength (for example, 1.1 to 1.2 μm) of the light I1 in the near-infrared region.

An imaging principle assumed based on the above is as follows. As shown in FIG. 11(a), when the focus F is located in the air, the light I1 does not return, so that a blackish image is obtained (a right image in FIG. 11(a)). As shown in FIG. 11(b), when the focus F is located inside the semiconductor substrate 21, the light I1 reflected by the surface 21a returns, so that a whitish image is obtained (a right image in FIG. 11(b)). As shown in FIG. 11(c), when the focus F is aligned with the modified region 12 from the back surface 21b side, the absorption, the scattering, or the like of some of the light I1 that is reflected by the surface 21a to return is caused by the modified region 12, so that an image is obtained in which the modified region 12 appears blackish in the whitish background (a right image in FIG. 11(c)).

Figure 12:
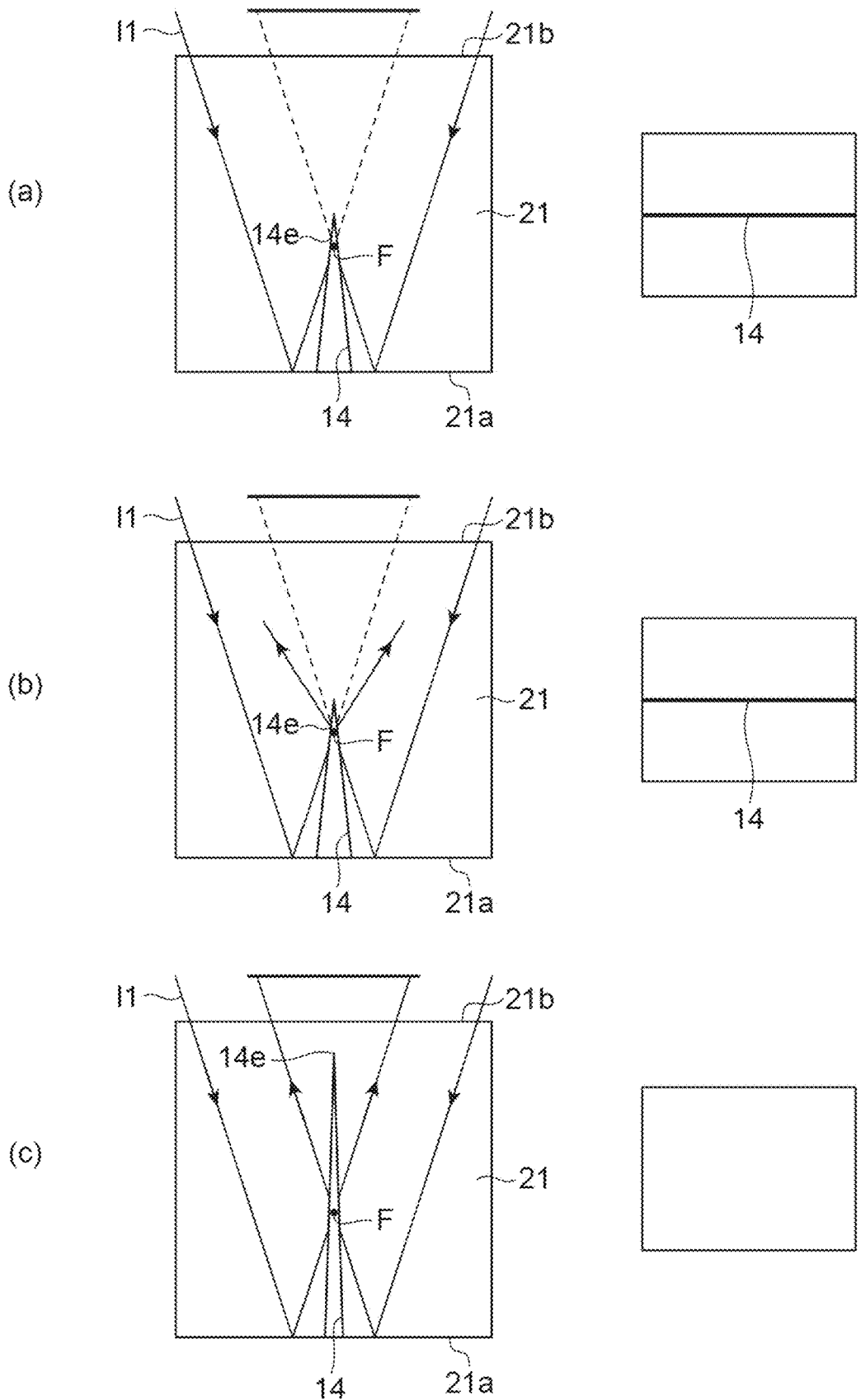
FIG. 12 shows optical path views for describing the imaging principle of the imaging unit for inspection shown in FIG. 5, and schematic views showing images captured at a focus by the imaging unit for inspection.

As shown in FIGS. 12(a) and 12(b), when the focus F is aligned with the tip 14e of the crack 14 from the back surface 21b side, the scattering, the reflection, the interference, the absorption, or the like of some of the light I1 that is reflected by the surface 21a to return is caused, for example, by optical singularities (stress concentration, strain, a discontinuity of atomic density, and the like) occurring in the vicinity of the tip 14e, and by light confinement occurring in the vicinity of the tip 14e, so that images are obtained in which the tip 14e appears blackish in the whitish background (right images in FIGS. 12(a) and 12(b)). As shown in FIG. 12(c), when the focus F is aligned with a portion other than the vicinity of the tip 14e of the crack 14 from the back surface 21b side, at least some of the light I1 reflected by the surface 21a returns, so that a whitish image is obtained (a right image in FIG. 12(c)).

[Processing Condition Derivation Process]

Hereinafter, a processing condition derivation process to be executed as a pre-process of a process of forming modified regions for the purpose of cutting the wafer 20 or the like will be described. Incidentally, processes such as the processing condition determination process to be described below may be executed in processes other than the processing condition derivation process, for example, in various inspection processes to be executed after a processing condition is derived. The processing condition is a recipe related to processing that indicates in which conditions and procedures the wafer 20 is processed.

Figure 13:
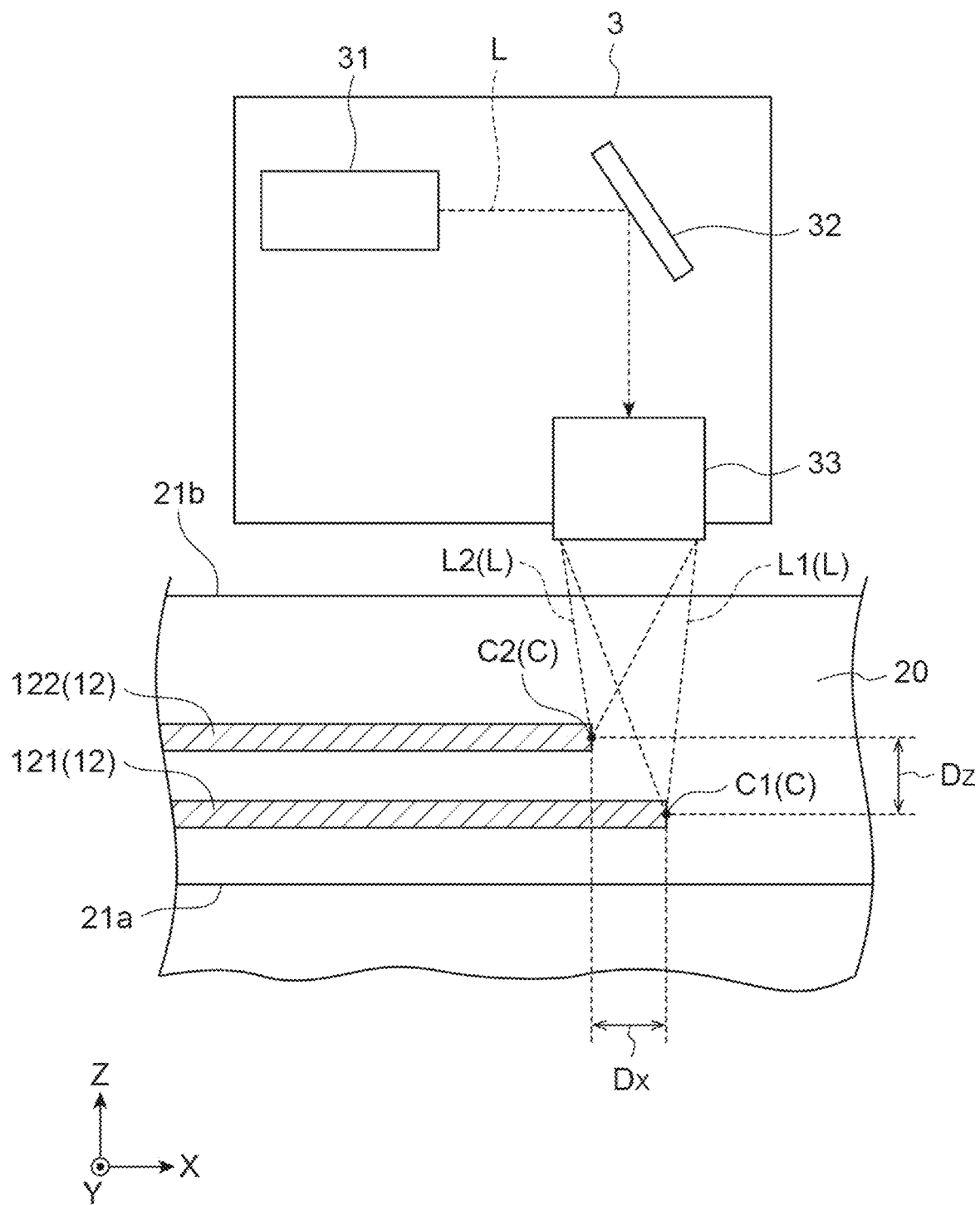
FIG. 13 is a view for describing an example of processing by the laser irradiation unit.
Figure 14:
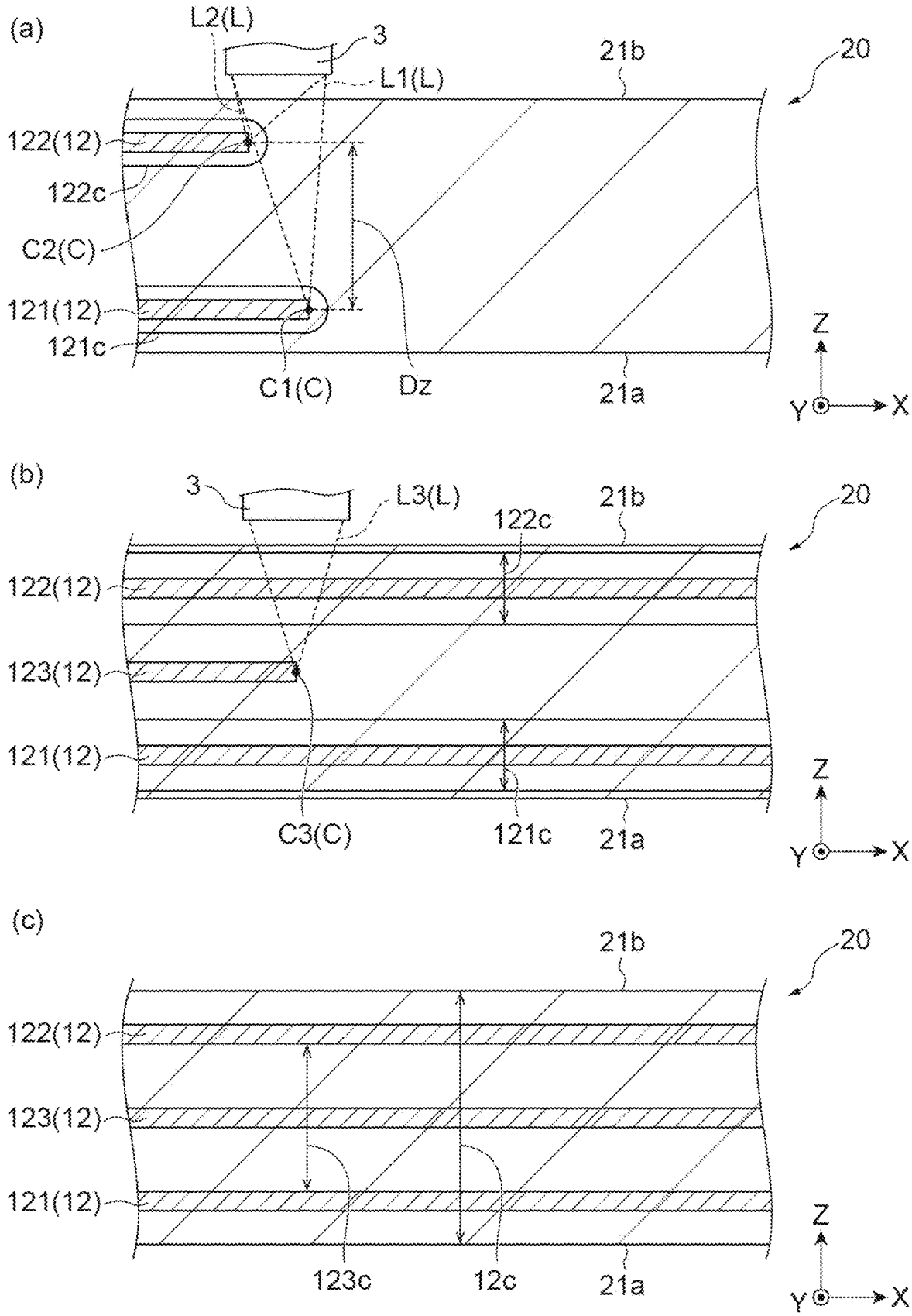
FIG. 14 shows views for describing an example of processing by the laser irradiation unit.

First, a processing method for which a processing condition is to be derived will be described with reference to FIGS. 13 and 14. FIGS. 13 and 14 show views for illustrating an example of processing by the laser irradiation unit 3. As shown in FIG. 13, the laser irradiation unit 3 improves a formation speed of modified regions by forming the modified regions while forming a plurality of condensing points of the laser beam. In the example shown in FIG. 13, the spatial light modulator 32 displays a branching pattern for causing at least the laser beam L to branch into a plurality (here, two) of laser beams. Accordingly, the laser beam L incident on the spatial light modulator 32 branches into two laser beams L1 and L2 in the spatial light modulator 32, and the two laser beams L1 and L2 are condensed by the condenser lens 33 to form the condensing point C1 and the condensing point C2.

The spatial light modulator 32 causes the laser beam L to branch at least such that the condensing point C1 and the condensing point C2 are formed at different positions in the Z direction intersecting the back surface 21b of the wafer 20 that is an incident surface of the laser beam L. Namely, the laser irradiation unit 3 applies the laser beam such that a plurality of condensing points are simultaneously formed in the thickness direction of the wafer 20. For this reason, two rows of a modified region 121 and a modified region 122 are formed as the modified regions 12 at positions different from each other in the Z direction by moving the condensing point C1 and the condensing point C2 relative to each other with respect to the wafer 20. The modified region 121 corresponds to the laser beam L1 and to the condensing point C1 thereof, and the modified region 122 corresponds to the laser beam L2 and the condensing point C2 thereof. The condensing point C1 and the modified region 121 are located on a side opposite the back surface 21b (surface 21a side of the wafer 20) with respect to the condensing point C2 and to the modified region 122 The spatial light modulator 32 adjusts the branching pattern to vary a distance Dz (longitudinal branch amount) between the condensing point C1 and the condensing point C2 in the Z direction. Furthermore, the spatial light modulator 32 can change a distance Dx (lateral branch amount) between the condensing point C1 and the condensing point C2 in a horizontal direction (in the illustrated example, the X direction) when causing the laser beam L to branch into the laser beams L1 and L2. In the example of FIG. 13, the spatial light modulator 32 sets the distance Dx to be larger than 0 such that the condensing point C1 is located in front of the condensing point C2 in the X direction (processing progress direction).

Here, when the laser beam is applied to simultaneously form the plurality of condensing points C1 and C2 in the thickness direction of the wafer 20, a crack extending from a modified region (for example, the modified region 121) formed at one condensing point (for example, the condensing point C1) may affect the formation of a modified region (for example, the modified region 122) at the other condensing point (for example, the condensing point C2) and the extension of a crack thereof. In this case, the crack amount at the other condensing point becomes unstable, so that when the wafer 20 is cut with the crack as a boundary, the quality of a cut surface, namely, the processing quality decreases, which is a problem.

On the other hand, for example, in the processing example shown in FIG. 14, the distance Dz between the condensing point C1 and the condensing point C2 in the Z direction is relatively large. Accordingly, as shown in FIGS. 14(a) and 14(b), the laser beams L1 and L2 are applied such that a crack 121c extending from the modified region 121 and a crack 122c extending from the modified region 122 are not connected to each other. Then, in the processing example shown in FIG. 14, as shown in FIGS. 14(b) and 14(c), a laser beam L3 is applied such that a condensing point C3 of the laser beam L3 is formed at a position between the condensing point C1 and the condensing point C2, to form a crack 123c that extends from a modified region 123 formed at the third condensing point C3 and that traverses the modified region 121 and the modified region 122. The crack 122c and the crack 121c further extend because of the formation of the crack 123c, and a crack 12c traversing from the surface 21a to the back surface 21b is formed as a whole.

As described above, according to the processing method in which outer SD layers (modified regions 121 and 122) that are sufficiently separated from each other such that cracks are not connected to each other are formed, and then an inner SD layer (modified region 123) is formed between the outer SD layers in the thickness direction of the wafer 20, as for modified regions to be simultaneously formed, a crack extending from one modified region does not affect the formation of the other modified region and the extension of a crack of the other modified region, and the wafer 20 can be appropriately processed into a full-cut state while suppressing a reduction in processing quality. The full-cut state is a state where cracks have reached the back surface 21b and the surface 21a in the wafer 20. Incidentally, a state where, even when there are very few spots inside the wafer 20 where the cracks 14 are not connected to each other, the spots where the cracks 14 are connected to each other are at a level at which the wafer 20 can be diced by a standard expand tape (for example, an expand tape having an expansion distance of 15 mm and an expansion rate of 5 mm/sec) is regarded as the full-cut state. The very few spots where the cracks 14 are not connected to each other are a resolidified spot (spot that is resolidified after being melt when laser irradiation is performed) in a modified layer portion, a black streak spot where the cracks 14 are not intentionally connected to each other to improve chip quality, and the like. However, as for the processing method as described above, the steps are complicated, and it is difficult to appropriately set a processing condition suitable for the processing method. Hereinafter, a processing condition derivation process when the wafer 20 is processed by the above-described processing method (processing method in which outer SD layers that are sufficiently separated from each other such that cracks are not connected to each other, and then an inner SD layer is formed between the outer SD layers) will be described. Hereinafter, the processing condition derivation process when the wafer 20 is processed into the full-cut state by the above-described processing method will be described. Incidentally, full-cut processing may be performed by causing the laser beam to be incident from the back surface 21b side of the wafer 20, or may be performed by causing the laser beam to be incident from the surface 21a side of the wafer 20.

Figure 15:
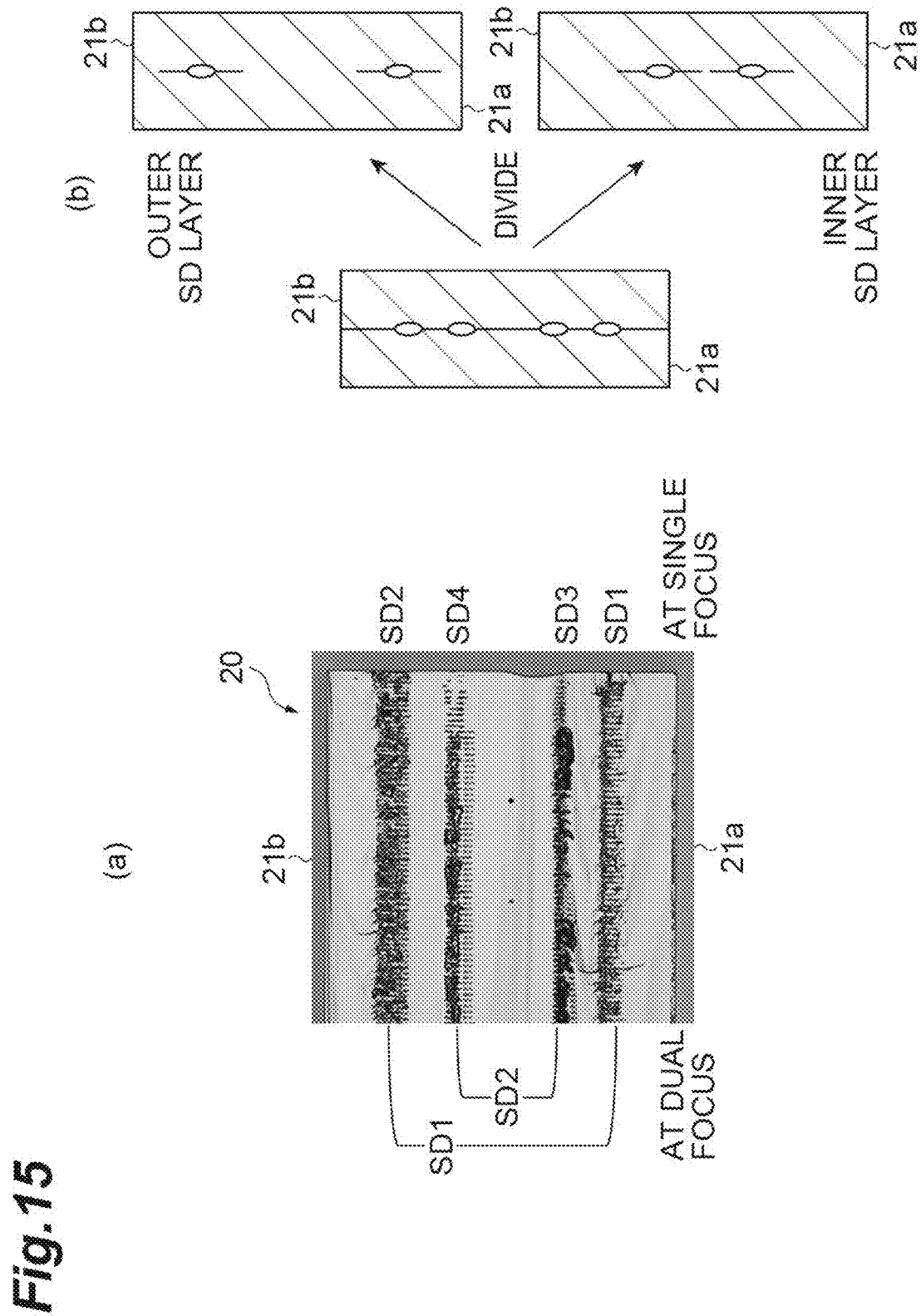
FIG. 15 shows views for describing a processing condition derivation process.

In the above-described processing method, outer SD layers are formed, and then an inner SD layer is formed between the outer SD layer. As such a processing method, for example, as shown in FIG. 15(a), a pattern in which with dual focus, initially, a pair of outer SD layers (SD1 and SD1) are formed and then a pair of inner SD layers (SD2 and SD2) are formed, a pattern in which with a single focus, an outer SD layer on the surface 21a side (SD1), an outer SD layer on the back surface 21b side (SD2), an inner SD layer on the surface 21a side (SD3), and an inner SD layer on the back surface 21b side (SD4) are formed in order, and the like are considered. Both patterns are common in that the outer SD layers are formed and then inner SD layers are formed. Then, in the case of such a processing method, for example, it is necessary to separately set a processing condition related to the formation of the outer SD layers and a processing condition related to the formation of the inner SD layers. Therefore, in the processing condition derivation process according to the present embodiment, as shown in FIG. 15(b), whether or not the processing condition is proper is determined not only in a final processed state of the wafer 20 but also in each of a state where only the outer SD layers are processed and a state where only the inner SD layers are formed, and processing condition is derived based on a determination result of whether or not each processing condition is proper.

Specifically, the control unit 8 sequentially executes an outer SD layer-forming process (first process) of controlling the laser irradiation unit 3 according to a first processing condition set such that only outer SD layers are formed; a process (second process) of determining whether or not the first processing condition is proper, based on a state related to the outer SD layers formed in the outer SD layer-forming process; an inner SD layer-forming process (fifth process) of controlling the laser irradiation unit 3 according to a third processing condition set such that only inner SD layers are formed; a process (sixth process) of determining whether or not the third processing condition is proper, based on a state related to the inner SD layers formed in the inner SD layer-forming process; an all SD layers-forming process (third process) of controlling the laser irradiation unit 3 according to a second processing condition set such that the outer SD layers and the inner SD layers are formed; and a process (fourth process) of determining whether or not the second processing condition is proper, based on a state related to each of the outer SD layers and the inner SD layers formed in the all SD layers-forming process. Then, the control unit 8 decides a final processing condition based on a determination result of each processing condition (details will be described later). Hereinafter, each process performed by the control unit 8 will be described in detail.

(Outer SD Layer-Forming Process and Process of Determining Whether or not First Processing Condition is Proper)

Figure 16:
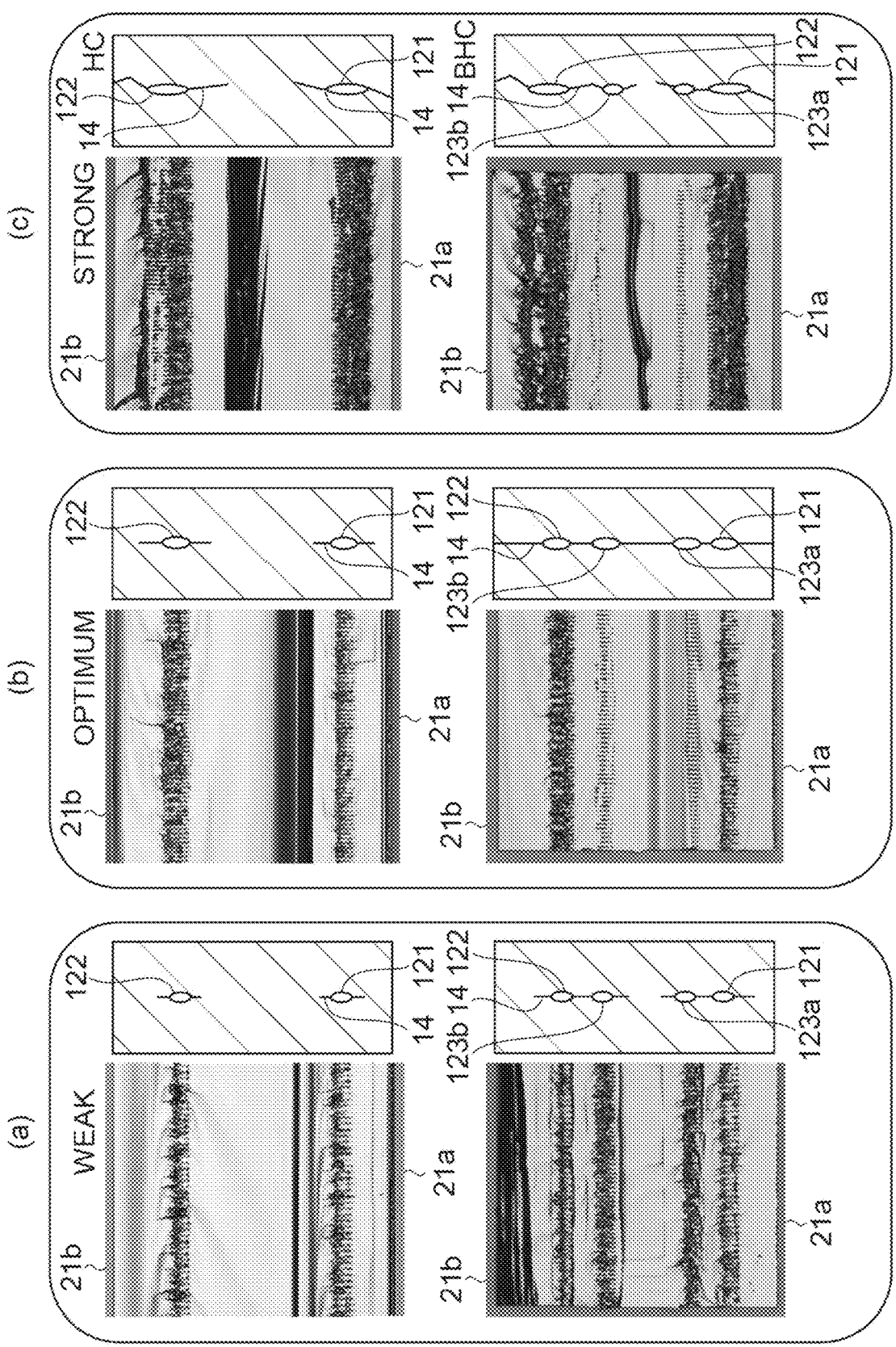
FIG. 16 shows views for describing states of wafers according to the processed states of outer SD layers.

The control unit 8 performs the outer SD layer-forming process of controlling the laser irradiation unit 3 according to the first processing condition set such that as shown in FIG. 16 and the like, the modified region 121 (first modified region) and the modified region 122 (second modified region) that are outer SD layers are formed inside the wafer 20 by irradiating the wafer 20 with the laser beam, the modified region 122 being located closer to the back surface 21b side than the modified region 121 and the back surface 21b being an incident surface of the laser beam. The control unit 8 provisionally decides the first processing condition including laser beam irradiation conditions of the laser irradiation unit 3, based on information received by, for example, the display 150 (refer to FIG. 25). The processing condition includes, for example, pulse energy of the laser beam (including an output and a frequency adjustment), aberration correction, a pulse width, a pulse pitch, the number of modified layers, the number of condensing points, and the like. The information received by the display 150 (refer to FIG. 25) includes, for example, a wafer thickness, a final processing target (full-cut or the like), and the like.

After the outer SD layer-forming process, the control unit 8 identifies a state related to each of the modified region 121 and the modified region 122 that are outer SD layers, based on a signal (namely, an imaging result) output from the imaging unit 4, and determines whether or not the first processing condition for forming the outer SD layers (first processing condition that is provisionally decided) is proper, based on the identified information. The control unit 8 identifies a state of each of the modified regions 121 and 122 and a state of each of the cracks 14 extending from the modified regions 121 and 122, as the state related to each of the modified regions 121 and 122.

FIG. 16 shows views for illustrating states of the wafers 20 according to the processed states of outer SD layers. In FIGS. 16(a) to 16(c), the upper parts show states of cross-sections of the wafers 20 when only outer SD layers are formed, and the lower parts show states of cross-sections of the wafers 20 when inner SD layers are further formed from the states shown in the upper parts. FIG. 16(a) shows a state where a dicing force (force related to cutting) applied to the wafer 20 by the laser beam applied to form the outer SD layers is weak, FIG. 16(b) shows a state where the dicing force is optimal, and FIG. 16(c) shows a state where the dicing force is strong.

In a case where the dicing force of the laser beam for forming the outer SD layers is proper as shown in FIG. 16(b), when the inner SD layers (modified regions 123a and 123b) are formed to be continuous with the outer SD layers as shown in the lower part of FIG. 16(b), the full-cut state where the cracks 14 have reached the back surface 21b and the surface 21a in the wafer 20 is attained. In addition, a meandering width of the crack 14 in a direction intersecting the thickness direction of the wafer 20 can also be suppressed to a predetermined value or less (for example, 2 μm or less) or the like. In this case, the wafer 20 can be completely diced (cut) such that a dicing residual does not occur after the processing. For this reason, when the state related to each of the modified region 121 and the modified region 122 that are outer SD layers is the state shown in the upper part of FIG. 16(b), the control unit 8 determines that the first processing condition is proper (details of a determination method will be described later).

On the other hand, for example, as shown in the upper part of FIG. 16(a), when the dicing force for forming the outer SD layers is weak, the extension amounts of the cracks 14 extending from the modified region 121 and from the modified region 122 become short, and as shown in the lower part of FIG. 16(a), even when the inner SD layers (modified regions 123a and 123b) are formed thereafter, the full-cut state where the cracks 14 have reached the back surface 21b and the surface 21a in the wafer 20 is not attained. In this case, a dicing residual occurs after the processing (for example, approximately 30% of the wafer 20 becomes a dicing residual), and the processing quality cannot be ensured. For this reason, when the state related to each of the modified region 121 and the modified region 122 that are outer SD layers is the state shown in the upper part of FIG. 16(a), the control unit 8 determines that the first processing condition is not proper (details of the determination method will be described later). In addition, for example, as shown in the upper part of FIG. 16(c), when the dicing force for forming the outer SD layers is strong, the extension amounts of the cracks 14 are too large, so that even though the inner SD layers are not formed yet, the processed state becomes a half-cut (HC) state where the crack 14 has reached the back surface 21b or a bottom side half-cut (BHC) state where the crack 14 has reached the surface 21a. In this case, the meandering amount of the crack 14 also increases. Then, as shown in the lower part of FIG. 16(c), since the cracks 14 of the outer SD layers that have a large extension amount interfere with the formation of the inner SD layers, it is difficult to obtain the full-cut state, a dicing residual occurs after the processing (for example, approximately 10% of the wafer 20 becomes a dicing residual), and the processing quality cannot be ensured. For this reason, when the state related to each of the modified region 121 and the modified region 122 that are outer SD layers is the state shown in the upper part of FIG. 16(c), the control unit 8 determines that the first processing condition is not proper (details of the determination method will be described later).

Figure 18:
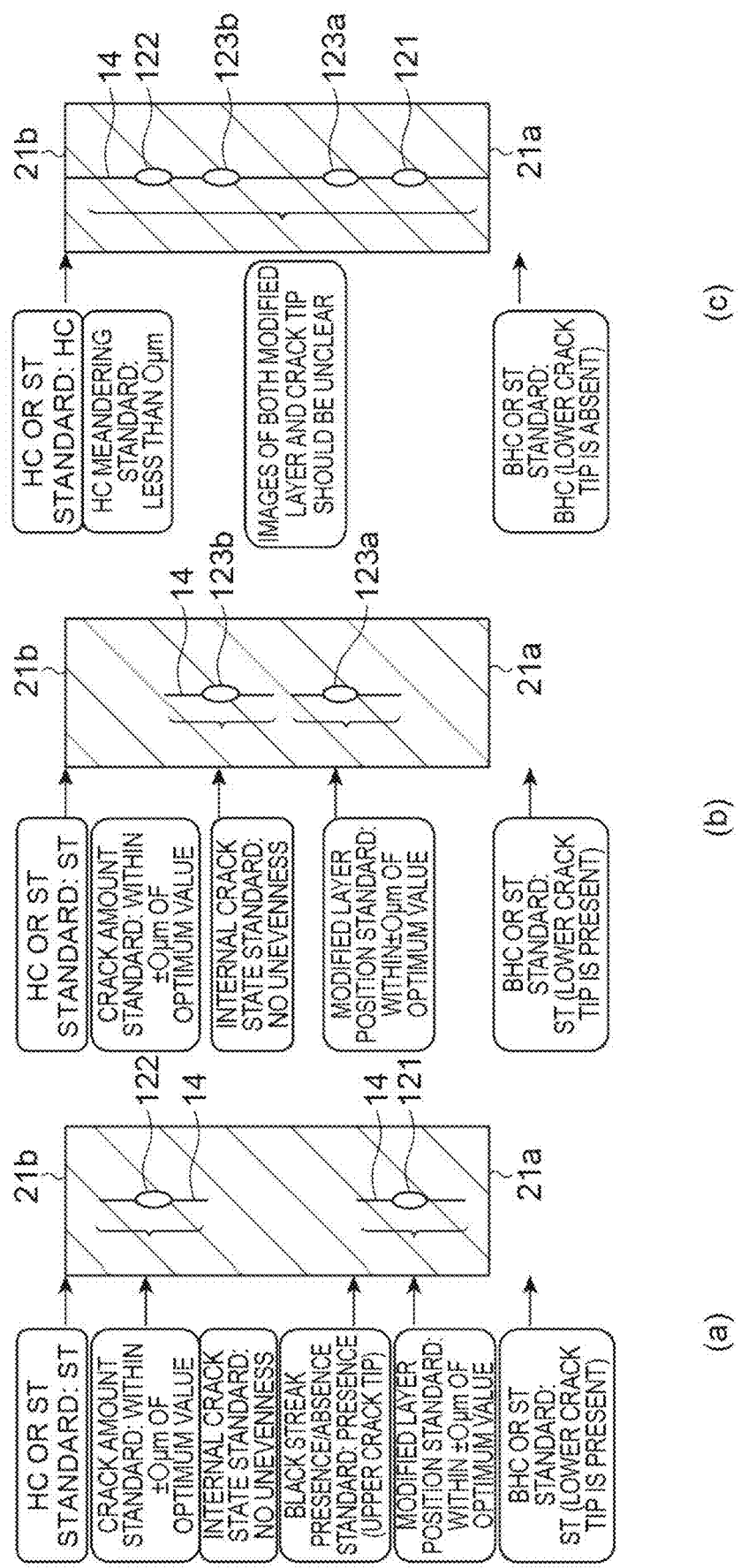
FIG. 18 shows views for describing a determination process.
Figure 19:
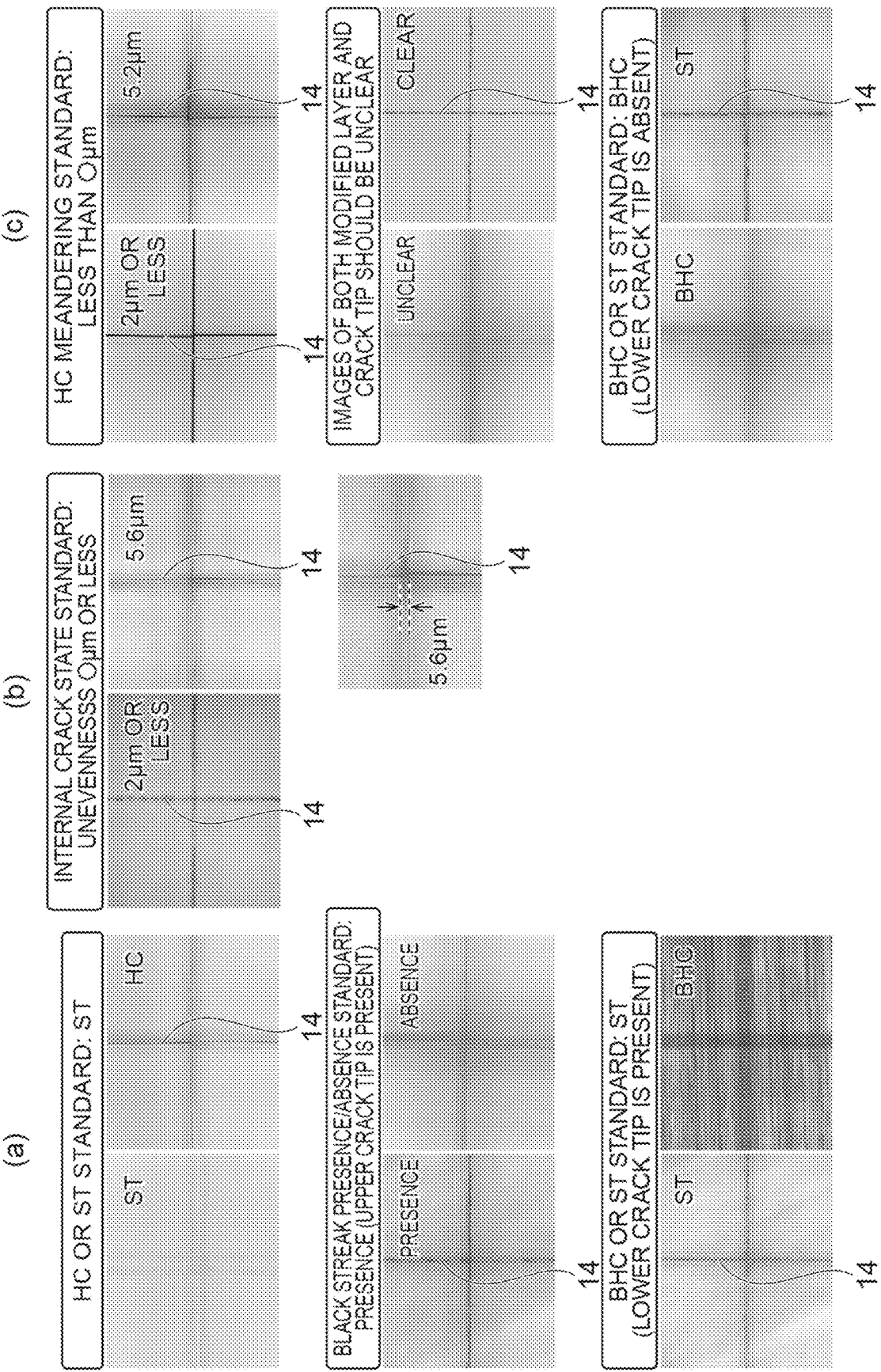
FIG. 19 shows views for describing the determination process.

Details of the determination method for the first processing condition will be described with reference to FIGS. 18(a) and 19(a). The control unit 8 determines whether or not the first processing condition is proper, based on internal observation results acquired while aligning the focus F with each point from the back surface 21b side using the imaging unit 4. As shown in FIG. 18(a), based on an internal observation result, the control unit 8 identifies information of whether or not the crack 14 extends to the back surface 21b (whether or not the wafer 20 is in the HC state), information of a crack amount inside the wafer 20 (extension amount of the crack 14), of presence or absence of unevenness of the crack 14 inside the wafer 20, of presence or absence of a black streak (whether or not a tip of an upper crack that is the crack 14 extending from the modified region 121 to the back surface 21b side is observed), of modified layer positions (positions of the modified regions 121 and 122), of whether or not the crack 14 extends to the surface 21a (whether or not the wafer 20 is in the BHC state), and the like. FIG. 19(a) shows a part of an internal observation result (including an observation result of the back surface 21b that is an incident surface) of the wafer 20 when the outer SD layers are formed. The upper part of FIG. 19(a) shows an observation result of the back surface 21b that is an incident surface. As shown in the upper part of FIG. 19(a), when the crack 14 has reached the back surface 21b (HC state), the crack 14 is observed on the back surface 21b that is an incident surface. On the other hand, when the crack 14 has not reached the back surface 21b (ST state), the crack 14 is not observed on the back surface 21b. Incidentally, it may be determined whether or not the crack 14 has reached the back surface 21b, according to whether or not the tip of the crack 14 extending from the modified region 122 in an up direction (in the direction of the back surface 21b) is observed. Namely, when the tip of the crack 14 extending from the modified region 122 in the direction of the back surface 21b is observed, it may be determined that the wafer 20 in the ST state and the crack 14 has not reached the back surface 21b, and when the tip of the crack 14 is not observed, it may be determined that the wafer 20 is in the HC state and the crack 14 has reached the back surface 21b. The middle part of FIG. 19(a) shows an observation result of a region between the modified region 121 and the modified region 122 in the thickness direction of the wafer 20. As shown in the middle part of FIG. 19(a), based on the observation result, it is possible to distinguish between when there is a black streak (when a tip of an upper crack that is the crack 14 extending from the modified region 121 to the back surface 21b side is confirmed) and when there is no black streak (when the tip of the upper crack is not confirmed). The lower part of FIG. 19(a) shows an observation result of a region between the modified region 121 and the surface 21a in the thickness direction of the wafer 20. As shown in the lower part of FIG. 19(a), based on the observation result, it is possible to distinguish between when the crack 14 has reached the surface 21a and the tip of the crack 14 extending from the modified region 121 to the surface 21a side is not observed (when the wafer 20 is in the BHC state) and when the crack 14 has not reached the surface 21a and the tip of the crack 14 is observed (when the wafer 20 is in the ST state).

The control unit 8 may identify whether or not the wafer 20 is in the HC state whether the crack 14 extends to the back surface 21b, and determine whether or not the first processing condition is proper, based on whether or not the wafer 20 is in the HC state. Specifically, when the wafer 20 is in the HC state, the control unit 8 may determine that the first processing condition is not proper. In addition, the control unit 8 may identify whether or not the wafer 20 is in the BHC state where the crack 14 extends to the surface 21*a*, and determine whether or not the first processing condition is proper, based on whether or not the wafer 20 is in the BHC state. Specifically, when the wafer 20 is in the BHC state, the control unit 8 may determine that the first processing condition is not proper. These determinations are based on a determination that "in the case of intending to finally attain the full-cut state, when the crack 14 has reached the back surface 21*b* (or the surface 21*a*) despite where only the outer SD layers are still formed, the dicing force of the first processing condition is too strong".

The control unit 8 may identify a crack amount inside the wafer 20, and determine whether or not the first processing condition is proper, based on the crack amount. Specifically, for example, when the crack amount is within approximately ±5 µm of an optimum value, the control unit 8 may determine that the first processing condition is proper. In addition, the control unit 8 may identify presence or absence of unevenness of the crack 14 inside the wafer 20, and determine whether or not the first processing condition is proper, based on the presence or the absence of unevenness. Specifically, when there is no unevenness on the crack 14 inside the wafer 20, the control unit 8 may determine that the first processing condition is proper.

The control unit 8 may identify presence or absence of a black streak, specifically, whether or not a tip of an upper crack that is the crack 14 extending from the modified region 121 to the back surface 21*b* side is observed. The fact that the tip of the upper crack is not observed indicates that the cracks 14 extending from the modified region 121 and from the modified region 122 that are different modified regions are not connected to each other. Namely, the control unit 8 may identify whether or not the cracks 14 extending from the modified region 121 and from the modified region 122 that are different modified regions are connected to each other. Then, when the cracks 14 extending from the modified region 121 and from the modified region 122 are connected to each other (when there is no black streak), the control unit 8 may determine that the first processing condition is not proper. Such a determination is based on a determination that "when the cracks of the outer SD layers are connected to each other, the cracks affect each other in terms of extension or the like, so that the dicing force of the first processing condition is too strong".

The control unit 8 may identify modified layer positions (positions of the modified regions 121 and 122), and determine whether or not the first processing condition is proper, based on the positions. Specifically, for example, when the modified layer positions are within approximately ±4 µm of an optimum value, the control unit 8 may determine that the first processing condition is proper.

(Inner SD Layer-Forming Process and Process of Determining Whether or not Third Processing Condition is Proper)

Figure 17:
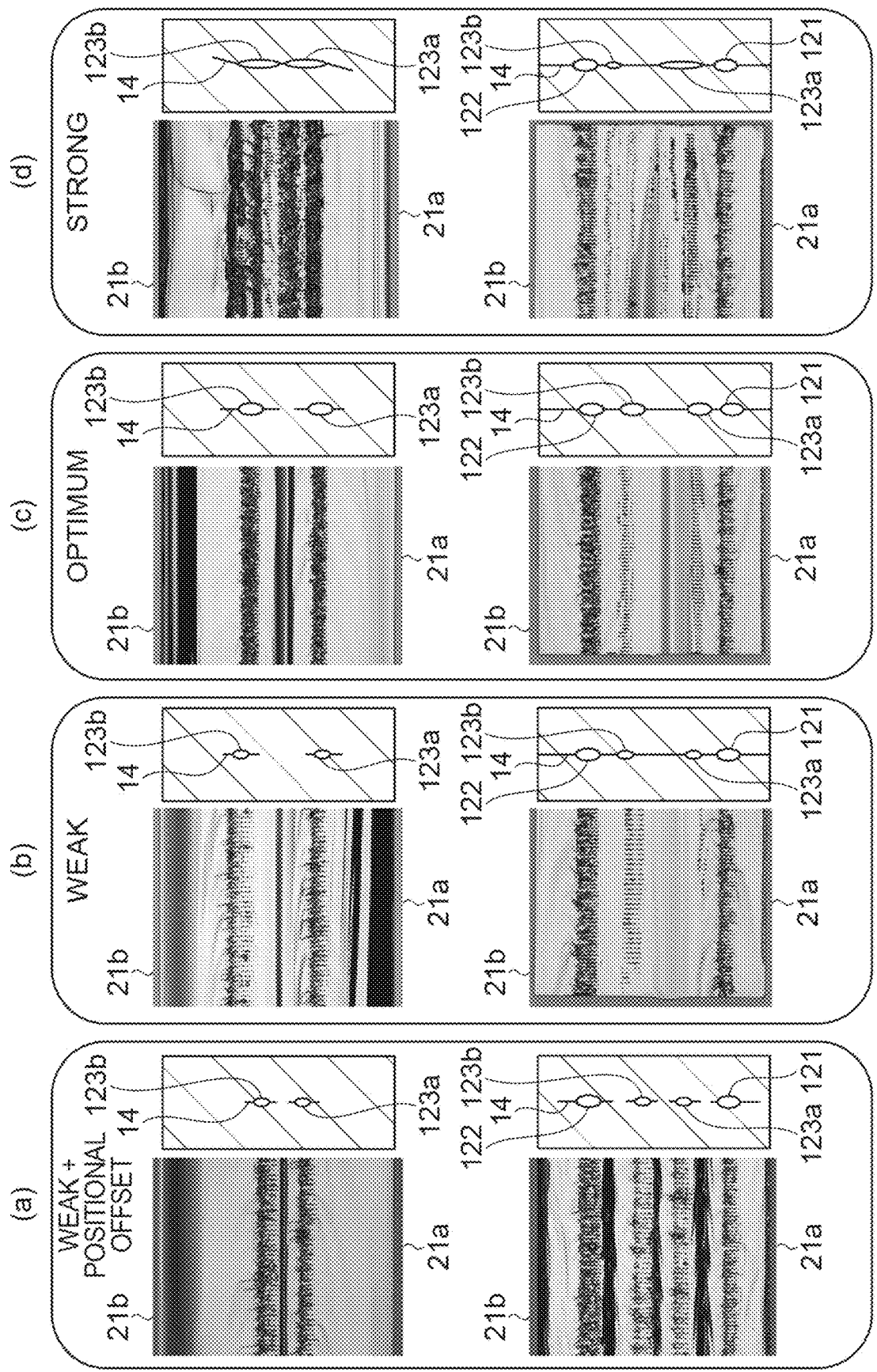
FIG. 17 shows views for describing states of wafers according to the processed states of inner SD layers.

The control unit 8 performs the inner SD layer-forming process of controlling the laser irradiation unit 3 according to the third processing condition set such that as shown in FIG. 17 and the like, the modified region 123*a* and the modified region 123*b* (third modified regions) that inner SD layers are formed inside the wafer 20 by irradiating the wafer 20 with the laser beam. The control unit 8 provisionally decides the third processing condition including laser beam irradiation conditions of the laser irradiation unit 3, based on information received by, for example, the display 150 (refer to FIG. 25). The processing condition includes, for example, pulse energy of the laser beam (including an output and a frequency adjustment), aberration correction, a pulse width, a pulse pitch, the number of modified layers, the number of condensing points, and the like. The information received by the display 150 (refer to FIG. 25) includes, for example, a wafer thickness, a final processing target (full-cut or the like), and the like.

After the inner SD layer-forming process, the control unit 8 identifies a state related to each of the modified regions 123*a* and 123*b* that are inner SD layers, based on a signal (namely, an imaging result) output from the imaging unit 4, and determines whether or not the third processing condition for forming the inner SD layers (third processing condition that is provisionally decided) is proper, based on the identified information. The control unit 8 identifies a state of each of the modified regions 123*a* and 123*b* and a state of each of the cracks 14 extending from the modified regions 123*a* and 123*b*, as the state related to each of the modified regions 123*a* and 123*b*.

FIG. 17 shows views for illustrating states of the wafers 20 according to the processed states of inner SD layers. In FIGS. 17(*a*) to 17(*d*), the upper parts show states of cross-sections of the wafers 20 when only the inner SD layers are formed, and the lower parts show states of cross-sections of the wafers 20 when outer SD layers are further formed in addition to the states shown in the upper parts. FIG. 17(*a*) shows a state where a dicing force (force related to cutting) applied to the wafer 20 by the laser beam applied to form the inner SD layers is weak and a positional offset related to the formation of the inner SD layers occurs, FIG. 17(*b*) shows a state where the dicing force (force related to cutting) is weak, FIG. 17(*c*) shows a state where the dicing force is optimal, and FIG. 17(*d*) shows a state where the dicing force is strong.

In a case where the dicing force of the laser beam for forming the inner SD layers is proper as shown in FIG. 17(*c*), when the outer SD layers and the inner SD layers are formed as shown in the lower part of FIG. 17(*c*), the full-cut state where the cracks 14 have reached the back surface 21*b* and the surface 21*a* in the wafer 20 is attained. In addition, a meandering width of the crack 14 in the direction intersecting the thickness direction of the wafer 20 can also be suppressed to a predetermined value or less (for example, 2 µm or less) or the like. In this case, the wafer 20 can be completely diced (cut) such that a dicing residual does not occur after the processing. For this reason, when the state related to each of the modified regions 123*a* and 123*b* that are inner SD layers is the state shown in the upper part of FIG. 17(*c*), the control unit 8 determines that the third processing condition is proper (details of a determination method will be described later).

Here, the crack state of each inner SD layer has a relatively large margin under a condition where the crack state of each outer SD layer is optimal, and for example, even when the dicing force for forming the inner SD layers is weak as shown in FIG. 17(*b*) or even when the dicing force for forming the inner SD layers is strong as shown in FIG. 17(*d*), in a state where the outer SD layers and the inner SD layers are formed, it may be that the full-cut state can be appropriately attained and the meandering width of the crack 14 can be suppressed to a predetermined value or less (for example, 2 µm or less). In this case, the wafer 20 can be completely diced (cut) such that a dicing residual does not occur after the processing. For this reason, when the state related to each of the modified regions 123*a* and 123*b* that are inner SD layers is the state shown in the upper part of FIG. 17(*b*) or FIG. 17(*d*), the control unit 8 determines that the third processing condition is proper (details of the determination method will be described later). However, even in a case where the margin of the crack state of each inner SD layer is wide, when the dicing force is too weak and finally, the full-cut state is not attained, or when the dicing force is too strong and the meandering amount of the crack 14 is large, naturally, the control unit 8 determines that the third processing condition is not proper (details of the determination method will be described later).

In addition, for example, as shown in the upper part of FIG. 17(a), when the dicing force is weak and a positional offset related to the formation of the inner SD layers occurs, the cracks 14 extending from the modified regions 123a and 123b are not connected to the cracks 14 of the outer SD layers, so that the full-cut state is not attained, a dicing residual occurs after the processing (for example, approximately 80% of the wafer 20 becomes a dicing residual), and the processing quality cannot be ensured. In such a case, the control unit 8 determines that the third processing condition is not proper (details of the determination method will be described later).

Details of the determination method for the third processing condition will be described with reference to FIGS. 18(b) and 19(b). The control unit 8 determines whether or not the third processing condition is proper, based on internal observation results acquired while aligning the focus F with each point from the back surface 21b side using the imaging unit 4. As shown in FIG. 18(b), based on an internal observation result, the control unit 8 identifies information of whether or not the crack 14 extends to the back surface 21b (whether or not the wafer 20 is in the HC state), information of a crack amount inside the wafer 20 (extension amount of the crack 14), of presence or absence of unevenness of the crack 14 inside the wafer 20, of modified layer positions (positions of the modified regions 123a and 123b), of whether or not the crack 14 extends to the surface 21a (whether or not the wafer 20 is in the BHC state), and the like. FIG. 19(b) shows a part of an internal observation result of the wafer 20 when the inner SD layers are formed. As shown in FIG. 19(b), the size of unevenness of the crack inside the wafer 20 is identified based on the internal observation result. The left view of FIG. 19(b) shows an example where the unevenness of the crack 2 μm or less, and the right view of FIG. 19(b) shows an example where the unevenness of the crack is 5.6 μm.

The control unit 8 may identify whether or not the wafer 20 is in the HC state whether the crack 14 extends to the back surface 21b, and determine whether or not the third processing condition is proper, based on whether or not the wafer 20 is in the HC state. Specifically, when the wafer 20 is in the HC state, the control unit 8 may determine that the third processing condition is not proper. In addition, the control unit 8 may identify whether or not the wafer 20 is in the BHC state where the crack 14 extends to the surface 21a, and determine whether or not the third processing condition is proper, based on whether or not the wafer 20 is in the BHC state. Specifically, when the wafer 20 is in the BHC state, the control unit 8 may determine that the third processing condition is not proper. These determinations are based on a determination that "in the case of intending to finally attain the full-cut state, when the crack 14 has reached the back surface 21b (or the surface 21a) despite where only the inner SD layers are still formed, the dicing force of the third processing condition is too strong".

The control unit 8 may identify a crack amount inside the wafer 20, and determine whether or not the first processing condition is proper, based on the crack amount. Specifically, for example, when the crack amount is within approximately ±5 μm of an optimum value, the control unit 8 may determine that the third processing condition is proper. In addition, the control unit 8 may identify presence or absence of unevenness of the crack 14 inside the wafer 20, and determine whether or not the first processing condition is proper, based on the presence or the absence of unevenness. Specifically, when there is no unevenness on the crack 14 inside the wafer 20 (for example, when the unevenness is 2 μm or less), the control unit 8 may determine that the third processing condition is proper.

The control unit 8 may identify modified layer positions (positions of the modified regions 123a and 123b), and determine whether or not the third processing condition is proper, based on the positions. Specifically, for example, when the modified layer positions are within approximately ±4 μm of an optimum value, the control unit 8 may determine that the third processing condition is proper.

(All SD Layers-Forming Process and Process of Determining Whether or not Second Processing Condition is Proper)

The control unit 8 performs the all SD layers-forming process of controlling the laser irradiation unit 3 according to the second processing condition set such that outer SD layers (modified regions 121 and 122) are formed and inner SD layers (modified regions 123a and 123b) are formed between the modified region 121 and the modified region 122 in the thickness direction of the wafer 20 inside the wafer 20 by irradiating the wafer 20 with the laser beam. The control unit 8 provisionally decides the second processing condition including laser beam irradiation conditions of the laser irradiation unit 3, based on information received by, for example, the display 150 (refer to FIG. 25). The processing condition includes, for example, pulse energy of the laser beam (including an output and a frequency adjustment), aberration correction, a pulse width, a pulse pitch, the number of modified layers, the number of condensing points, and the like. The information received by the display 150 (refer to FIG. 25) includes, for example, a wafer thickness, a final processing target (full-cut or the like), and the like.

After the all SD layers-forming process, the control unit 8 identifies a state related to each of the outer SD layers (modified regions 121 and 122) and the inner SD layers (123a and 123b) based on a signal (namely, an imaging result) output from the imaging unit 4, and determines whether or not the second processing condition for forming all the SD layers (second processing condition that is provisionally decided) is proper, based on the identified information. The control unit 8 identifies a state of each of the modified regions 121, 122, 123a, and 123b and a state of each of the cracks 14 extending from the modified regions 121, 122, 123a, and 123b, as the state related to each of the modified regions 121, 122, 123a, and 123b.

Details of a determination method for the second processing condition will be described with reference to FIGS. 18(c) and 19(c). The control unit 8 determines whether or not the second processing condition is proper, based on internal observation results acquired while aligning the focus F with each point from the back surface 21b side using the imaging unit 4. As shown in FIG. 18(c), based on an internal observation result, the control unit 8 identifies information of whether or not the crack 14 extends to the back surface 21b (whether or not the wafer 20 is in the HC state), information of a meandering amount of the crack 14 on the back surface 21b (HC meandering amount), of the clearness of each modified layer and of each crack tip, of whether or not the crack 14 extends to the surface 21a (whether or not the wafer 20 is in the BHC state), and the like. FIG. 19(c)

shows a part of an internal observation result (including an observation result of the back surface 21b that is an incident surface) of the wafer 20 when the outer SD layers and the inner SD layers are formed. The upper part of FIG. 19(c) shows an observation result of the back surface 21b that is an incident surface. As shown in the upper part of FIG. 19(c), a meandering amount of the crack 14 on the back surface 21b (HC meandering amount) is identified. The meandering amount referred to here is a meandering width of the crack 14 in the direction intersecting the thickness direction of the wafer 20 (direction intersecting the back surface 21b). The left view of FIG. 19(c) shows an example where the HC meandering amount is 2 μm or less, and the right view of FIG. 19(c) shows an example where the HC meandering amount is 5.2 μm. The middle part of FIG. 19(c) shows an internal observation result of the wafer 20. As shown in the middle part of FIG. 19(c), based on the observation result, it is possible to distinguish whether each modified layer and each crack tip inside the wafer 20 are clear or unclear. The lower part of FIG. 19(c) shows an internal observation result of the wafer 20. As shown in the lower part of FIG. 19(c), based on the observation result, it is possible to distinguish between when the crack 14 has reached the surface 21a and the tip of the crack 14 is not observed (when the wafer 20 is in the BHC state) and when the crack 14 has not reached the surface 21a and the tip of the crack 14 is observed (when the wafer 20 is in the ST state).

The control unit 8 may identify whether or not the wafer 20 is in the HC state whether the crack 14 extends to the back surface 21b, and determine whether or not the second processing condition is proper, based on whether or not the wafer 20 is in the HC state. Specifically, when the wafer 20 is in the HC state, the control unit 8 may determine that the second processing condition is proper. In addition, the control unit 8 may identify whether or not the wafer 20 is in the BHC state where the crack 14 extends to the surface 21a, and determine whether or not the second processing condition is proper, based on whether or not the wafer 20 is in the BHC state. Specifically, when the wafer 20 is in the BHC state, the control unit 8 may determine that the second processing condition is proper. These determinations are based on a determination that "in the case of intending to finally attain the full-cut state, when the crack 14 has reached the back surface 21b (or the surface 21a) in a state where all the SD layers are formed, the dicing force of the second processing condition is proper".

The control unit 8 may identify a meandering amount of the crack 14 on the back surface 21b (HC meandering amount), and determine whether or not the second processing condition is proper, based on the HC meandering amount. Specifically, for example, when the HC meandering amount is less than approximately 5 μm, the control unit 8 may determine that the second processing condition is proper.

The control unit 8 may identify a clearness of each modified layer and of each crack tip inside the wafer 20, and determine whether or not the second processing condition is proper, based on the clearness. Specifically, when at least one of the modified layer and the crack tip is clear, the control unit 8 may determine that the second processing condition is not proper. The determination is based on a determination that "although the full-cut state should be attained, when the modified layer or the crack tip is clear, the full-cut state is not attained, and the dicing force of the second processing condition is too weak".

(Algorithm Related to Determination Based on Internal Observation Result)

Regarding various determinations based on internal observation results described above, an algorithm for detecting (identifying) the crack 14 and an algorithm for detecting (identifying) the mark related to the modified region will be described in detail.

Figure 20:
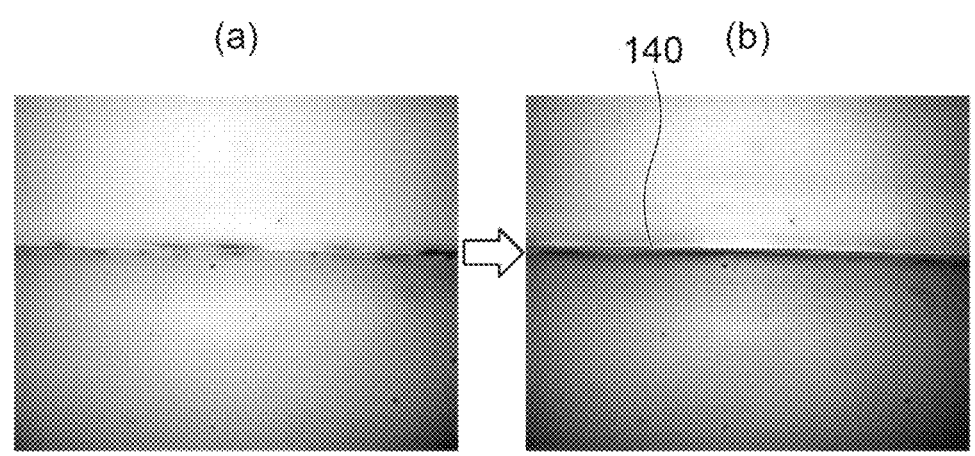
FIG. 20 shows views for describing crack detection.
Figure 21:
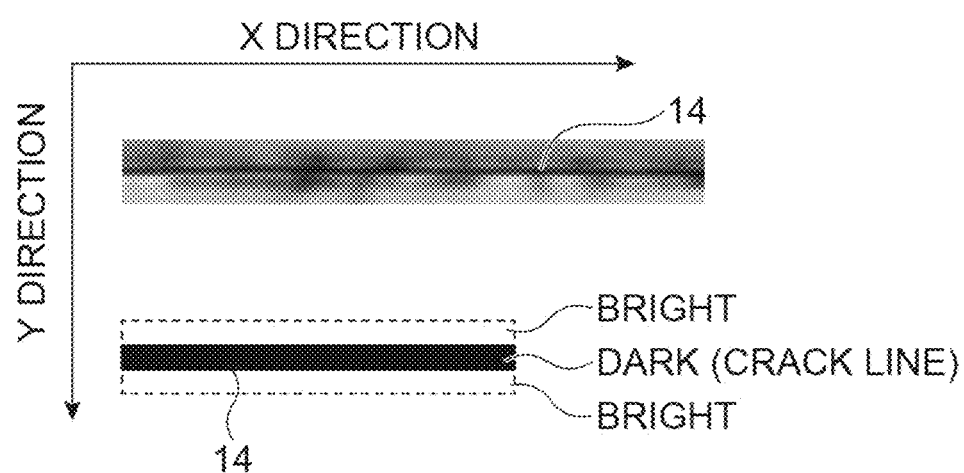
FIG. 21 shows views for describing crack detection.

FIGS. 20 and 21 are views for illustrating crack detection. FIG. 20 shows internal observation results (images of the inside of the wafer 20). First, the control unit 8 detects a straight line group 140 in an image of the inside of the wafer 20 as shown in FIG. 20(a). For example, an algorithm such as Hough transform or line segment detector (LSD) is used for the detection of the straight line group 140. The Hough transform is a technique in which as for points on an image, all straight lines passing through the points are detected and a straight line is detected while weighting the straight lines passing through more feature points. The LSD is a technique in which a region that becomes a line segment is estimated by calculating a gradient and an angle of brightness values in an image and a straight line is detected by approximating the region to a rectangular shape.

Subsequently, the control unit 8 detects the crack 14 from the straight line group 140 by calculating a similarity of the straight line group 140 to a crack line as shown in FIG. 21. As shown in an upper view of FIG. 21, the crack line has a characteristic that the front and the rear in the Y direction with respect to a brightness value on the line are very bright. For this reason, for example, the control unit 8 compares brightness values of all pixels of the detected straight line group 140 to those in the front and in the rear in the Y direction, and sets the number of pixels, of which the difference both in the front and in the rear is a threshold value or more, as a score of the similarity. Then, the straight line group 140 having a highest score of the similarity to the crack line among a plurality of the detected straight line groups 140 is taken as a representative value in the image. An index that the higher the representative value is, the higher the crack 14 is likely to exist is obtained. The control unit 8 compares representative values of a plurality of images to each other to take an image having a relatively high score, as a crack image candidate.

Figure 22:
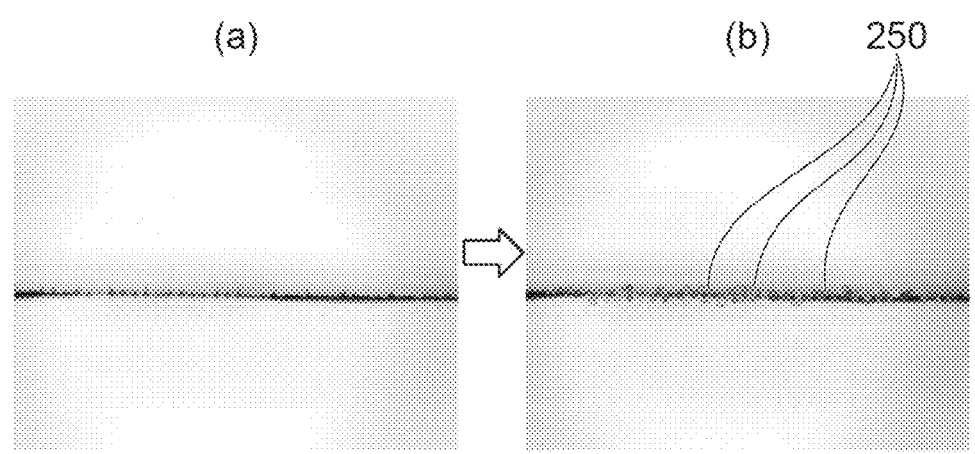
FIG. 22 shows views for describing mark detection.
Figure 23:
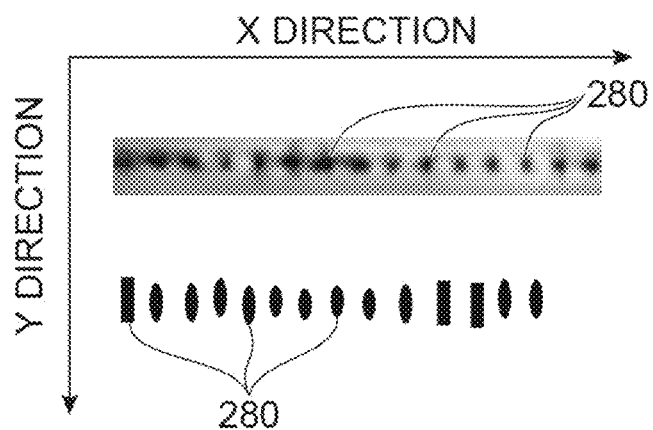
FIG. 23 shows views for describing mark detection.
Figure 24:
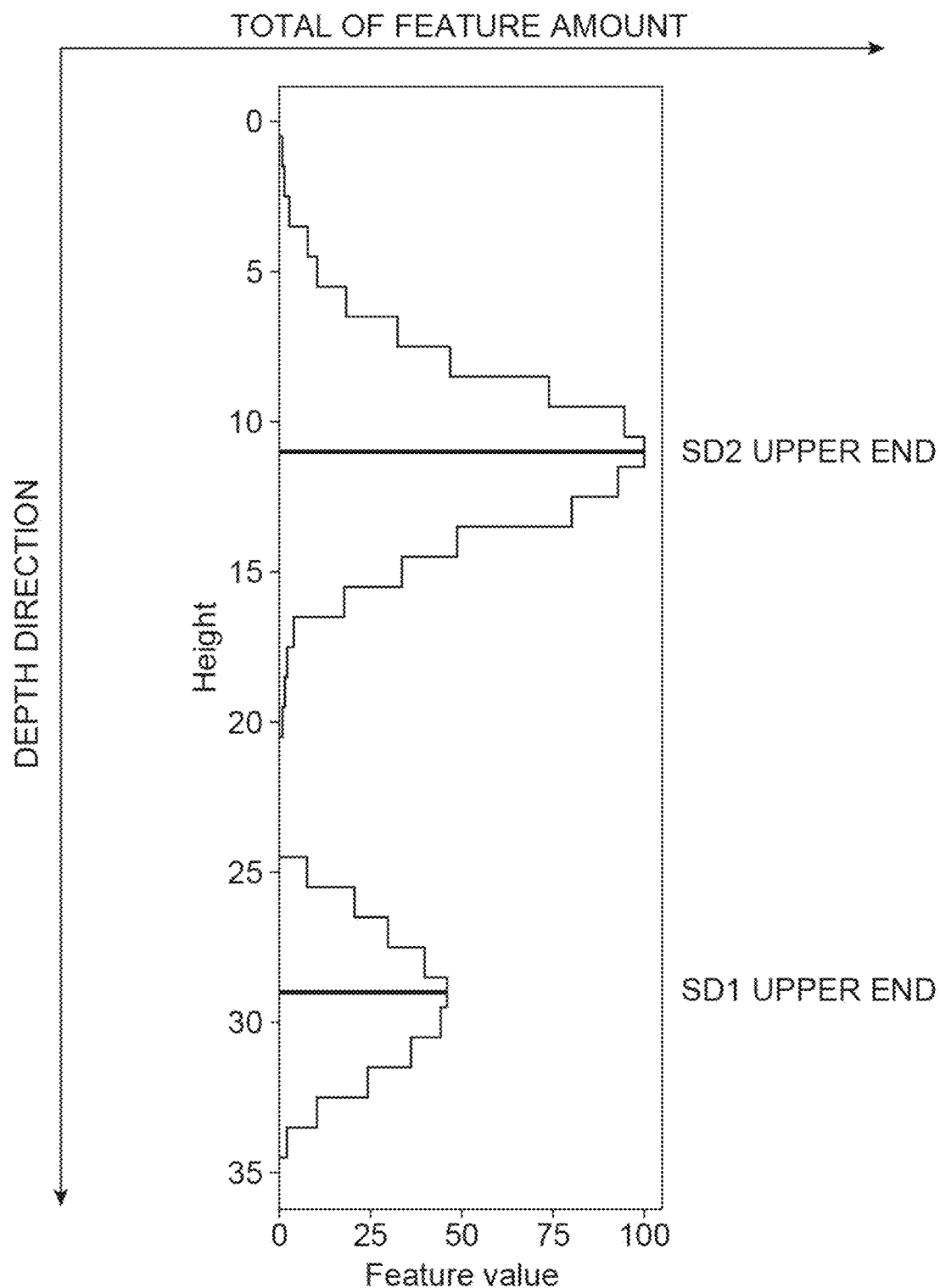
FIG. 24 shows views for describing mark detection.

FIGS. 22 to 24 are views for illustrating mark detection. FIG. 22 shows internal observation results (images of the inside of the wafer 20). In an image of the inside of the wafer 20 as shown in FIG. 22(a), the control unit 8 detects corners (concentration of edges) in the image as key points, and detects the positions, the sizes, and the directions thereof to detect feature points 250. As a technique of detecting the feature points in such a manner, Eigen, Harris, Fast, SIFT, SURF, STAR, MSER, ORB, AKAZE, and the like are known.

Here, as shown in FIG. 23, since marks 280 each having a circular shape, a rectangular shape, or the like are arranged at regular intervals, each of the marks 280 has a strong feature as a corner. For this reason, it is possible to detect the marks 280 with high accuracy by summing up feature amounts of the feature points 250 in the image. As shown in FIG. 24, when totals of feature amounts for each image that is captured while shifting the focus in a depth direction are compared to each other, a change in a mountain indicating a crack row amount for each modified layer can be confirmed. The control unit 8 estimates a peak of the change as the position of the mark 280. It is possible to estimate not only the positions of the marks but also a pulse pitch by summing up the feature amounts as described above.

(Process Related to Decision of Processing Condition)

The control unit 8 decides a final processing condition based on the determination result of each processing condition described above. Regarding the first processing condition related to the formation of the outer SD layers (first processing condition that is provisionally decided), when it is determined that the first processing condition is not proper, based on a determination result of the first processing condition based on the state of each of the outer SD layers formed according to the first processing condition, the control unit 8 changes the first processing condition. When the control unit 8 changes the first processing condition, the control unit 8 executes a correction process (seventh process) of correcting the first processing condition according to the determination result. In the correction process, a new first processing condition is set in which for example, pulse energy of the laser beam (including an output and a frequency adjustment), aberration correction, a pulse width, a pulse pitch, the number of modified layers, the number of condensing points, or the like are changed. The control unit 8 causes processing to be performed again according to the first processing condition that is newly set, and decides whether or not the first processing condition is set as a processing condition of the outer SD layers, based on a determination result of the first processing condition. The control unit 8 repeats the correction process, the reprocessing, and the determination until the first processing condition becomes a proper processing condition.

Similarly, regarding the third processing condition related to the formation of the inner SD layers (third processing condition that is provisionally decided), when it is determined that the third processing condition is not proper, based on a determination result of the third processing condition based on the state of each of the inner SD layers formed according to the third processing condition, the control unit 8 changes the third processing condition. When the control unit 8 changes the third processing condition, the control unit 8 executes the correction process (seventh process) of correcting the third processing condition according to the determination result. The control unit 8 causes processing to be performed again according to the third processing condition that is newly set, and decides whether or not the third processing condition is set as a processing condition of the inner SD layers, based on a determination result of the third processing condition. The control unit 8 repeats the correction process, the reprocessing, and the determination until the third processing condition becomes a proper processing condition.

The control unit 8 provisionally decides the second processing condition (processing condition related to the formation of the outer SD layers and of the inner SD layers) in consideration of the first processing condition and the third processing condition that are optimized by the above-described processes. Then, when it is determined that the second processing condition is not proper, based on a determination result of the second processing condition based on the state of each of the outer SD layers and of the inner SD layers that are formed according to the second processing condition, the control unit 8 changes the second processing condition. When the control unit 8 changes the second processing condition, the control unit 8 executes the correction process (seventh process) of correcting the second processing condition according to the determination result. When the control unit 8 changes the second processing condition, the control unit 8 decides whether to change the processing condition related to the formation of the outer SD layers or change the processing condition related to the formation of the inner SD layers in the second processing condition according to the determination result. The control unit 8 causes processing to be performed again according to the second processing condition that is newly set, and decides whether or not the second processing condition is set as a final processing condition, based on a determination result of the second processing condition. The control unit 8 repeats the correction process, the reprocessing, and the determination until the second processing condition becomes a proper processing condition.

Incidentally, in the processing condition derivation process, the final processing condition has been described as being derived by performing processing and a determination related to the outer SD layers, processing and a determination related to the inner SD layers, and processing and a determination related to the outer SD layers and to the inner SD layers, but the present invention is not limited to this configuration. For example, in the processing condition derivation process, the final processing condition may be derived by performing processing and a determination related to the outer SD layers and processing and a determination related to the outer SD layers and to the inner SD layers without performing processing and a determination related to the inner SD layers alone.

(Screen Image Related to Processing Condition Derivation Process)

Next, one example of a graphical user interface (GUI) related to the processing condition derivation process will be described with reference to FIGS. 25 to 27. Hereinafter, an example in which a final processing condition is derived by performing only processing and a determination related to the outer SD layers and processing and a determination related to the outer SD layers and to the inner SD layers (example in which processing and a determination are not performed on the inner SD layers alone) will be described. FIGS. 25 to 27 are screen images of the display 150 related to the processing condition derivation process.

FIG. 25 is one example of a setting screen for wafer processing information (user input reception screen). As shown in FIG. 25, the display 150 displays determination contents, processing quality, and determination method/criteria. Among the above items, each item of at least the determination contents is set based on a user's input. Incidentally, each item of the determination contents may be set to a fixed value. In addition, each item of the processing quality and of the determination method/criteria may be set based on a user's input, or may be automatically set based on the contents set in the determination contents.

In the determination contents, information related to a determination to be executed is displayed, and "FC set condition" and "wafer thickness" are displayed. The "FC set condition" is information indicating that after modified regions assumed to be in the full-cut state are formed, a determination on a processing condition is performed, and the processing condition is decided (derived). In the example shown in FIG. 25, the "FC set condition" is set to "execution". The "wafer thickness" is information indicating a thickness of the wafer 20. For example, the "wafer thickness" is selected from a plurality of options and is input by the user.

In the processing quality, quality required for the wafer 20 after processing is displayed, "crack state", "HC straightness", and "end surface unevenness width" are displayed. The "crack state" is information of a crack in the full-cut state, in the ST state, or the like. The "HC straightness" is information of an HC meandering amount. The "end surface unevenness width" is information of an unevenness width of a crack on an end surface.

In the determination method/criteria, pass criteria in the processing condition determination process are displayed, and as pass criteria for the first processing condition related to the formation of the outer SD layers, pass criteria such as "back surface crack state", "SD1 (modified region 121) crack amount", "SD2 (modified region 122) crack amount", "SD1 lower end position", "SD2 lower end position", "end surface unevenness width", "black streak", and "surface crack state" are displayed. Regarding the pass criteria for the first processing condition, the "back surface crack state" is set to ST, the "black streak" is set to presence, and the "surface crack state" is set to ST. In addition, as pass criteria for the second processing condition related to the formation of the outer SD layers and of the inner SD layers, pass criteria such as "back surface crack state", "HC meandering amount", "modified layer imaging state", "surface crack state", and "crack state" are displayed. Regarding the pass criteria for the second processing condition, the "back surface crack state" is set to HC, the "modified layer imaging state" (clearness of the modified layer) is set to unclear, the "surface crack state" is set to BHC, and the "crack state" (overall crack state) is set to full-cut (FC).

FIG. 26 is one example of a processing result screen for the outer SD layers. A processing result confirmation screen is a screen that displays a determination result after processing (here, a determination result of the first processing condition), and that receives a user's input related to the correction of the first processing condition. In the example shown in FIG. 26, the display 150 displays determination contents, processing quality, and determination result. The determination contents and the processing quality are information set on the setting screen for wafer processing information described above (FIG. 25). In detail, in addition to the information set on the setting screen for wafer processing information (FIG. 25), processing position (here, the outer SD layer) as an item of the determination contents is displayed on the processing result confirmation screen.

In the example shown in FIG. 26, determination item, criteria (pass criteria), result, and pass/fail are displayed in the left part of a region where the determination result is displayed. In addition, a view depicting the outer SD layers and cracks when the determination result is assumed to be a standard value (estimated processing result), and a view depicting the outer SD layers and cracks of an actual processing result are displayed in the central part of the region where the determination result is displayed. In addition, an observation result of a tip of an upper crack that is the crack 14 extending from SD1 (modified region 121) to the back surface 21b side, and an observation result of a tip of a lower crack that is the crack 14 extending from SD1 (modified region 121) to the surface 21a side are displayed in the right part of the region where the determination result is displayed. Now, in items of the SD1 crack amount and of the SD2 crack amount, the crack amounts do not satisfy $60\pm5$ μm that is a pass criterion, specifically, are smaller than the pass criterion, and are determined to be fail (pass/fail: NG). In this case, since the correction of the first processing condition is recommended, a message "Reprocessing is encouraged. Will reprocessing be executed?" is displayed, and the correction of the first processing condition and reprocessing can be executed according to a user's input. Here, after the correction of the first processing condition and the reprocessing are executed, the first processing condition satisfies the pass criteria, and then outer SD layers and inner SD layers are processed, and a processing result screen for the outer SD layers and for the inner SD layers shown in FIG. 27 is displayed.

FIG. 27 is one example of a processing result screen for the outer SD layers and for the inner SD layers. A processing result confirmation screen is a screen that displays a determination result after processing (here, a determination result of the second processing condition), and that receives a user's input related to the correction of the second processing condition. In the example shown in FIG. 27, the display 150 displays determination contents, processing quality, and determination result.

In the example shown in FIG. 27, determination item, criteria (pass criteria), result, and pass/fail are displayed in the left part of a region where the determination result is displayed. In addition, a view depicting the outer SD layers and the inner SD layers and cracks thereof when the determination result is assumed to be a standard value, and a view depicting the outer SD layers and the inner SD layers and cracks thereof of an actual processing result are displayed in the central part of the region where the determination result is displayed. In addition, observation results of HC straightness (HC meandering amount) on the back surface 21b and of the end surface unevenness width of the crack 14 are displayed in the right part of the region where the determination result is displayed. Now, in an item of the HC meandering amount, the HC meandering amount does not satisfy a pass criterion of less than 5 μm, and is determined to be fail (pass/fail: NG). In this case, since the correction of the second processing condition is recommended, a message "Reprocessing of the outer SD layers is encouraged. Will reprocessing be executed?" is displayed. The user can select whether the correction of the first processing condition and reprocessing related to the outer SD layers are performed or the correction of the third processing condition and reprocessing related to the inner SD layers are performed, according to the content of the fail. Then, the correction of the first processing condition and the reprocessing or the correction of the third processing condition and the reprocessing can be executed according to a user's input.

[Laser Processing Method]

Figure 28:
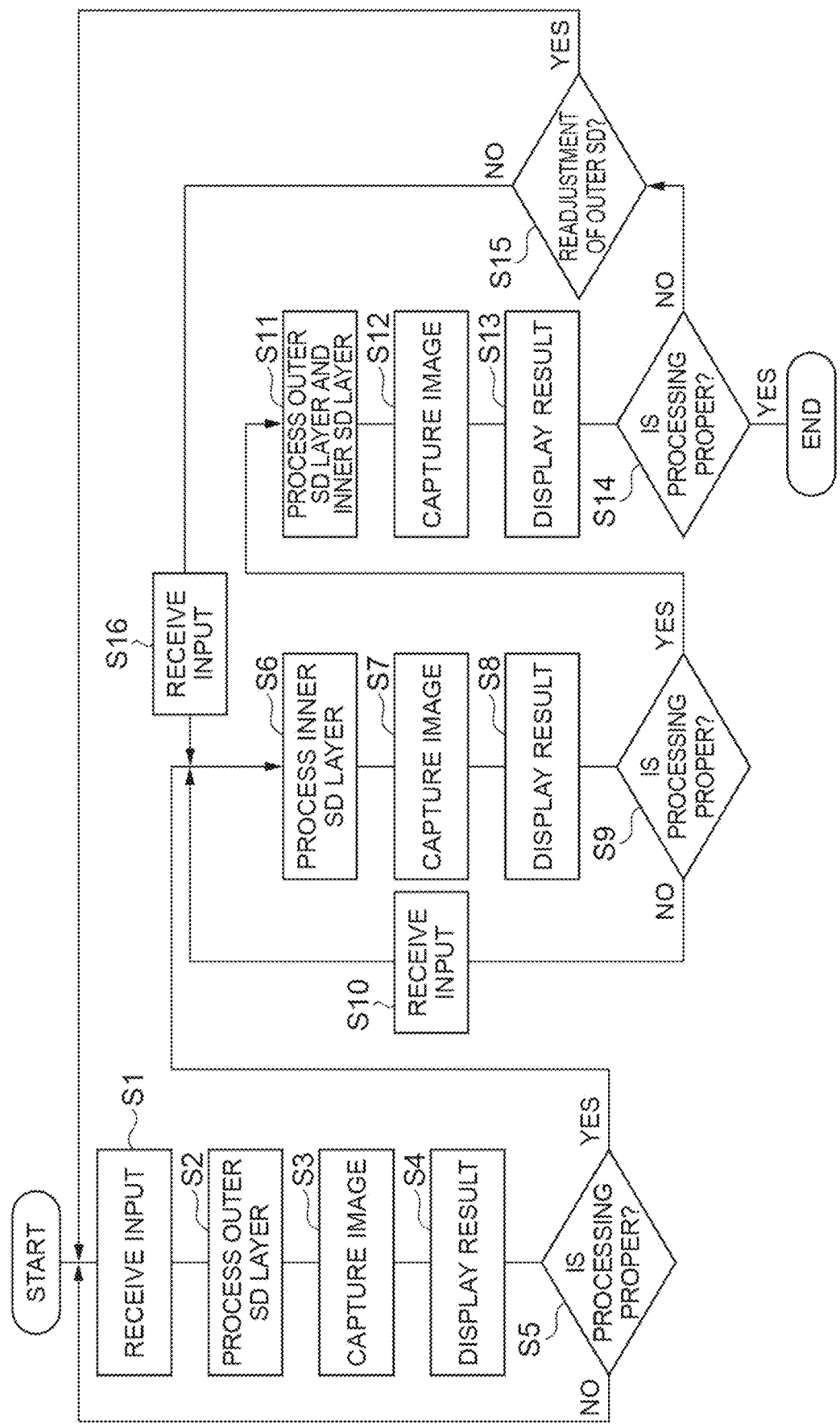
FIG. 28 is a flowchart of one example of a laser processing method (processing condition derivation process).
Figure 29:
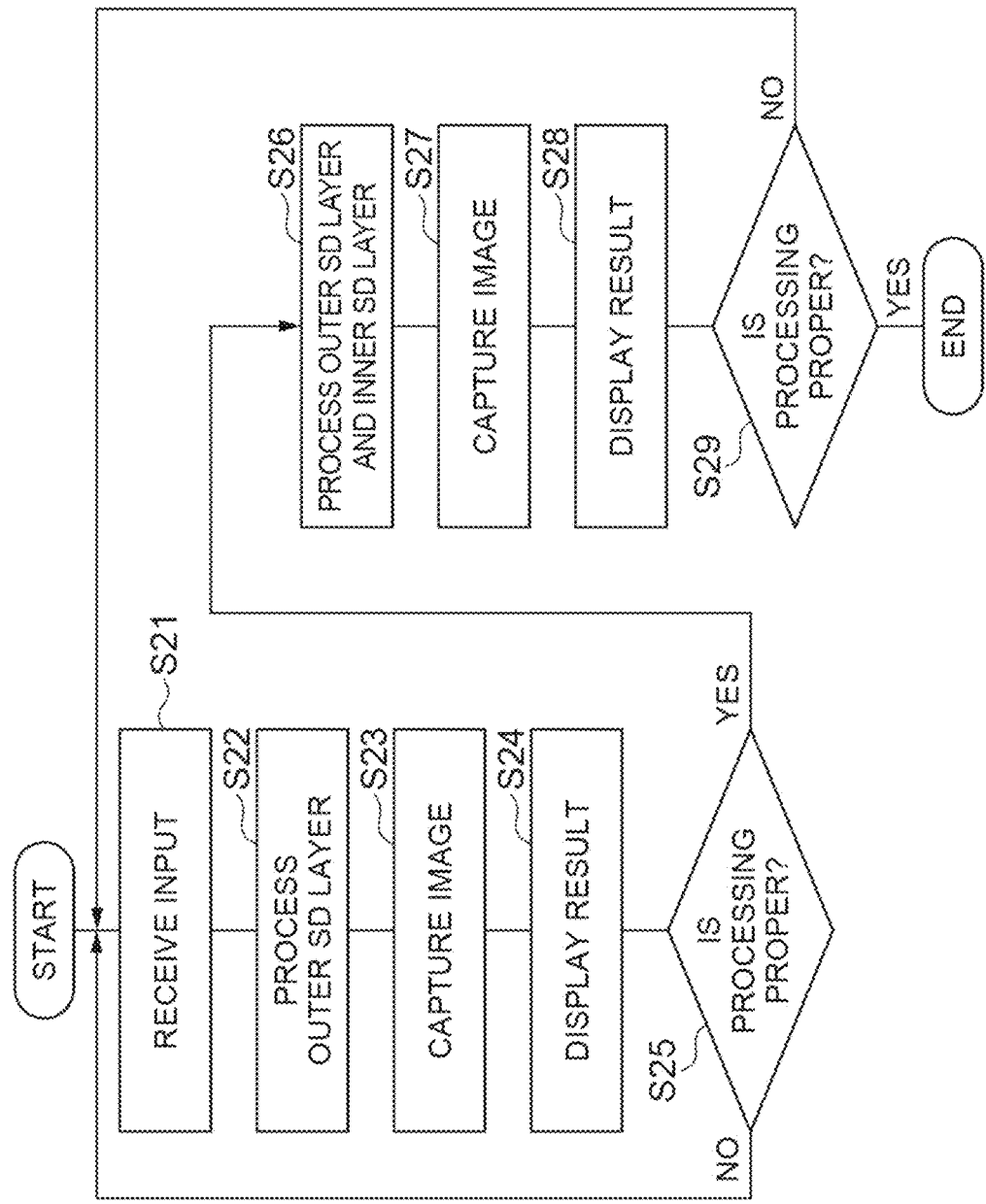
FIG. 29 is a flowchart of another example of the laser processing method (processing condition derivation process).

A laser processing method of the present embodiment will be described with reference to FIGS. 28 and 29. FIGS. 28 and 29 both are flowcharts of the laser processing method. FIG. 28 shows a process of deriving a final processing condition by performing processing and a determination related to the outer SD layers, processing and a determination related to the inner SD layers, and processing and a determination related to the outer SD layers and to the inner SD layers. FIG. 29 shows a process of deriving a final processing condition by performing only processing and a determination related to the outer SD layers and processing and a determination related to the outer SD layers and to the inner SD layers without performing processing and a determination related to the inner SD layers alone.

In the process shown in FIG. 28, initially, the display 150 receives a user's input of wafer processing information (step S1). Specifically, the display 150 receives an input of information of at least the wafer thickness. Accordingly, in the processing method for processing the outer SD layers and the inner SD layers into the full-cut state, the first processing condition related to the formation of the outer SD layers and the third processing condition related to the formation of the inner SD layers are automatically and provisionally decided.

Subsequently, the control unit 8 controls the laser irradiation unit 3 based on the first processing condition that is provisionally decided, to process the outer SD layers in the wafer 20 (step S2). Subsequently, an image of the processed wafer 20 is captured by the imaging unit 4 (step S3). Then, the control unit 8 controls the display 150 such that an imaging result is displayed on the display 150 (step S4).

Subsequently, the control unit 8 identifies a state related to the outer SD layers based on the imaging result, and determines whether or not the processing is proper (namely, whether or not the first processing condition is proper), based on the identified information (step S5). When the first processing condition is not proper, the control unit 8 receives an input of a new first processing condition (step S1), and executes the processes after step S2 again. On the other hand, when the first processing condition is proper, the control unit 8 finally decides the first processing condition as a first processing condition. Subsequently, the process of step S6 is executed.

In the process of step S6, the control unit 8 controls the laser irradiation unit 3 based on the third processing condition that is provisionally decided, to process the inner SD layers in the wafer 20 (step S6). Subsequently, an image of the processed wafer 20 is captured by the imaging unit 4 (step S7). Then, the control unit 8 controls the display 150 such that an imaging result is displayed on the display 150 (step S8).

Subsequently, the control unit 8 identifies a state related to the inner SD layers based on the imaging result, and determines whether or not the processing is proper (namely, whether or not the third processing condition is proper), based on the identified information (step S9). When the third processing condition is not proper, the control unit 8 receives an input of a new third processing condition (step S10), and executes the processes after step S6 again. On the other hand, when the third processing condition is proper, the control unit 8 finally decides the third processing condition as a third processing condition. Subsequently, the process of step S11 is executed.

In the process of step S11, the control unit 8 controls the laser irradiation unit 3 based on the second processing condition that is provisionally decided based on the first processing condition and on the third processing condition that is finally decided, to process the outer SD layers and the inner SD layers in the wafer 20 (step S11). Subsequently, an image of the processed wafer 20 is captured by the imaging unit 4 (step S12). Then, the control unit 8 controls the display 150 such that an imaging result is displayed on the display 150 (step S13).

Subsequently, the control unit 8 identifies a state related to each of the outer SD layers and the inner SD layers based on the imaging result, and determines whether or not the processing is proper (namely, whether or not the second processing condition is proper), based on the identified information (step S14). When the second processing condition is not proper, the control unit 8 determines whether or not to readjust the first condition related to the formation of the outer SD layers (or whether or not to readjust the third processing condition related to the formation of the inner SD layers) according to a determination result (step S15). The control unit 8 may perform the determination according to a user's input. When the control unit 8 readjust the first processing condition, the control unit 8 receives an input of a new first processing condition (step S1), and executes the processes after step S2 again. When the control unit 8 readjust the third processing condition, the control unit 8 receives an input of a new third processing condition (step S16), and executes the processes after step S6 again. On the other hand, when the second processing condition is proper, the control unit 8 finally decides the second processing condition as a second processing condition.

In the process shown in FIG. 29, initially, the display 150 receives a user's input of wafer processing information (step S21). Specifically, the display 150 receives an input of information of at least the wafer thickness. Accordingly, in the processing method for processing the outer SD layers and the inner SD layers into the full-cut state, the first processing condition related to the formation of the outer SD layers is automatically and provisionally decided.

Subsequently, the control unit 8 controls the laser irradiation unit 3 based on the first processing condition that is provisionally decided, to process the outer SD layers in the wafer 20 (step S22). Subsequently, an image of the processed wafer 20 is captured by the imaging unit 4 (step S23). Then, the control unit 8 controls the display 150 such that an imaging result is displayed on the display 150 (step S24).

Subsequently, the control unit 8 identifies a state related to the outer SD layers based on the imaging result, and determines whether or not the processing is proper (namely, whether or not the first processing condition is proper), based on the identified information (step S25). When the first processing condition is not proper, the control unit 8 receives an input of a new first processing condition (step S1), and executes the processes after step S2 again. On the other hand, when the first processing condition is proper, the control unit 8 finally decides the first processing condition as a first processing condition. Subsequently, the process of step S26 is executed.

In the process of step S26, the laser irradiation unit 3 is controlled based on the second processing condition that is provisionally decided based on the first processing condition that is finally decided, to process the outer SD layers and the inner SD layers in the wafer 20 (step S26). Subsequently, an image of the processed wafer 20 is captured by the imaging unit 4 (step S27). Then, the control unit 8 controls the display 150 such that an imaging result is displayed on the display 150 (step S28).

Subsequently, the control unit 8 identifies a state related to each of the outer SD layers and the inner SD layers based on the imaging result, and determines whether or not the processing is proper (namely, whether or not the second processing condition is proper), based on the identified information (step S29). When the second processing condition is not proper, the control unit 8 receives an input of a new first processing condition (step S1), and executes the processes after step S2 again. On the other hand, when the second processing condition is proper, the control unit 8 finally decides the second processing condition as a second processing condition.

[Actions and Effects]

Next, actions and effects of the laser processing device 1 according to the present embodiment will be described.

The laser processing device 1 according to the present embodiment includes the laser irradiation unit 3 that irradiates the wafer 20 with a laser beam from the back surface 21b side of the wafer 20; the imaging unit 4 that outputs light having a property of transmitting through the wafer 20, and that detects the light that has propagated through the wafer 20; and the control unit 8. The control unit 8 executes the first process of controlling the laser irradiation unit 3 according to the first processing condition set such that the modified region 121 and the modified region 122 are formed inside the wafer 20 by irradiating the wafer 20 with the laser beam; the second process of identifying a state related to each of the modified regions 121 and 122 based on a signal output from the imaging unit 4 that has detected the light, and of determining whether or not the first processing condition is proper, based on identified information, after the first process; the third process of controlling the laser irradiation unit 3 according to the second processing condition set such that the modified regions 121 and 122 are formed and the modified regions 123a and 123b are formed between the modified regions 121 and 122 in the thickness direction of the wafer 20 inside the wafer 20 by irradiating the wafer 20 with the laser beam; and the fourth process of identifying a state related to each of the modified regions 121, 122, 123a, and 123b based on a signal output from the imaging unit 4 that has detected the light, and of determining whether or not the second processing condition is proper, based on identified information, after the third process.

In the laser processing device 1 according to the present embodiment, in the third process, outer SD layers (modified regions 121 and 122) and inner SD layers (modified regions 123a and 123b) therebetween are formed in the thickness direction of the wafer 20 based on the second processing condition, and in the fourth process, a state related to each of the outer SD layers and the inner SD layers is identified based on a signal output from the imaging unit 4, and it is determined whether or not the second processing condition is proper, based on an identified result. As described above, processing is performed such that the outer SD layers and the inner SD layers are actually formed, and it is determined whether or not the processing condition is proper, based on a state of each of the outer SD layers and the inner SD layers after the processing, so that it is determined whether or not the processing condition is proper, based on a final processed state of the wafer 20. As a result, it is accurately determined whether or not the processing condition is proper, and the quality of the wafer 20 after the processing can be ensured. Furthermore, in the laser processing device 1 according to the present embodiment, in the first process, only the outer SD layers are formed based on the first processing condition, and in the second process, a state related to each of the outer SD layers is identified based on a signal output from the imaging unit 4, and it is determined whether or not the first processing condition is proper, based on an identified result. For example, in the final processed state of the wafer 20, when the wafer 20 is processed into a full-cut state (state where cracks extending from the modified regions extend to both end surfaces of the wafer 20), there is little information regarding the modified regions that can be obtained from the final processed state of the wafer 20, and whether or not the processing condition is proper cannot be determined with high accuracy, which is a problem. In this respect, in a state where only some modified regions (outer SD layers) are formed, it is determined whether or not the processing condition related to the formation of the some modified regions (first processing condition) is proper, based on information regarding the some modified regions, so that whether or not the processing condition is proper can be determined with higher accuracy, based on a processed state of the wafer 20 from which more information (information regarding the modified regions) can be obtained than from the final processed state of the wafer 20. Incidentally, according to the findings of the inventors, when the outer SD layers and the inner SD layers are formed in the thickness direction of the wafer 20, it is considered that the state of each of the outer SD layers affects the quality of the wafer 20 after the processing. In this respect, in the second process, it is determined whether or not the processing condition related to the formation of the outer SD layers (first processing condition) is proper, so that the quality of the wafer 20 after the processing can be more suitably ensured.

The control unit 8 identifies at least one of a state of the modified region and a state of a crack 14 extending from the modified region, as the state related to the modified region. Accordingly, a state of the wafer 20 after the processing can be appropriately identified, and whether or not the processing condition is proper can be determined with higher accuracy. As a result, the quality of the wafer 20 can be more suitably ensured.

The control unit 8 identifies a position of the modified region, and determines whether or not the processing condition is proper, based on the position. When the processing condition is not appropriate, the position of the modified region may not be a desired position. The processing condition can be appropriately determined by determining whether or not the processing condition is proper according to whether or not the modified region is formed at the desired position. Accordingly, the quality of the wafer 20 after the processing can be more suitably ensured.

The control unit 8 identifies whether or not the crack 14 extends to at least one of the back surface 21b and the surface 21a, and determines whether or not the processing condition is proper, based on whether or not the crack 14 extends to at least one of the back surface 21b and the surface 21a. Accordingly, for example, in the final processed state of the wafer 20, when the wafer 20 is desired to be processed into the full-cut state, the processing condition can be appropriately determined by determining that the cracks do not extend to the back surface 21b and to the surface 21a in the stage of the second process in which only the outer SD layers are formed, and by determining that the cracks 14 extend to the back surface 21b and to the surface 21a in the stage of the fourth process in which the outer SD layers and the inner SD layers are formed. Accordingly, the quality of the wafer 20 after the processing can be more suitably ensured.

The control unit 8 identifies an extension amount of the crack 14, and determines whether or not the processing condition is proper, based on the extension amount. When the processing condition is not appropriate, the extension amount of the crack 14 may not reach a desired length. The processing condition can be appropriately determined by determining whether or not the processing condition is proper, based on the extension amount of the crack 14. Accordingly, the quality of the wafer 20 after the processing can be more suitably ensured.

The control unit 8 identifies a meandering width of the crack 14 in a direction intersecting the thickness direction of the wafer 20, and determines whether or not the processing condition is proper, based on the meandering width. When the processing condition is not appropriate, the meandering width of the crack 14 may increase. The processing condition can be appropriately determined by determining whether or not the processing condition is proper, based on the meandering width of the crack 14. Accordingly, the quality of the wafer 20 after the processing can be more suitably ensured.

The control unit 8 identifies whether or not the cracks 14 extending from the respective modified regions different from each other are connected to each other, and determines whether or not the processing condition is proper, based on whether or not the cracks 14 are connected to each other. In a case where the processing condition is not appropriate, when the cracks 14 are not desired to be connected to each other, the cracks 14 may be connected to each other, or when the cracks 14 are desired to be connected to each other, the cracks 14 may not be connected to each other. The processing condition can be appropriately determined by determining whether or not the processing condition is proper according to whether or not the cracks 14 are connected to each other. Accordingly, the quality of the wafer 20 after the processing can be more suitably ensured.

The control unit 8 is configured to further execute a fifth process of controlling the laser irradiation unit 3 according to a third processing condition set such that the inner SD layer is formed inside the wafer 20 by irradiating the wafer 20 with the laser beam; and a sixth process of identifying a state related to the inner SD layer based on a signal output from the imaging unit 4 that has detected the light, and of determining whether or not the third processing condition is proper, based on identified information, after the fifth process. According to such a configuration, in a state where only the inner SD layer is formed, it is determined whether or not the processing condition related to the formation of the inner SD layer (third processing condition) is proper, based on information regarding the inner SD layer. In the case of forming the outer SD layers and the inner SD layer, in addition to when only the outer SD layers are formed, even when only the inner SD layer is formed, whether or not the processing condition is proper can be determined with higher accuracy by determining whether or not the processing condition is proper, based on the information regarding the modified region.

The control unit 8 may determine that the first processing condition is not proper, when the crack 14 extends to at least one of the back surface 21b and the surface 21a in the derivation of the first processing condition, and determine that the third processing condition is not proper, when the crack 14 extends to at least one of the back surface 21b and the surface 21a in the derivation of the third processing condition. Accordingly, an ST state (state where internal observation is easy to make) can be reliably attained in a processed state prior to the final processed state. As a result, information regarding the processed state can be appropriately and abundantly obtained. In addition, even if the final processed state is the full-cut state, when the crack 14 has reached the back surface 21b or the surface 21a in a state prior to the final processed state (state where processing is still to be performed thereafter), it is considered that the chip quality and the dicability in the final processed state decrease. For this reason, a state where the processed state prior to the final processed state is the ST state is set as one condition for determining that the processing condition is appropriate, so that the chip quality and the dicability can be ensured.

The control unit 8 is configured to further execute a seventh process of correcting the processing condition according to a determination result of the processing condition, when it is determined that the processing condition is not proper. According to such a configuration, the processing condition can be corrected based on the determination result, and the quality of the wafer 20 after the processing can be more suitably ensured.

Modification Examples

The embodiment of the present invention has been described above, but the present invention is not limited to the embodiment. For example, in the embodiment, in the processing method for which the processing condition is to be derived, a configuration where the outer SD layers are formed and then the inner SD layers are formed has been described, but the present invention is not limited to the configuration, and in the processing method for which the processing condition is to be derived, the outer SD layers and the inner SD layers may be simultaneously formed, or the inner SD layers may be formed prior to the formation of the outer SD layers.

In addition, for example, after a modified region and the like are formed by irradiating the wafer 20 with a laser beam along the first direction (X direction), a modified region may be formed by irradiating the wafer 20 with the laser beam along the second direction (Y direction) different from the first direction so as to traverse the modified region that has already been formed. In such a case, as described above, different processing conditions may be derived for the processing in the X direction (pre-processing) and for the processing in the Y direction (post-processing) based on an internal observation result (modified layer position or presence or absence of a black streak) or on a back surface observation result (HC meandering or BHC meandering). Specifically, for example, when the lengths of the chip sides in the X direction and in the Y direction are different (for example, 0.2 mm×15 mm or the like), when the user requires different levels of quality in the X direction and in the Y direction (for example, when the meandering of a crack in the X direction is less than 2 μm and the meandering of a crack in the Y direction is less than 10 μm), when the size of a chip such as RF-ID is very small and a difference in quality is likely to occur depending on whether processing is pre-processing or post-processing, different processing conditions may be derived for the processing in the X direction (pre-processing) and for the processing in the Y direction (post-processing).

(Adjustment of Setting Related to Internal Observation)

Figure 30:
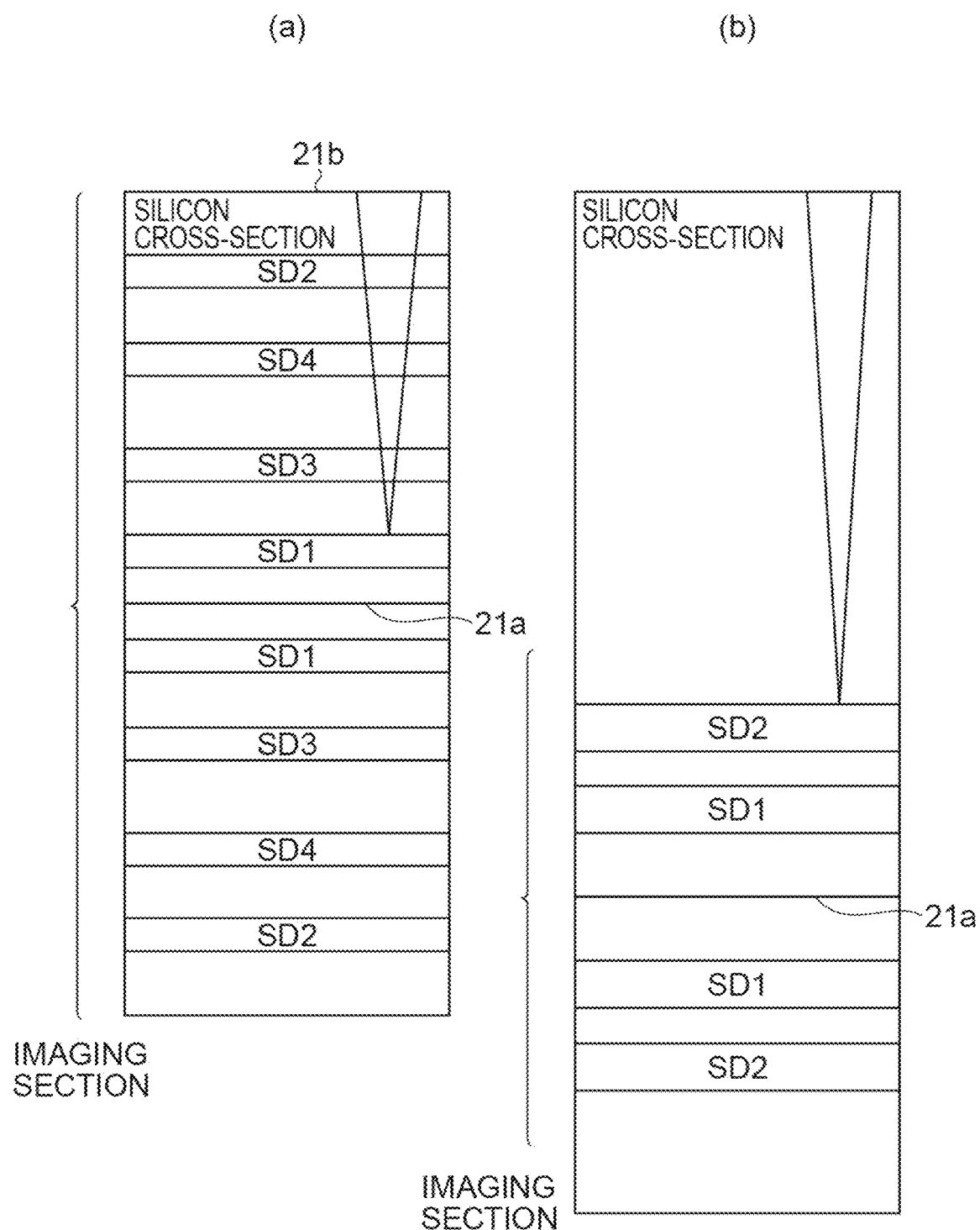
FIG. 30 shows views for describing a difference in an imaging section depending on a processing method.

In addition, for example, a laser processing device may adjust a setting for performing the internal observation of the wafer in more detail. FIG. 30 shows views for illustrating a difference in an imaging section depending on a processing method. FIG. 30(a) shows an imaging section when full-cut processing is performed, and FIG. 30(b) shows an imaging section when other processing (for example, BHC processing) is performed. In both the processing, an image of an imaginary focus that is symmetric to the surface 21a is also captured. Namely, in the wafers of FIGS. 30(a) and 30(b), the SD layers in a lower half are regions related to the imaginary focus. As shown in FIG. 30, when the full-cut processing is performed, the total imaging section is widened in the thickness direction of the wafer 20. In addition, when the full-cut processing is performed, the interval between the modified regions (SD1 to SD4) becomes narrow, and the extension amount of the crack 14 is also reduced. For this reason, when the full-cut processing is performed, it is considered that unless the adjustment of the setting related to internal observation in the thickness direction of the wafer 20 in more detail or the like is executed, the modified regions and the cracks cannot be clearly observed.

Specifically, the control unit 8 performs the following processes to clearly observe the modified regions and the like even when the full-cut processing is performed.

Firstly, the control unit 8 is configured to further execute an aberration correction process of controlling the imaging unit 4 such that aberration correction according to a position in the thickness direction of the wafer 20 (optimum aberration correction in each thickness direction) is performed in each region in the thickness direction of the wafer 20 of which an image is captured by the imaging unit 4. For example, the control unit 8 executes an optimum aberration correction by adjusting the spatial light modulator 32 or the correction ring 43a of the objective lens 43 in each region corresponding to an SD processing position (modified region formation position) estimated from the processing condition.

Secondarily, the control unit 8 is configured to further execute a brightness calibration process of controlling the imaging unit 4 such that the imaging unit 4 captures an image with a predetermined (for example, constant or optimum) brightness in each region in the thickness direction of the wafer 20 of which an image is captured by the imaging unit 4, and such that the imaging unit 4 outputs light of a light amount corresponding to a position of each region in the thickness direction of the wafer 20. In the internal observation, the deeper the observation depth is, the larger the light amount required to secure sufficient brightness is. Namely, the light amount required for each depth changes. For this reason, it is necessary to figure out a light amount required to obtain an optimum brightness value for each depth each time before observation is performed, when the laser device is started up, or the device is changed. In the brightness calibration process, a light amount when each position in the thickness direction is observed is decided, and setting is done such that the imaging unit 4 outputs light of the light amount during observation of each position.

Figure 31:
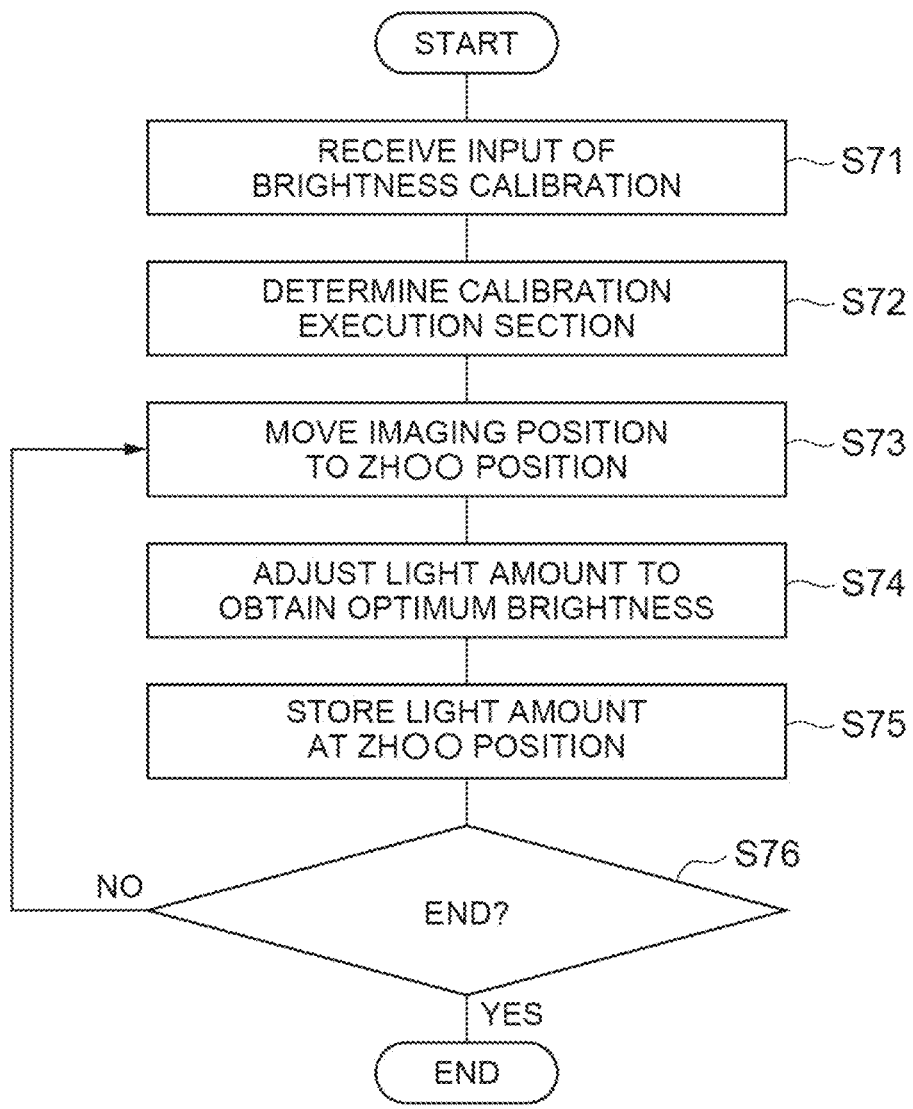
FIG. 31 is a flowchart of a brightness calibration process.

In the brightness calibration process, as shown in FIG. 31, initially, an input related to brightness calibration is received (step S71). The input related to brightness calibration may be, for example, an input of a wafer thickness to be input related to the derivation of the processing condition, or the like. Subsequently, the control unit 8 decides a calibration execution section according to the input (for example, the wafer thickness) related to brightness calibration. The calibration execution section referred to here is, for example, information of a plurality of ZHs at which brightness calibration is executed. Incidentally, the calibration execution section may be decided and input by the user. Subsequently, an imaging position of the imaging unit 4 is set to one ZH of the calibration execution section (step S73). Then, the light amount of the light source 41 is adjusted such that the brightness with which an image at the ZH is captured is an optimum brightness (step S74), and the ZH and the light amount are stored in association with each other (step S75). An aperture diaphragm or the like is used for the adjustment of the light source 41. The processes of steps S73 to S75 are executed until the adjustment of the light amount for all the ZHs is completed. Then, the light amount adjusted in such a manner is output from the light source 41 of the imaging unit 4 during observation of each position, so that the observation of each position can be performed with an appropriate brightness.

Thirdly, the control unit 8 is configured to further execute a shading correction process of controlling the imaging unit 4 to capture an image for shading in each region in the thickness direction of the wafer 20 of which an image is captured by the imaging unit 4, before the modified regions are processed, and of identifying difference data between the image of each region and the image for shading of the corresponding region captured by the imaging unit 4, after the modified regions are processed. In this case, the control unit 8 identifies a state related to each modified region based on the difference data.

Figure 32:
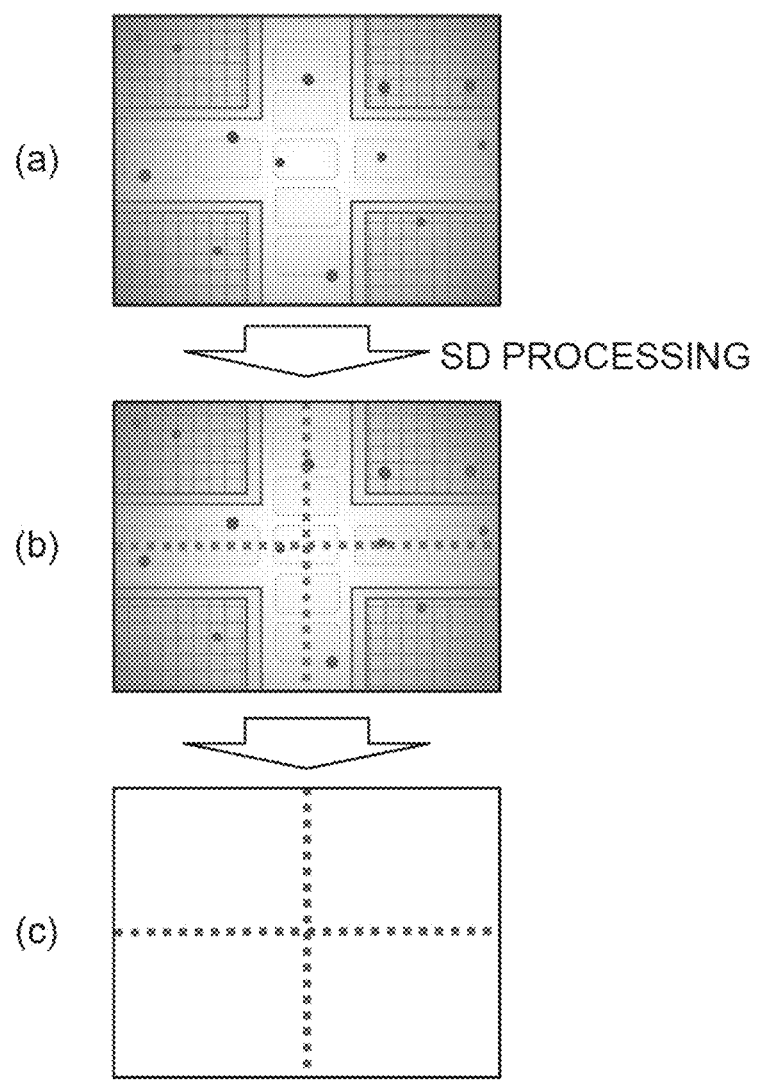
FIG. 32 is a flowchart of a shading correction process.

In the shading correction process, as shown in FIG. 32(*a*), an image for shading at each internal observation position (determination position) is acquired before SD processing (processing of the modified regions). Then, the SD processing is performed, and an image after the SD processing as shown in FIG. 32(*b*) is acquired at each internal observation position (determination position). Then, difference data between the image after the SD processing and the image for shading (refer to FIG. 32(*c*)) is acquired at each internal observation position (shading correction is executed). Incidentally, when there is a positional offset between the image after the SD processing and the image for shading, correction may be executed according to an offset amount. Things to be shaded by the shading correction are, for example, a device pattern, point defects, uneven screen brightness, and the like.

Figure 33:
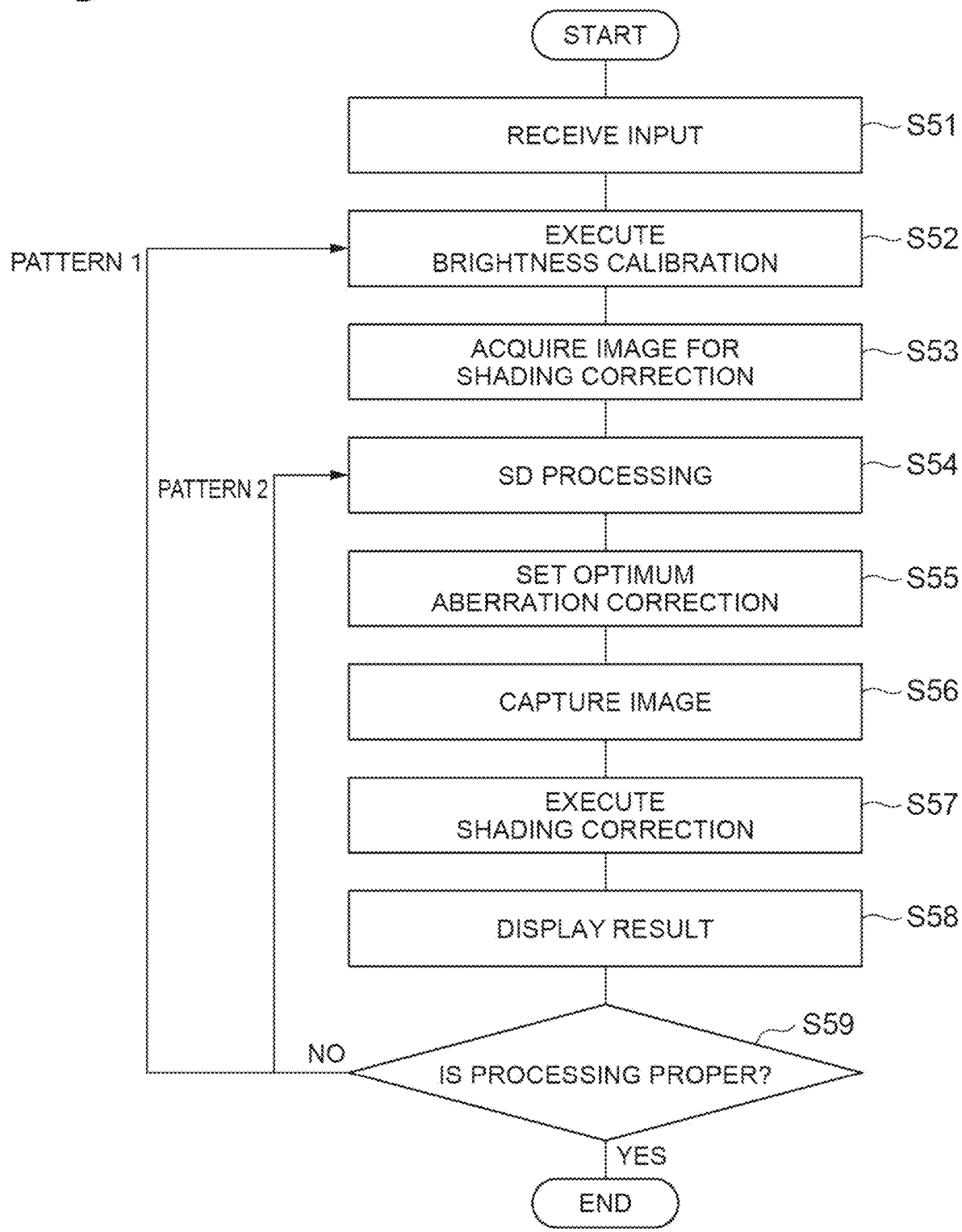
FIG. 33 is a flowchart of a laser processing method (processing condition derivation process) when various correction processes are performed.

A laser processing method (processing condition derivation process) in the case of executing the aberration correction process, the brightness calibration process, and the shading correction process described above will be described with reference to FIG. 33. Incidentally, in FIG. 33, the processing process and the determination process are described in a simplified manner (the process related to the first processing condition, the process related to the second processing condition, and the like are described without distinguishing therebetween). As shown in FIG. 33, initially, the display 150 receives a user's input of wafer processing information (step S51). Specifically, the display 150 receives an input of information of at least the wafer thickness. Accordingly, the processing condition is automatically and provisionally decided.

Subsequently, the control unit 8 executes the brightness calibration process (step S52). Specifically, the control unit 8 sets the imaging unit 4 such that the imaging unit 4 captures an image with a predetermined (for example, constant or optimum) brightness in each region in the thickness direction of the wafer 20 of which an image is captured by the imaging unit 4, and such that the imaging unit 4 outputs light of a light amount corresponding to a position of each region in the thickness direction of the wafer 20.

Subsequently, the control unit 8 acquires an image for shading correction (image for shading) (step S53). Specifically, the control unit 8 acquires an image at each internal observation position before SD processing, as the image for shading.

Subsequently, the control unit 8 controls the laser irradiation unit 3 based on the processing condition, to process SD layers in the wafer 20 (step S54). Subsequently, the control unit 8 executes aberration correction according to the position in the thickness direction of the wafer 20 (step S55). For example, the control unit 8 executes an optimum aberration correction by adjusting the spatial light modulator 32 or the correction ring 43*a* of the objective lens 43 in each region corresponding to an SD processing position (modified region formation position) estimated from the processing condition.

Subsequently, an image of the processed wafer 20 is captured by the imaging unit 4 (step S56). The control unit 8 executes shading correction (step S57). Specifically, the control unit 8 acquires difference data between the image of each region and the image for shading of the corresponding region captured by the imaging unit 4.

Then, the control unit 8 controls the display 150 such that imaging results are displayed on the display 150 (step S58). Subsequently, the control unit 8 identifies a state related to each SD layer based on the imaging results, and determines whether or not the processing is proper (namely, whether or not the processing condition is proper), based on the identified information (step S59). The control unit 8 performs the determination process referred to here, using difference data after the shading correction. When it is determined in step S59 that the processing condition is not proper, the control unit 8 receives an input of a new processing condition, and executes the processing process again. In this case, as shown in FIG. 33, the processing process may be executed from the brightness calibration process (step S52) again or may be executed from the SD processing (step S54) again. On the other hand, when the processing condition is proper, the control unit 8 finally decides the processing condition as a processing condition, and the process ends.

As described above, the control unit 8 is configured to further execute the brightness calibration process of controlling the imaging unit 4 such that the imaging unit 4 captures an image with a predetermined brightness in each region in the thickness direction of the wafer 20 of which an image is captured by the imaging unit 4, and such that the imaging unit 4 outputs light of a light amount corresponding to a position of each region in the thickness direction of the wafer 20. According to such a configuration, the light amount of the imaging unit 4 can be decided such that a constant or optimum brightness is obtained for each imaging region in the thickness direction (depth direction) of the wafer 20. Accordingly, the state related to each modified region can be appropriately identified.

The control unit 8 is configured to further execute the shading correction process of controlling the imaging unit 4 to capture an image for shading in each region in the thickness direction of the wafer 20 of which an image is captured by the imaging unit 4, before the modified regions are processed, and of identifying difference data between the image of each region and the image for shading of the corresponding region captured by the imaging unit 4, after the modified regions are processed. In the determination process, the state related to each modified region is identified based on the difference data. The difference data acquired by the shading correction process is image data from which noise such as a device pattern, point defects, or uneven screen brightness is removed, and is image data of only modified regions, a crack state, and the like that are desired to be observed. The state related to each modified region is identified based on such difference data, so that a state of the wafer 20 after the processing is appropriately identified. Accordingly, the quality of the wafer 20 after the processing can be more suitably ensured.

The control unit 8 is configured to further execute the aberration correction process of controlling the imaging unit 4 such that aberration correction according to a position in the thickness direction of the wafer 20 is performed in each region in the thickness direction of the wafer 20 of which an image is captured by the imaging unit 4. For example, when full-cut processing is performed, the interval between the modified regions becomes narrow, and the extension amount of the crack is also reduced, so that clear observation cannot be performed unless aberration correction is applied to each position in the thickness direction of the wafer 20. In this respect, as described above, since aberration correction according to the thickness of the wafer 20 is performed in each region in the thickness direction of the wafer 20, clear observation can be performed, and a state related to each modified region can be more appropriately identified.

Figure 34:
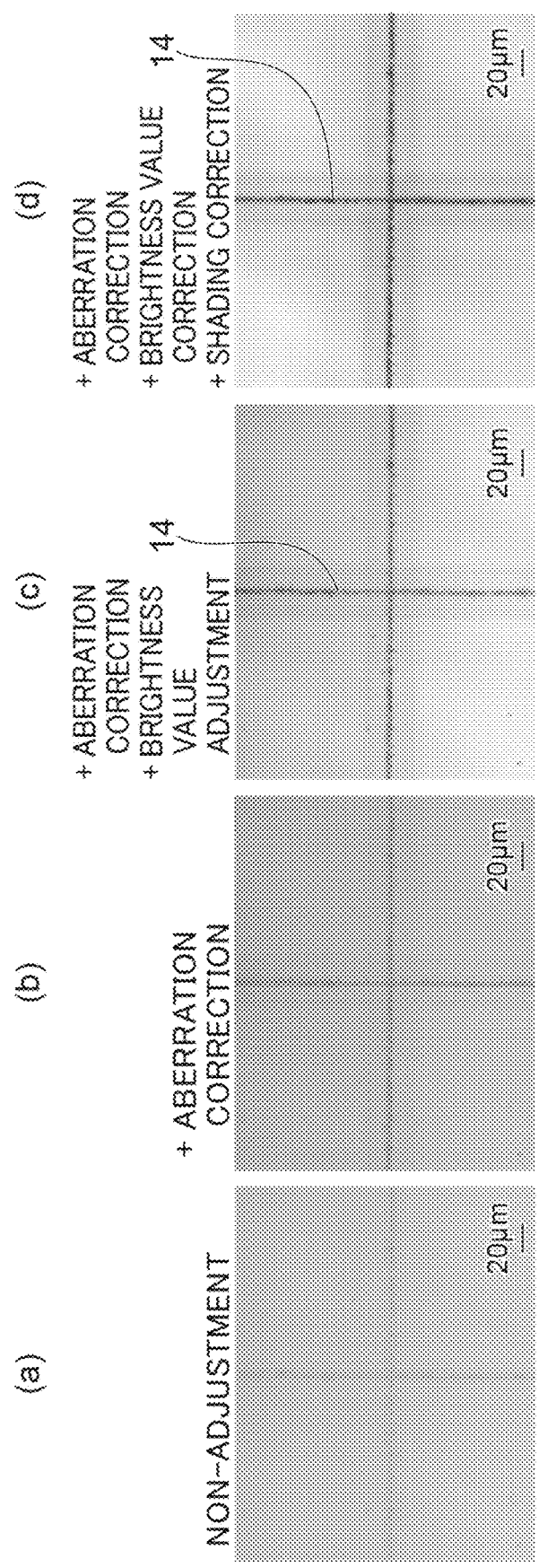
FIG. 34 shows images on which various correction processes are performed.

FIG. 34 shows images for illustrating effects obtained by executing the aberration correction process, the brightness value calibration process, and the shading correction process. FIG. 34(a) is an image when none of these processes is performed, FIG. 34(b) is an image when only the aberration correction process is performed, FIG. 34(c) is an image when the aberration correction process and the brightness value calibration process are performed, and FIG. 34(d) is an image when the aberration correction process, the brightness value calibration process, and the shading correction process are performed. As shown in FIG. 34, it can be seen that the clearness of the cracks 14 and the like are greatly improved by performing these processes.

(Regarding Automation of Processing Condition Derivation Process)

In the above-described embodiment, a final processing condition is derived by automatically deriving a provisional processing condition through inputting wafer processing information, by automatically deriving and displaying an image of an estimated processing result based on the processing condition, by displaying an image of an actual processing result, and by performing correction on the processing condition until the actual processing result coincides with the estimated processing result. However, all of such a processing condition derivation process may not automatically executed.

For example, in a first step for automating the processing condition derivation process, the user may manually generate and set a processing condition (provisional processing condition) based on wafer processing information. Then, an actual processing result under the generated processing condition may be acquired, and each combination of the input wafer processing information and the processing condition that is manually generated may be stored in a database in association with the actual processing result.

Furthermore, in a second step, a model for deriving an estimated processing result from the wafer processing information and from the processing condition may be generated by learning information stored in the database. Then, a regression model for deriving an optimum (the most accurate) estimated processing result from the wafer processing information and from the processing condition may be generated by analyzing data in the above-described database. In this case, multivariate analysis or machine learning may be used as an analysis technique. Specifically, analysis techniques such as simple regression, multiple regression, SGD regression, Lasso regression, Ridge regression, decision tree, support vector regression, Bayesian linear regression, deep machine learning, and k-nearest neighbors method may be used.

Furthermore, in a third step, a regression model for automatically deriving an optimum processing condition (recipe) for obtaining a target processing result, from the input wafer processing information may be generated. Namely, parameters of the processing condition may be input to the regression model while being adjusted with respect to the input wafer processing information, and the optimum processing condition that outputs the target processing result may be searched. For example, techniques such as grid search, random search, and Bayesian optimization can be used as such an optimization technique.

Furthermore, in a fourth step, when the needs for the correction of the conditions are determined by comparing a simulation result (estimated processing result) and an actual processing result to each other, the data may be stored in the database, and a regression model (active learning) may be generated again, so that the accuracy of the regression model is improved through actual operation. As described above, the processing condition is corrected from a difference between the estimated processing result and the actual processing result to feedback the actual processing result, so that the accuracy of the regression model can be improved.

REFERENCE SIGNS LIST

1: laser processing device, 3: laser irradiation unit (irradiation unit), 4: imaging unit, 8: control unit.

The invention claimed is:

1. A laser processing device comprising:
an irradiation unit configured to irradiate a wafer having a first surface and a second surface with a laser beam from a first surface side of the wafer;
an imaging unit configured to output light having a property of transmitting through the wafer, and detect the light that has propagated through the wafer; and
a control unit,
wherein the control unit is configured to execute a first process of controlling the irradiation unit according to a first processing condition set such that a first modified region and a second modified region are formed inside the wafer by irradiating the wafer with the laser beam, the second modified region being located closer to an incident surface side of the laser beam than the first modified region; a second process of identifying a state related to each of the first modified region and the second modified region based on a signal output from the imaging unit that has detected the light, and of determining whether or not the first processing condition is proper, based on identified information, after the first process; a third process of controlling the irradiation unit according to a second processing condition set such that the first modified region and the second modified region are formed and a third modified region is formed between the first modified region and the second modified region in a thickness direction of the wafer inside the wafer by irradiating the wafer with the laser beam; and a fourth process of identifying a state related to each of the first modified region, the second modified region, and the third modified region based on a signal output from the imaging unit that has detected the light, and of determining whether or not the second processing condition is proper, based on identified information, after the third process.

2. The laser processing device according to claim 1, wherein the control unit identifies at least one of a state of the modified region and a state of a crack extending from the modified region, as the state related to the modified region.

3. The laser processing device according to claim 2, wherein the control unit identifies a position of the modified region, and determines whether or not the processing condition is proper, based on the position.

4. The laser processing device according to claim 2, wherein the control unit identifies whether or not the crack extends to at least one of the first surface and the second surface, and determines whether or not the processing condition is proper, based on whether or not the crack extends to at least one of the first surface and the second surface.

5. The laser processing device according to claim 4, wherein in the second process, when the crack extends to at least one of the first surface and the second surface, the control unit determines that the first processing condition is not proper.

6. The laser processing device according to claim 2, wherein the control unit identifies an extension amount of the crack, and determines whether or not the processing condition is proper, based on the extension amount.

7. The laser processing device according to claim 2, wherein the control unit identifies a meandering width of the crack in a direction intersecting the thickness direction of the wafer, and determines whether or not the processing condition is proper, based on the meandering width.

8. The laser processing device according to claim 2, wherein the control unit identifies whether or not cracks extending from the respective modified regions different from each other are connected to each other, and determines whether or not the processing condition is proper, based on whether or not the cracks are connected to each other.

9. The laser processing device according to claim 2, wherein the control unit is configured to further execute a fifth process of controlling the irradiation unit according to a third processing condition set such that the third modified region is formed inside the wafer by irradiating the wafer with the laser beam; and a sixth process of identifying a state related to the third modified region based on a signal output from the imaging unit that has detected the light, and of determining whether or not the third processing condition is proper, based on identified information, after the fifth process.

10. The laser processing device according to claim 9, wherein in the sixth process, when the crack extends to at least one of the first surface and the second surface, the control unit determines that the third processing condition is not proper.

11. The laser processing device according to claim 1, wherein the control unit is configured to further execute a seventh process of correcting the processing condition according to a determination result of the processing condition, when it is determined that the processing condition is not proper.

12. The laser processing device according to claim 1, wherein the control unit is configured to further execute a brightness calibration process of the controlling the imaging unit such that the imaging unit captures an image with a predetermined brightness in each region in the thickness direction of the wafer of which an image is captured by the imaging unit, and such that the imaging unit outputs the light of a light amount corresponding to a position of each region in the thickness direction of the wafer.

13. The laser processing device according to claim 1, wherein the control unit is configured to further execute a shading correction process of controlling the imaging unit to capture an image for shading in each region in the thickness direction of the wafer of which an image is captured by the imaging unit, before the modified region is processed, and of identifying difference data between an image of each region and the image for shading of a corresponding region captured by the imaging unit, after the modified region is processed,
wherein in the second process and in the fourth process, a state related to the modified region is identified based on the difference data.

14. The laser processing device according to claim 1, wherein the control unit is configured to further execute an aberration correction process of controlling at least one of the irradiation unit and the imaging unit such that aberration correction according to a position in the thickness direction of the wafer is performed in each region in the thickness direction of the wafer of which an image is captured by the imaging unit.

* * * * *